(12) United States Patent
Atkisson

(10) Patent No.: US 8,966,184 B2
(45) Date of Patent: Feb. 24, 2015

(54) APPARATUS, SYSTEM, AND METHOD FOR MANAGING EVICTION OF DATA

(75) Inventor: David Atkisson, Draper, UT (US)

(73) Assignee: Intelligent Intellectual Property Holdings 2, LLC., Wilmington, DE (US)

( * ) Notice: Subject to any disclaimer, the term of this patent is extended or adjusted under 35 U.S.C. 154(b) by 306 days.

(21) Appl. No.: 13/362,959

(22) Filed: Jan. 31, 2012

(65) Prior Publication Data

US 2012/0198175 A1   Aug. 2, 2012

Related U.S. Application Data

(60) Provisional application No. 61/438,182, filed on Jan. 31, 2011, provisional application No. 61/438,194, filed on Jan. 31, 2011.

(51) Int. Cl.
*G06F 12/08* (2006.01)
(52) U.S. Cl.
CPC ................................ *G06F 12/0804* (2013.01)
USPC ........... 711/133; 711/103; 711/118; 711/135; 711/E12.022
(58) Field of Classification Search
USPC ................... 711/103, 118, 133, 135, E12.022
See application file for complete search history.

(56) References Cited

U.S. PATENT DOCUMENTS

| | | |
|---|---|---|
| 4,571,674 A | 2/1986 | Hartung |
| 4,980,861 A | 12/1990 | Herdt et al. |
| 5,261,068 A | 11/1993 | Gaskins et al. |
| 5,291,496 A | 3/1994 | Andaleon et al. |
| 5,307,497 A | 4/1994 | Feigenbaum et al. |
| 5,313,475 A | 5/1994 | Cromer et al. |
| 5,325,509 A | 6/1994 | Lautzenheiser |
| 5,392,427 A | 2/1995 | Barrett et al. |
| 5,404,485 A | 4/1995 | Ban |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai et al. |

(Continued)

FOREIGN PATENT DOCUMENTS

| | | |
|---|---|---|
| EP | 1100001 | 10/2000 |
| EP | 1418502 | 10/2003 |

(Continued)

OTHER PUBLICATIONS

Application No. PCT/US2011/046005, International Search Report and Written Opinion, Apr. 6, 2012.

(Continued)

*Primary Examiner* — Jasmine Song
(74) *Attorney, Agent, or Firm* — Kenneth E. Horton; Kirton McConkie

(57) ABSTRACT

An apparatus, system, and method are disclosed for managing eviction of data. A grooming cost module determines a grooming cost for a selected region of a nonvolatile solid-state cache. The grooming cost includes a cost of evicting the selected region of the nonvolatile solid-state cache relative to other regions. A grooming candidate set module adds the selected region to a grooming candidate set in response to the grooming cost satisfying a grooming cost threshold. A low cost module selects a low cost region within the grooming candidate set. A groomer module recovers storage capacity of the low cost region.

22 Claims, 14 Drawing Sheets

(56) References Cited

U.S. PATENT DOCUMENTS

| | | |
|---|---|---|
| 5,551,003 A | 8/1996 | Mattson et al. |
| 5,559,988 A | 9/1996 | Durante et al. |
| 5,586,291 A | 12/1996 | Lasker et al. |
| 5,594,883 A | 1/1997 | Pricer |
| 5,596,736 A | 1/1997 | Kerns |
| 5,603,001 A | 2/1997 | Sukegawa et al. |
| 5,680,579 A | 10/1997 | Young et al. |
| 5,701,434 A | 12/1997 | Nakagawa |
| 5,734,861 A | 3/1998 | Cohn et al. |
| 5,745,671 A | 4/1998 | Hodges |
| 5,745,792 A | 4/1998 | Jost |
| 5,754,563 A | 5/1998 | White |
| 5,787,486 A | 7/1998 | Chin et al. |
| 5,797,022 A | 8/1998 | Shimotono et al. |
| 5,809,527 A | 9/1998 | Cooper et al. |
| 5,809,543 A | 9/1998 | Byers et al. |
| 5,822,759 A | 10/1998 | Treynor |
| 5,835,935 A | 11/1998 | Estakhri et al. |
| 5,845,313 A | 12/1998 | Estakhri et al. |
| 5,845,329 A | 12/1998 | Onishi et al. |
| 5,860,083 A | 1/1999 | Sukegawa |
| 5,893,138 A | 4/1999 | Judd et al. |
| 5,907,856 A | 5/1999 | Estakhri et al. |
| 5,924,113 A | 7/1999 | Estakhri et al. |
| 5,930,815 A | 7/1999 | Estakhri et al. |
| 5,960,462 A | 9/1999 | Solomon et al. |
| 5,961,660 A | 10/1999 | Capps, Jr. et al. |
| 6,000,019 A | 12/1999 | Dykstal et al. |
| 6,061,511 A | 5/2000 | Marantz et al. |
| 6,073,232 A | 6/2000 | Kroeker et al. |
| 6,101,601 A | 8/2000 | Matthews et al. |
| 6,105,076 A | 8/2000 | Beardsley et al. |
| 6,128,695 A | 10/2000 | Estakhri et al. |
| 6,141,249 A | 10/2000 | Estakhri et al. |
| 6,145,051 A | 11/2000 | Estakhri et al. |
| 6,170,039 B1 | 1/2001 | Kishida |
| 6,170,047 B1 | 1/2001 | Dye |
| 6,172,906 B1 | 1/2001 | Estakhri et al. |
| 6,173,381 B1 | 1/2001 | Dye |
| 6,185,654 B1 | 2/2001 | Van Doren |
| 6,209,088 B1 | 3/2001 | Reneris |
| 6,223,308 B1 | 4/2001 | Estakhri et al. |
| 6,230,234 B1 | 5/2001 | Estakhri et al. |
| 6,240,040 B1 | 5/2001 | Akaogi et al. |
| 6,278,633 B1 | 8/2001 | Wong et al. |
| 6,279,069 B1 | 8/2001 | Robinson et al. |
| 6,289,413 B1 | 9/2001 | Rogers et al. |
| 6,330,688 B1 | 12/2001 | Brown |
| 6,334,173 B1 | 12/2001 | Won et al. |
| 6,356,986 B1 | 3/2002 | Solomon et al. |
| 6,370,631 B1 | 4/2002 | Dye |
| 6,385,710 B1 | 5/2002 | Goldman et al. |
| 6,393,513 B2 | 5/2002 | Estakhri et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,418,509 B1 | 7/2002 | Yanai et al. |
| 6,424,872 B1 | 7/2002 | Glanzer et al. |
| 6,477,617 B1 | 11/2002 | Golding |
| 6,515,928 B2 | 2/2003 | Sato et al. |
| 6,516,380 B2 | 2/2003 | Kenchammana-Hoskote et al. |
| 6,519,185 B2 | 2/2003 | Harari et al. |
| 6,523,102 B1 | 2/2003 | Dye et al. |
| 6,552,955 B1 | 4/2003 | Miki |
| 6,567,889 B1 | 5/2003 | DeKoning et al. |
| 6,587,915 B1 | 7/2003 | Kim |
| 6,601,211 B1 | 7/2003 | Norman |
| 6,608,793 B2 | 8/2003 | Park et al. |
| 6,625,685 B1 | 9/2003 | Cho et al. |
| 6,633,956 B1 | 10/2003 | Mitani |
| 6,671,757 B1 | 12/2003 | Multer et al. |
| 6,675,349 B1 | 1/2004 | Chen |
| 6,710,901 B2 | 3/2004 | Pastor |
| 6,715,046 B1 | 3/2004 | Shoham et al. |
| 6,728,851 B1 | 4/2004 | Estakhri et al. |
| 6,735,546 B2 | 5/2004 | Scheuerlein |
| 6,745,292 B1 | 6/2004 | Stevens |
| 6,751,155 B2 | 6/2004 | Gorobets |
| 6,754,774 B2 | 6/2004 | Gruner et al. |
| 6,754,800 B2 | 6/2004 | Wong et al. |
| 6,757,800 B1 | 6/2004 | Estakhri et al. |
| 6,760,806 B2 | 7/2004 | Jeon |
| 6,775,185 B2 | 8/2004 | Fujisawa et al. |
| 6,779,088 B1 | 8/2004 | Benveniste et al. |
| 6,779,094 B2 | 8/2004 | Selkirk et al. |
| 6,785,776 B2 | 8/2004 | Arimilli et al. |
| 6,785,785 B2 | 8/2004 | Piccirillo et al. |
| 6,801,979 B1 | 10/2004 | Estakhri |
| 6,804,755 B2 | 10/2004 | Selkirk et al. |
| 6,816,917 B2 | 11/2004 | Dicorpo et al. |
| 6,839,819 B2 | 1/2005 | Martin |
| 6,845,053 B2 | 1/2005 | Chevallier |
| 6,845,428 B1 | 1/2005 | Kedem |
| 6,871,257 B2 | 3/2005 | Conley et al. |
| 6,877,076 B1 | 4/2005 | Cho et al. |
| 6,880,049 B2 | 4/2005 | Gruner et al. |
| 6,883,068 B2 | 4/2005 | Tsirgotis et al. |
| 6,883,069 B2 | 4/2005 | Yoshida |
| 6,883,079 B1 | 4/2005 | Priborsky |
| 6,910,170 B2 | 6/2005 | Choi et al. |
| 6,912,537 B2 | 6/2005 | Selkirk et al. |
| 6,912,618 B2 | 6/2005 | Estakhri et al. |
| 6,922,754 B2 | 7/2005 | Liu et al. |
| 6,928,505 B1 | 8/2005 | Klingman |
| 6,938,133 B2 | 8/2005 | Johnson et al. |
| 6,977,599 B2 | 12/2005 | Widmer |
| 6,978,342 B1 | 12/2005 | Estakhri et al. |
| 6,981,070 B1 | 12/2005 | Luk et al. |
| 6,996,676 B2 | 2/2006 | Megiddo et al. |
| 7,010,652 B2 | 3/2006 | Piccirillo et al. |
| 7,010,662 B2 | 3/2006 | Aasheim et al. |
| 7,010,663 B2 | 3/2006 | George et al. |
| 7,013,376 B2 | 3/2006 | Hooper, III |
| 7,013,379 B1 | 3/2006 | Testardi |
| 7,043,599 B1 | 5/2006 | Ware et al. |
| 7,047,366 B1 | 5/2006 | Ezra |
| 7,050,337 B2 | 5/2006 | Iwase et al. |
| 7,057,936 B2 | 6/2006 | Yaegashi et al. |
| 7,058,769 B1 | 6/2006 | Danilak |
| 7,069,380 B2 | 6/2006 | Ogawa et al. |
| 7,076,723 B2 | 7/2006 | Saliba |
| 7,082,495 B2 | 7/2006 | DeWhitt et al. |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,111,140 B2 | 9/2006 | Estakhri et al. |
| 7,130,956 B2 | 10/2006 | Rao |
| 7,130,957 B2 | 10/2006 | Rao |
| 7,143,228 B2 | 11/2006 | Iida et al. |
| 7,149,947 B1 | 12/2006 | MacLellan et al. |
| 7,162,571 B2 | 1/2007 | Kilian et al. |
| 7,167,944 B1 | 1/2007 | Estakhri |
| 7,167,953 B2 | 1/2007 | Megiddo et al. |
| 7,177,197 B2 | 2/2007 | Cernea |
| 7,178,081 B2 | 2/2007 | Lee et al. |
| 7,181,572 B2 | 2/2007 | Walmsley |
| 7,194,577 B2 | 3/2007 | Johnson et al. |
| 7,197,657 B1 | 3/2007 | Tobias |
| 7,203,815 B2 | 4/2007 | Haswell |
| 7,215,580 B2 | 5/2007 | Gorobets |
| 7,219,197 B2 | 5/2007 | Hatakeyama |
| 7,219,238 B2 | 5/2007 | Saito et al. |
| 7,227,777 B2 | 6/2007 | Roohparvar |
| 7,234,082 B2 | 6/2007 | Lai et al. |
| 7,237,141 B2 | 6/2007 | Fredin |
| 7,243,203 B2 | 7/2007 | Scheuerlein |
| 7,246,179 B2 | 7/2007 | Camara et al. |
| 7,248,691 B1 | 7/2007 | Pandit et al. |
| 7,257,129 B2 | 8/2007 | Lee et al. |
| 7,263,591 B2 | 8/2007 | Estakhri et al. |
| 7,280,536 B2 | 10/2007 | Testardi |
| 7,305,520 B2 | 12/2007 | Voigt et al. |

(56) References Cited

U.S. PATENT DOCUMENTS

| | | |
|---|---|---|
| 7,337,201 B1 | 2/2008 | Yellin et al. |
| 7,340,558 B2 | 3/2008 | Lee et al. |
| 7,340,566 B2 | 3/2008 | Voth et al. |
| 7,340,581 B2 | 3/2008 | Gorobets et al. |
| 7,356,651 B2 | 4/2008 | Liu et al. |
| 7,360,015 B2 | 4/2008 | Matthews et al. |
| 7,360,037 B2 | 4/2008 | Higaki et al. |
| 7,366,808 B2 | 4/2008 | Kano et al. |
| 7,370,163 B2 | 5/2008 | Yang et al. |
| 7,392,365 B2 | 6/2008 | Selkirk et al. |
| 7,424,593 B2 | 9/2008 | Estakhri et al. |
| 7,437,510 B2 | 10/2008 | Rosenbluth et al. |
| 7,441,081 B2 | 10/2008 | Humlicek |
| 7,441,090 B2 | 10/2008 | Estakhri et al. |
| 7,447,847 B2 | 11/2008 | Louie et al. |
| 7,450,420 B2 | 11/2008 | Sinclair et al. |
| 7,460,432 B2 | 12/2008 | Warner |
| 7,463,521 B2 | 12/2008 | Li |
| 7,480,766 B2 | 1/2009 | Gorobets |
| 7,487,235 B2 | 2/2009 | Andrews et al. |
| 7,487,320 B2 | 2/2009 | Bansal et al. |
| 7,500,000 B2 | 3/2009 | Groves et al. |
| 7,523,249 B1 | 4/2009 | Estakhri et al. |
| 7,529,905 B2 | 5/2009 | Sinclair |
| 7,536,491 B2 | 5/2009 | Kano et al. |
| 7,549,013 B2 | 6/2009 | Estakhri et al. |
| 7,552,271 B2 | 6/2009 | Sinclair et al. |
| 7,580,287 B2 | 8/2009 | Aritome |
| 7,631,138 B2 | 12/2009 | Gonzalez et al. |
| 7,640,390 B2 | 12/2009 | Iwamura et al. |
| 7,644,239 B2 | 1/2010 | Ergan et al. |
| 7,660,911 B2 | 2/2010 | McDaniel |
| 7,689,803 B2 | 3/2010 | Karr et al. |
| 7,725,628 B1 | 5/2010 | Phan et al. |
| 7,725,661 B2 | 5/2010 | Liu et al. |
| 7,856,528 B1 | 12/2010 | Frost et al. |
| 7,908,501 B2 | 3/2011 | Kim et al. |
| 2002/0053009 A1 | 5/2002 | Selkirk et al. |
| 2002/0069317 A1 | 6/2002 | Chow et al. |
| 2002/0069318 A1 | 6/2002 | Chow et al. |
| 2002/0194451 A1 | 12/2002 | Mukaida et al. |
| 2003/0061296 A1 | 3/2003 | Craddock et al. |
| 2003/0070034 A1 | 4/2003 | Friedman et al. |
| 2003/0093741 A1 | 5/2003 | Argon et al. |
| 2003/0131182 A1 | 7/2003 | Kumar et al. |
| 2003/0163630 A1 | 8/2003 | Aasheim et al. |
| 2003/0163663 A1 | 8/2003 | Aasheim et al. |
| 2003/0198084 A1 | 10/2003 | Fujisawa et al. |
| 2004/0059870 A1 | 3/2004 | Ash et al. |
| 2004/0064647 A1 | 4/2004 | DeWhitt et al. |
| 2004/0093463 A1 | 5/2004 | Shang |
| 2004/0186946 A1 | 9/2004 | Lee |
| 2004/0268359 A1 | 12/2004 | Hanes |
| 2005/0002263 A1 | 1/2005 | Iwase et al. |
| 2005/0015539 A1 | 1/2005 | Horii |
| 2005/0018527 A1 | 1/2005 | Gorobets |
| 2005/0027951 A1 | 2/2005 | Piccirillo et al. |
| 2005/0055497 A1 | 3/2005 | Estakhri et al. |
| 2005/0076107 A1 | 4/2005 | Goud et al. |
| 2005/0132259 A1 | 6/2005 | Emmot et al. |
| 2005/0144361 A1 | 6/2005 | Gonzales et al. |
| 2005/0149618 A1 | 7/2005 | Cheng |
| 2005/0149819 A1 | 7/2005 | Hwang |
| 2005/0177672 A1 | 8/2005 | Rao |
| 2005/0177687 A1 | 8/2005 | Rao |
| 2005/0193166 A1 | 9/2005 | Johnson et al. |
| 2005/0229090 A1 | 10/2005 | Shen et al. |
| 2005/0235132 A1 | 10/2005 | Karr et al. |
| 2005/0240713 A1 | 10/2005 | Wu |
| 2005/0246510 A1 | 11/2005 | Retnamma et al. |
| 2005/0257213 A1 | 11/2005 | Chu et al. |
| 2005/0276092 A1 | 12/2005 | Hansen et al. |
| 2006/0004955 A1 | 1/2006 | Ware |
| 2006/0026339 A1 | 2/2006 | Rostampour |
| 2006/0059326 A1 | 3/2006 | Aasheim |
| 2006/0064556 A1 | 3/2006 | Aasheim et al. |
| 2006/0075057 A1 | 4/2006 | Gildea et al. |
| 2006/0090048 A1 | 4/2006 | Okumoto et al. |
| 2006/0106968 A1 | 5/2006 | Wooi Teoh |
| 2006/0106990 A1 | 5/2006 | Benhase et al. |
| 2006/0143396 A1 | 6/2006 | Cabot et al. |
| 2006/0152981 A1 | 7/2006 | Ryu |
| 2006/0184736 A1 | 8/2006 | Benhase et al. |
| 2006/0224849 A1 | 10/2006 | Islam et al. |
| 2006/0230295 A1 | 10/2006 | Schumacher et al. |
| 2006/0248387 A1 | 11/2006 | Nicholson et al. |
| 2006/0265624 A1 | 11/2006 | Moshayedi |
| 2007/0016699 A1 | 1/2007 | Minami et al. |
| 2007/0050571 A1 | 3/2007 | Nakamura |
| 2007/0073975 A1 | 3/2007 | Lee et al. |
| 2007/0118676 A1 | 5/2007 | Kano et al. |
| 2007/0124474 A1 | 5/2007 | Margulis |
| 2007/0124540 A1 | 5/2007 | Van Riel et al. |
| 2007/0150689 A1 | 6/2007 | Pandit et al. |
| 2007/0162830 A1 | 7/2007 | Stek et al. |
| 2007/0198770 A1 | 8/2007 | Horii et al. |
| 2007/0204128 A1 | 8/2007 | Lee et al. |
| 2007/0204197 A1 | 8/2007 | Yokokawa |
| 2007/0230253 A1 | 10/2007 | Kim |
| 2007/0233455 A1 | 10/2007 | Zimmer et al. |
| 2007/0233937 A1 | 10/2007 | Coulson et al. |
| 2007/0233938 A1 | 10/2007 | Cho et al. |
| 2007/0234021 A1 | 10/2007 | Ruberg et al. |
| 2007/0245094 A1 | 10/2007 | Lee et al. |
| 2007/0245217 A1 | 10/2007 | Valle |
| 2007/0250660 A1 | 10/2007 | Gil et al. |
| 2007/0271468 A1 | 11/2007 | McKenney et al. |
| 2007/0271572 A1 | 11/2007 | Gupta et al. |
| 2007/0274150 A1 | 11/2007 | Gorobets |
| 2007/0276897 A1 | 11/2007 | Tameshige et al. |
| 2007/0300008 A1 | 12/2007 | Rogers et al. |
| 2008/0005748 A1 | 1/2008 | Mathew |
| 2008/0010395 A1 | 1/2008 | Mylly et al. |
| 2008/0016301 A1 | 1/2008 | Chen |
| 2008/0043769 A1 | 2/2008 | Hirai |
| 2008/0052483 A1 | 2/2008 | Rangarajan et al. |
| 2008/0059752 A1 | 3/2008 | Serizawa |
| 2008/0059820 A1 | 3/2008 | Vaden et al. |
| 2008/0080243 A1 | 4/2008 | Edahiro et al. |
| 2008/0091876 A1 | 4/2008 | Fujibayashi et al. |
| 2008/0098159 A1 | 4/2008 | Song et al. |
| 2008/0104344 A1 | 5/2008 | Shimozono et al. |
| 2008/0117686 A1 | 5/2008 | Yamada |
| 2008/0120303 A1 | 5/2008 | Selkirk et al. |
| 2008/0120469 A1 | 5/2008 | Kornegay |
| 2008/0123211 A1 | 5/2008 | Chng et al. |
| 2008/0126700 A1 | 5/2008 | El-Batal et al. |
| 2008/0126852 A1 | 5/2008 | Brandyberry et al. |
| 2008/0133963 A1 | 6/2008 | Katano et al. |
| 2008/0137658 A1 | 6/2008 | Wang |
| 2008/0140819 A1 | 6/2008 | Bailey et al. |
| 2008/0183965 A1 | 7/2008 | Shiga et al. |
| 2008/0195801 A1 | 8/2008 | Cheon et al. |
| 2008/0201535 A1 | 8/2008 | Hara |
| 2008/0205286 A1 | 8/2008 | Li et al. |
| 2008/0209090 A1 | 8/2008 | Kano et al. |
| 2008/0229046 A1 | 9/2008 | Raciborski |
| 2008/0235443 A1 | 9/2008 | Chow et al. |
| 2008/0266973 A1 | 10/2008 | Sekar et al. |
| 2008/0276040 A1 | 11/2008 | Moritoki |
| 2008/0294847 A1 | 11/2008 | Maruyama et al. |
| 2008/0313364 A1 | 12/2008 | Flynn |
| 2009/0043952 A1 | 2/2009 | Estakhri et al. |
| 2009/0070541 A1 | 3/2009 | Yochai |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0089518 A1 | 4/2009 | Hobbet |
| 2009/0091996 A1 | 4/2009 | Chen et al. |
| 2009/0125650 A1 | 5/2009 | Sebire |
| 2009/0144496 A1 | 6/2009 | Kawaguchi |
| 2009/0150605 A1 | 6/2009 | Flynn et al. |
| 2009/0150621 A1 | 6/2009 | Lee |
| 2009/0157956 A1 | 6/2009 | Kano |

(56) References Cited

U.S. PATENT DOCUMENTS

| | | |
|---|---|---|
| 2009/0204750 A1 | 8/2009 | Estakhri et al. |
| 2009/0216944 A1 | 8/2009 | Gill et al. |
| 2009/0228637 A1 | 9/2009 | Moon et al. |
| 2009/0235017 A1 | 9/2009 | Estakhri et al. |
| 2009/0276654 A1 | 11/2009 | Butterworth et al. |
| 2009/0300277 A1 | 12/2009 | Jeddeloh |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0017556 A1 | 1/2010 | Chin et al. |
| 2010/0023674 A1 | 1/2010 | Aviles |
| 2010/0023676 A1 | 1/2010 | Moon et al. |
| 2010/0023682 A1 | 1/2010 | Lee et al. |
| 2010/0030946 A1 | 2/2010 | Kano et al. |
| 2010/0077194 A1 | 3/2010 | Zhao |
| 2010/0102999 A1 | 4/2010 | Lee et al. |
| 2010/0106917 A1 | 4/2010 | Ruberg et al. |
| 2010/0205368 A1 | 8/2010 | Gregg et al. |
| 2010/0235579 A1* | 9/2010 | Biles et al. .................... 711/125 |

FOREIGN PATENT DOCUMENTS

| | | |
|---|---|---|
| EP | 1814039 | 12/2006 |
| GB | 0123416.0 | 9/2001 |
| JP | 04-242848 | 8/1992 |
| JP | 08-153014 | 11/1996 |
| JP | 20000259525 | 9/2000 |
| JP | 2009122850 | 6/2009 |
| KR | 2010022811 | 3/2010 |
| WO | 9419746 | 9/1994 |
| WO | 9518407 | 7/1995 |
| WO | 9612225 | 4/1996 |
| WO | 0131512 | 5/2001 |
| WO | 0201365 | 1/2002 |
| WO | 2008070173 | 6/2008 |
| WO | 2008073421 | 6/2008 |
| WO | 2010036757 | 4/2010 |

OTHER PUBLICATIONS

Bulletproof Memory for RAID Servers, Part 1-3, agigatech com., 2009, pp. 12, http://agigatech.com/blog/bulletproof-memory-for-raid-servers-part-1/3.
Wu, Michael, "eNVy: A Non-Volatile, Main Memory Storage System", 1994, pp. 12, ASPLOS VI-10/94 San Jose, California, US.
IBM, "Method to Improve Reliability of SSD Arrays", Prior Art Database, Nov. 5, 2009, www.ip.com.
"Method for Fault Tolerance in Nonvolatile Storage", Prior Art Database, Feb. 3, 2005, www.ip.com.
"ioDrive—Frequently Asked Questions", Clustered Storage Solutions: Products, 2008, http://www.clusteredstorage.com/clustered_storage_solutions.html.
Application No. 11952123 Office Action, Oct. 5, 2010.
Windows PC Accelerators, XP-002476842, Microsoft Corporation, Nov. 30, 2006, pp. 1-16.
Application No. PCT/US2007/025049, International Search Report, May 14, 2008.
Application No. PCT/US2007/025049, International Preliminary Report on Patentability, Mar. 11, 2009.
"White Paper: S2A9550 Overview", DataDirect Networks, www.datadirectnet.com, 2007, 17 pages.
"Pivot3 RAIGE Cluster: Technology Overview", White Paper, www.pivot3,com, Jun. 2007, pp. 1-17.
Plank, James S. "A Tutorial on Reed-Solomon coding for Fault Tolerance in RAID-like Systems", Dept of Computer Science, Univ. of Tennessee, Sep. 1997, pp. 995-1012.
Morgenstern, David, "Is There a Flash Memory RAID in Your Future?", Nov. 2006.
"File System Primer", http://wiki.novell.com/index.php?File_System_Primer, Jul. 2006.
Singer, Dan, "Implementing MLC NAND Flash for Cost-Effective, High-Capacity Memory", M-systems, White Paper, Sep. 2003.

"Introduction to Samsungs Linux Flash File System"—RFS, Samsung Electronics, Nov. 2006.
Mesnier, Ganger, Riedel, "Object-Based Storage", IEEE Comm Magazine, Aug. 2003.
Hensbergen, "Dynamic Policy Disk Caching for Storage Networking", Nov. 2006.
Application No. 200780050973.4, Office Action, Jan. 26, 2011.
Application No. 07867661.6, Office Action, Oct. 6, 2011.
"Design and Use Considerations for NAND Flash Memory", Micron TN-29-17:NAND Flash Memory Introduction, 2006, pp. 8, Boise, Idaho, US.
"Am29DL322D/323D/324D", Spansion Data Sheet, Oct. 7, 2004, 58 pages, Pub. No. 21534, Revision D, Amendment 7, Fujitsu.
Ismail, Ari, "Performance Boosting and Workload Isolation in Storage Area Networks with SANCache", Proceedings of the 23rd IEEE/14th NASA Goddard Conference on Mass Storage Systems and Technologies, May 2006, pp. 263-273, Hewlett Packard Laboratories.
"ASPMC-660 Rugged IDE Flash Disk PMC Module", http://www.asinegroup.com/products/aspmc660.html.
Bandulet, Christian, "Object-Based Storage Devices", Sun Developer Network Site, Jul. 2007, http://developers.sun.com/solaris/articles/osd.html.
"BiTMICRO Introduces E-Disk PMC Flash Disk Module", Military & Aerospace Electronics East, 2004, http://www.bitmicro.com/press_news_releases_20040518_prt.php.
Casey, Michael, "Solid State File—Caching for Performance and Scalability", SolidData, http://www.storagesearch.com/3dram.html.
Casey, Michael, "Disk I/O Performance Scaling: the File Caching Solution", Solid Data Systems, Inc., pp. 8, Paper #528.
"EMC Virtual Infrastructure for Microsoft Applications—Data Center Solution Enabled by EMC Symmetrix V-Max and VMware ESX3. 5", White Paper, Apr. 2009, pp. 30.
Feresten, Paul, "NETAPP Thin Provisioning: Better for Business", NETAPPP White Paper, Mar. 2007, pp. 11, WP-7017-0307.
Gill, Binny S., "WOW: Wise Ordering for Writes—Combining Spatial and Temporal Locality in Non-Volatile Caches", IBM Almaden Research Center, {binnyg.dmodha}@us.ibm.com.
"How NTFS Works", Mar. 28, 2003, pp. 34.
"Information Technology—SCSI Object-Based Storage Device Commands (OSD)", American National Standards Institute, Jul. 30, 2004, pp. 187, Project T10/1355-D, Revision 10, New York, New York, US.
"Intel Turbo Memory with User Pinning", Intel NAND Storage Solutions, 2008, pp. 4.
Johnson, Michael K., "An Introduction to Block Device Drivers", Jan. 1, 1995, pp. 6.
Kawaguchi, Atsuo, "A Flash-Memory Based File System", Advanced Research Laboratory, Hitachi, Ltd., Hatoyama, Saitama, JP.
Leventhal, Adam, "Flash Storage Memory", Communications of the ACM, Jul. 2008, pp. 47-51, vol. 61, No. 7.
Volos, Haris, "Mnemosyne: Lightweight Persistent Memory", ASPLOS'11, Mar. 5-11, 2011, Newport Beach, California, US.
"NAND Flash 101: An Introduction to NAND Flash and How to Design It in to Your Next Product", Micron, Nov. 2006, pp. 27, Boise, Idaho, US.
Coburn, Joel, "NV-Heaps: Making Persistent Objects Fast and Safe with Next-Generation, Non-Volatile Memories", ASPLOS'11, Mar. 5-11, 2011, pp. 13, Newport Beach, California, US.
Brandon, Daniel, "Sparse Matrices in CS Education", Consortium for Computing Sciences in Colleges, 2009, pp. 6.
Application No. PCT/US2011/047659, International Search Report and Written Opinion, Apr. 9, 2012.
Stokes, Jon, "Intel's New Flash Tech to Bring Back Turbo Memory, for Real", http://arstechnica.com/hardware/news/2009/09/intels-new-flash-tech-to-b . . . .
Rosenblum, Mendel, "The Design and Implementation of a Log-structured File System", 1992.
"Hamming Codes for NAND Flash Memory Devices", Micron TN-29-08: Technical Note, 2005, pp. 7, Boise, Idaho, US.

(56) References Cited

OTHER PUBLICATIONS

The Advantages of Object-Based Storage—Secure, Scalable, Dynamic Storage Devices, Seagate Research Technology Paper, Apr. 2005, pp. 7, Scotts Valley, California, US.
Wacha, Rosie, "Improving RAID-Based Storage Systems with Flash Memory", First Annual ISSDM/SRL Research Symposium, Oct. 20-21, 2009, pp. 21.
Wang, Feng, "OBFS: A File System for Object-based Storage Devices", 21st IEEE/12th NASA Goddard Conference on Mass Storage Systems and Technologies, Apr. 2004, pp. 18, College Park, Maryland, US.
Application No. 11952123, Notice of Allowance, May 5, 2011.
"DataDirect Storage Systems Selected for NCSA Cluster", HPCWire, Aug. 15, 2003, pp. 2, vol. 12, No. 32, http://www.hpcwire.com/hpcwire/hpcwireWWW/03/0815/105731.html.
"EEL-6892—Virtual Computers", Lecture 18, http://www.acis.ufl.edu/ming/lectures.
"Hystor: Making SSDs the 'Survival of the Fittest' in High-Performance Storage Systems", pp. 14.
"Introducing Box Hill's Fibre Box", Box Hill Systems Corporation, Jan. 16, 1997, p. 5.
jZip A Free WinZip Alternative, First JZip by Greg Kowal, 2012.
Application No. PCT/US2012/022244, International Search Report and Written Opinion, Jul. 30, 2012.
Yerrick, Damian, "Block Device", downloaded Mar. 1, 2010, pp. 3, http;//www.pineight.com/ds/block/.
Weber, Ralph O., "Information Technology—SCSI Object-Based Storage Device Commands (OSD)", Seagate Technology, Jul. 30, 2004, p. 171, Project T10/1355-D, Revision 10, Reference No. ISO/IEC 14776-391 : 200x ANSI INCITS.***200x.
Makulowich, John, "Strategies, Players and Emerging Markets", Washington Technology, Jun. 26, 1997, pp. 6, http://washingtontechnology.com/Articles/1997/06/26/Strategies-Players-and-Emerging-Ma . . . .
Casey, Michael, "SAN Cache: SSD in the SAN", Computer Technology Review's Storage Inc., Quarter 1, 2000, pp. 4, SolidData, Santa Clara, California, US.
Application No. PCT/US2010/048321, International Search Report and Written Opinion, Apr. 28, 2011.
Dan, Raz, "Implementing MLC NAND Flash for Cost-Effective, High-Capacity Memory", M-Systems White Paper, Sep. 2003, pp. 13, 91-SR-014-02-8L, Rev 1.1, Newark, California, US.
Application No. 12885285, Notice of Allowance, Oct. 17, 2012.
Whyte, Barry, "IBM SAN Volune Controller 4.2.1 Cache Partitioning", Redpaper IBM Corporation, Apr. 30, 2008, pp. 12, REDP-4426-00, Poughkeepsie, New York, US.
Woodhouse, David, "JFFS: The Journalling Flash File System", Red Hat, Inc., pp. 12, dwmw2@cambridge.redhat.com.
"Hynix 48-GB Flash MCP", Slashdot, pp. 17, http://hardware.slashdot.org/article.pl?sid=07/09/06/146218&from=rss.
"Sybase: Maximizing Performance through Solid State File-Caching", SolidData Best Practices Guide, May 2000, pp. 4, Santa Clara, California, US.
Megiddo, Nimrod, "ARC: A Self-Tuning, Low Overhead Replacement Cache", Proceedings of FAST '03: 2nd USENIX Conference on File and Storage Technologies, Mar. 31-Apr. 2, 2003, pp. 17, http://www.usenix.org.
Application No. PCT/US2012/023373, International Search Report and Written Opinion, Jul. 30, 2012.

\* cited by examiner

APPARATUS, SYSTEM, AND METHOD FOR MANAGING EVICTION OF DATA

CROSS-REFERENCES TO RELATED APPLICATIONS

This application claims priority to U.S. Provisional Patent Application No. 61/438,182 entitled "APPARATUS, SYSTEM, AND METHOD FOR MANAGING EVICTION OF DATA" and filed on Jan. 31, 2011 for David Nellans, et al. and to U.S. Provisional Patent Application No. 61/438,194 entitled "APPARATUS, SYSTEM, AND METHOD FOR MANAGING EVICTION OF DATA" and filed on Jan. 31, 2011 for David Atkisson, each of which are incorporated herein by reference.

FIELD

The subject matter disclosed herein relates to caching data and more particularly relates to managing eviction of data from a cache.

BACKGROUND

1. Description of the Related Art

A cache device typically has a larger storage capacity than the backing store with which the cache device is associated. As a cache device fills with cached data, certain cached data may be evicted to free up room to cache additional data. If data is evicted from a cache device, a subsequent request for the evicted data yields a cache miss. Evicting the wrong data from a cache device can increase the number of cache misses and decrease the efficiency of the cache device.

2. Brief Summary

From the foregoing discussion, it should be apparent that a need exists for an apparatus, system, and method that optimally manage eviction of data from a cache. Beneficially, such an apparatus, system, and method would selectively evict data of a cache based on a grooming cost.

The present invention has been developed in response to the present state of the art, and in particular, in response to the problems and needs in the art that have not yet been fully solved by currently available data caches. Accordingly, the present invention has been developed to provide an apparatus, system, and method for managing eviction of data that overcome many or all of the above-discussed shortcomings in the art.

A method of the present invention is presented for managing eviction of data. In one embodiment, the method includes examining a grooming cost for a selected region of a nonvolatile solid-state cache. The method, in another embodiment, includes adding the selected region to a grooming candidate set in response to the grooming cost satisfying a grooming cost threshold. The grooming candidate set, in one embodiment, includes a plurality of regions of the nonvolatile solid-state cache ordered by grooming cost. In a further embodiment, the method includes selecting a low cost region within the grooming candidate set. The low cost region, in one embodiment, has a lowest grooming cost of members of the grooming candidate set.

The grooming cost, in one embodiment, includes a cost of evicting a selected region of the nonvolatile solid-state cache relative to other regions. In a further embodiment, the grooming cost represents a cache efficiency cost of evicting data from a selected region and a storage efficiency cost of copying data forward from a selected region. The grooming cost for a selected region, in another embodiment, accounts for an amount of cached dirty write data of a selected region. The grooming cost of a selected region, in one embodiment, satisfies the grooming cost threshold by being lower than at least one region of the grooming candidate set.

In one embodiment, the method includes recovering storage capacity of the low cost region. The method, in a further embodiment, includes retaining cached dirty write data from the low cost region in response to recovering the storage capacity of the low cost region. In another embodiment, the method includes retaining cached data identified as frequently accessed data from the low cost region in response to recovering the storage capacity of the low cost region in a low pressure groom mode. The method, in one embodiment, includes evicting cached data identified as frequently accessed data in response to recovering the storage capacity of the low cost region in a high pressure groom mode. Recovering the storage capacity of the low cost region, in one embodiment, is in response to a storage capacity recovery event. In a further embodiment, recovering the storage capacity of the low cost region is in response to a grooming pressure for the nonvolatile solid-state cache exceeding a predefined grooming pressure threshold.

In one embodiment, the method includes selecting a next region of the nonvolatile solid-state cache as a selected region in response to the grooming cost of the previous selected region failing to satisfy the grooming cost threshold. In a further embodiment, regions of the nonvolatile solid-state cache are organized in a circular data structure. In another embodiment, the method includes selecting one or more successive next regions in order around the circular data structure until a grooming cost for a next region satisfies the grooming cost threshold and the next region that satisfies the grooming cost threshold is added to the grooming candidate set.

In one embodiment, the grooming cost for a selected region is based at least partially on a frequency count for a selected region. The method, in one embodiment, includes clearing the frequency count for a selected region in response to examining the grooming cost for a selected region such that a subsequent grooming cost for the selected region is based at least partially on a new frequency count for the selected region. In a further embodiment, the method includes preserving a copy of the frequency count for a selected region in response to adding the selected region to the grooming candidate set. The frequency count, in one embodiment, identifies frequently accessed data from a low cost region. In a further embodiment, the frequency count comprises a number or an amount of blocks in a selected region accessed at least a predetermined number of times during a predefined time period.

In one embodiment, the selected region stores data for a plurality of cache units. The grooming cost, in certain embodiments, accounts for one or more attributes of the plurality of cache units. The one or more attributes may include a relative priority of the cache units, an allocated storage capacity for the cache units, a quality-of-service for the cache units, or the like.

An apparatus to manage eviction of data is provided with a plurality of modules configured to functionally execute the necessary steps of managing eviction of data from a cache. These modules in the described embodiments include a grooming cost module, a grooming candidate set module, a low cost module, a groomer module, a grooming clock module, and a frequency count module.

In one embodiment, the grooming cost module determines a grooming cost for a selected region of a nonvolatile solid-state cache. The grooming cost, in certain embodiments, includes a cost of evicting the selected region of the nonvolatile solid-state cache relative to other regions. In a further embodiment, the grooming candidate set module adds a selected region to a grooming candidate set in response to the grooming cost of the selected region satisfying a grooming cost threshold. The grooming cost of a selected region, in another embodiment, satisfies the grooming cost threshold by being lower than at least one region of the grooming candidate set.

In one embodiment, the low cost module selects a low cost region within the grooming candidate set. The low cost region, in another embodiment, has a lowest grooming cost of members of the grooming candidate set. In one embodiment, the groomer module recovers storage capacity of the low cost region. The groomer module, in a further embodiment, retains cached dirty write data from the low cost region. In another embodiment, the groomer module retains cached data identified as frequently accessed data from the low cost region in response to recovering the storage capacity of the low cost region in a low pressure groom mode. The groomer module, in an additional embodiment, evicts cached data identified as frequently accessed data in response to recovering the storage capacity of the low cost region in a high pressure groom mode.

In one embodiment, the grooming clock module selects the selected region. In a further embodiment, the grooming clock module selects a next region of the nonvolatile solid-state cache as the selected region in response to the grooming cost of the selected region failing to satisfy the grooming cost threshold.

In one embodiment, the frequency count module determines a frequency count for the selected region. The grooming cost module, in a further embodiment, bases the grooming cost for the selected region at least partially on the frequency count.

A system of the present invention is also presented to manage eviction of data. The system may be embodied by a processor, a storage controller, and a cache controller. In particular, the system, in one embodiment, includes a host computer system.

The storage controller, in one embodiment, is for a nonvolatile solid-state storage device. The nonvolatile solid-state storage device, in a further embodiment, is in communication with the processor over one or more communications buses. The cache controller, in another embodiment, is in communication with the storage controller.

The cache controller, in one embodiment, includes a grooming cost module. The grooming cost module, in a further embodiment, is in communication with the storage controller. In another embodiment, the grooming cost module examines a grooming cost for a selected region of the nonvolatile solid-state storage device. The grooming cost, in one embodiment, includes a cost of evicting the selected region of the nonvolatile solid-state storage device relative to other regions.

In a further embodiment, the cache controller includes a grooming candidate set module. The grooming candidate set module, in one embodiment, adds the selected region to a grooming candidate set in response to the grooming cost satisfying a grooming cost threshold. In another embodiment, the cache controller includes a low cost module that selects a low cost region within the grooming candidate set. The cache controller, in a further embodiment, includes a groomer module that recovers storage capacity of the low cost region. In one embodiment, the groomer module is in communication with the storage controller.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1A:
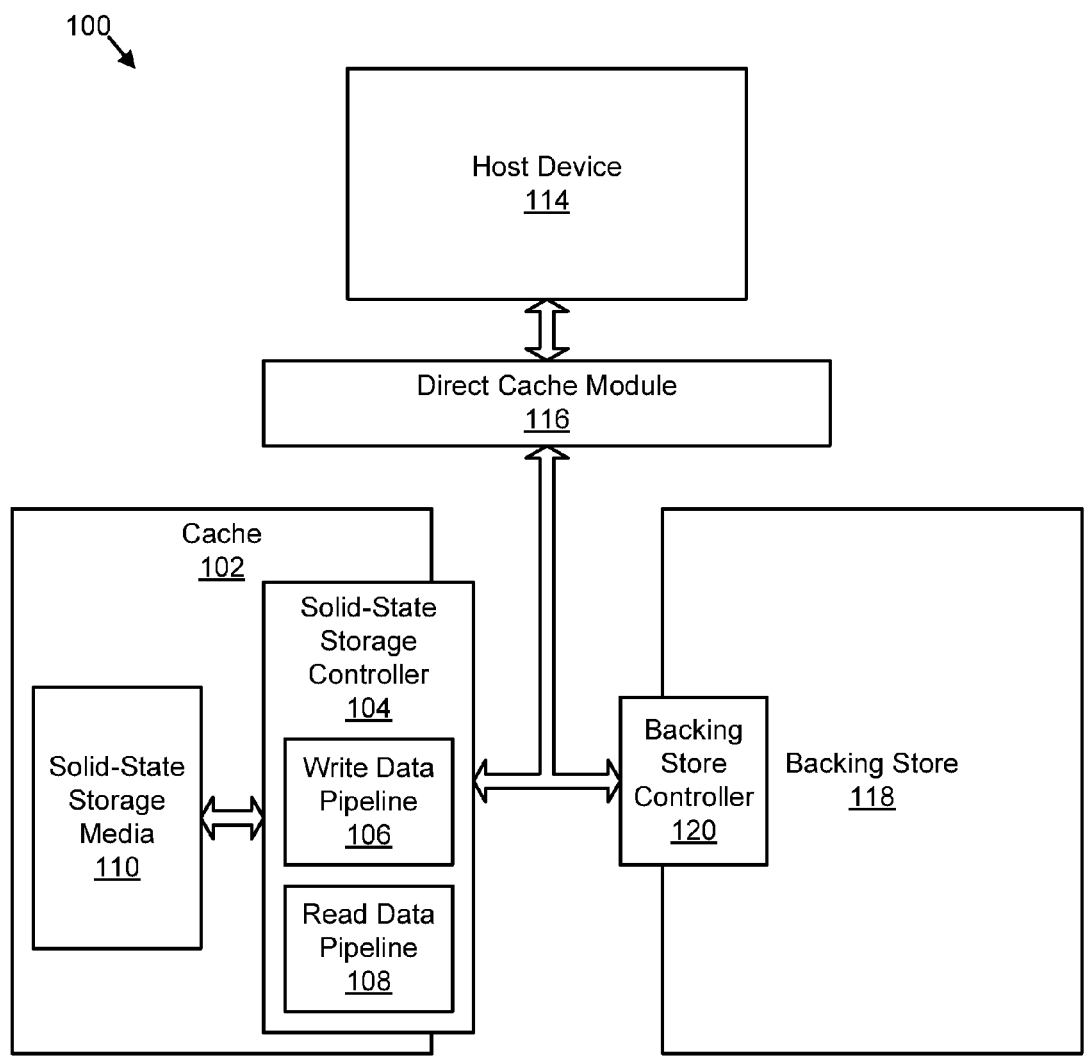
FIG. 1A is a schematic block diagram illustrating one embodiment of a system for managing eviction of data in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on or in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Caching System

FIG. 1A depicts one embodiment of a system 100 for managing eviction of data from a cache 102 in accordance with the present invention. The system 100, in the depicted embodiment, includes a cache 102 a host device 114, a direct cache module 116, and a backing store 118. The cache 102, in the depicted embodiment, includes a solid-state storage controller 104, a write data pipeline 106, a read data pipeline 108, and a solid-state storage media 110. In general, the system 100 caches data for the backing store 118 in the cache 102 and the direct cache module 116 grooms and selectively evicts cached data from the cache 102.

In the depicted embodiment, the system 100 includes a single cache 102. In another embodiment, the system 100 may include two or more caches 102. For example, in various embodiments, the system 100 may minor cached data between several caches 102, may virtually stripe cached data across multiple caches 102, or otherwise cache data in more than one cache 102. In general, the cache 102 serves as a read and/or a write cache for the backing store 118 and the backing store 118 is a storage device that serves as a backing store for the cache 102. In one embodiment, the cache 102 operates in a write-back mode and the direct cache module 116 destages cached write data to the backing store 118 opportunistically after caching the write data in the cache 102. In certain embodiments, the cache 102 may operate, at least temporarily, in another mode, such as a write-back mode, a write-around mode, or the like, and the direct cache module 116 may write data to the backing store 118 substantially simultaneously with caching the data in the cache 102 or without caching the data in the cache 102.

In the depicted embodiment, the cache 102 is embodied by a non-volatile, solid-state storage device, with a solid-state storage controller 104 and non-volatile, solid-state storage media 110. The non-volatile, solid-state storage media 110 may include flash memory, nano random access memory ("nano RAM or NRAM"), magneto-resistive RAM ("MRAM"), dynamic RAM ("DRAM"), phase change RAM ("PRAM"), racetrack memory, memristor memory, nanocrystal wire-based memory, silicon-oxide based sub-10 nanometer process memory, graphene memory, silicon-oxide-nitride-oxide-silicon ("SONOS") memory, resistive random-access memory ("RRAM"), programmable metallization cell ("PMC"), conductive-bridging RAM ("CBRAM"), or the like. Embodiments of the cache 102 that include a solid-state storage controller 104 and solid-state storage media 110 are described in more detail with respect to FIGS. 2 and 3. In further embodiments, the cache 102 may include other types of non-volatile and/or volatile data storage, such as dynamic RAM ("DRAM"), static RAM ("SRAM"), magnetic data storage, optical data storage, and/or other data storage technologies.

The cache 102, in one embodiment, stores or preserves data in a log. The log, in a further embodiment, comprises a sequential, append-only log-based structure, or the like. The cache 102 stores at least a portion of the log on the solid-state storage media 110. The cache 102, in certain embodiments, may store a portion of the log, metadata for the log, or the like in volatile memory, such as RAM, and may store at least enough data of the log in the solid-state storage media 110 to recreate the log structure after an improper shutdown or other failure. In one embodiment, the log includes a head at an append point and a tail at an end of the log with the oldest data (data written earliest in time). In certain embodiments, the log may include multiple append points, multiple sub-logs, or the like. In a further embodiment, the cache 102 may store or preserve data in multiple logs.

In general, the cache 102 caches data for the backing store 118. The backing store 118, in one embodiment, is a backing store associated with the cache 102 and/or with the direct cache module 116. The backing store 118 may include a hard disk drive, an optical drive with optical media, a magnetic tape drive, or another type of storage device. In one embodiment, the backing store 118 may have a greater data storage capacity than the cache 102. In another embodiment, the backing store 118 may have a higher latency, a lower throughput, or the like, than the cache 102.

The backing store 118 may have a higher latency, a lower throughput, or the like due to properties of the backing store 118 itself, or due to properties of a connection to the backing store 118. For example, in one embodiment, the cache 102 and the backing store 118 may each include non-volatile, solid-state storage media 110 with similar properties, but the backing store 118 may be in communication with the host device 114 over a data network, while the cache 102 may be directly connected to the host device 114, causing the backing store 118 to have a higher latency relative to the host 114 than the cache 102.

In one embodiment, the cache 102 and/or the backing store 118 are in communication with a processor of the host device 114 over one or more communications buses. In the depicted embodiment, the cache 102 and the backing store 118 are in communication with the host device 114 through the direct cache module 116. The cache 102 and/or the backing store 118, in one embodiment, may be direct attached storage ("DAS") of the host device 114. DAS, as used herein, is data storage that is connected to a device, either internally or externally, without a storage network in between.

In one embodiment, the cache 102 and/or the backing store 118 are internal to the host device 114 and are connected using a system bus, such as a peripheral component interconnect express ("PCI-e") bus, a Serial Advanced Technology Attachment ("SATA") bus, or the like. In another embodiment, the cache 102 and/or the backing store 118 may be external to the host device 114 and may be connected using a universal serial bus ("USB") connection, an Institute of Electrical and Electronics Engineers ("IEEE") 1394 bus ("FireWire"), an external SATA ("eSATA") connection, or the like. In other embodiments, the cache 102 and/or the backing store 118 may be connected to the host device 114 using a peripheral component interconnect ("PCI") express bus using external electrical or optical bus extension or bus networking solution such as Infiniband or PCI Express Advanced Switching ("PCIe-AS"), or the like.

In various embodiments, the cache 102 and/or the backing store 118 may be in the form of a dual-inline memory module ("DIMM"), a daughter card, or a micro-module. In another embodiment, the cache 102 and/or the backing store 118 may be elements within a rack-mounted blade. In another embodiment, the cache 102 and/or the backing store 118 may be contained within packages that are integrated directly onto a higher level assembly (e.g. mother board, lap top, graphics processor). In another embodiment, individual components comprising the cache 102 and/or the backing store 118 are integrated directly onto a higher level assembly without intermediate packaging.

In the depicted embodiment, the cache 102 includes one or more solid-state storage controllers 104 with a write data pipeline 106 and a read data pipeline 108, and a solid-state storage media 110, which are described in more detail below with respect to FIGS. 2 and 3. The backing store 118, in the depicted embodiment, includes a backing store controller 120. The solid-state storage controller 104 and the backing store controller 120, in certain embodiments, may receive storage requests, perform management functions and the like for the cache 102 and the backing store 118, or perform other functions. The solid-state storage controller 104 and/or the backing store controller 120, in various embodiments, may comprise one or more device drivers installed on the host device 114, logic hardware or firmware of the cache 102 and/or the backing store 118, a combination of one or more device drivers and logic hardware or firmware, or the like.

In a further embodiment, instead of being connected directly to the host device 114 as DAS, the cache 102 and/or the backing store 118 may be connected to the host device 114 over a data network. For example, the cache 102 and/or the backing store 118 may include a storage area network ("SAN") storage device, a network attached storage ("NAS") device, a network share, or the like. In one embodiment, the system 100 may include a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host device 114 and the cache 102 and/or the backing store 118.

In one embodiment, at least the cache 102 is connected directly to the host device 114 as a DAS device. In a further embodiment, the cache 102 is directly connected to the host device 114 as a DAS device and the backing store 118 is directly connected to the cache 102. For example, the cache 102 may be connected directly to the host device 114, and the backing store 118 may be connected directly to the cache 102 using a direct, wire-line connection, such as a PCI express bus, an SATA bus, a USB connection, an IEEE 1394 connection, an eSATA connection, a proprietary direct connection, an external electrical or optical bus extension or bus networking solution such as Infiniband or PCIe-AS, or the like. One of skill in the art, in light of this disclosure, will recognize other arrangements and configurations of the host device 114, the cache 102, and the backing store 118 suitable for use in the system 100.

The system 100 includes the host device 114 in communication with the cache 102 and the backing store 118 through the direct cache module 116. A host device 114 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like.

In the depicted embodiment, the host device 114 is in communication with the direct cache module 116. The direct cache module 116, in general, receives or otherwise detects read and write requests from the host device 114 directed to the backing store 118 and manages the caching of data in the cache 102, the destaging of cached data to the backing store 118, the grooming of data in the cache 102, and/or the eviction of data from the cache 102. In one embodiment, the direct cache module 116 comprises a software application, file system filter driver, combination of filter drivers, or the like on the host device 114.

Figure 1B:
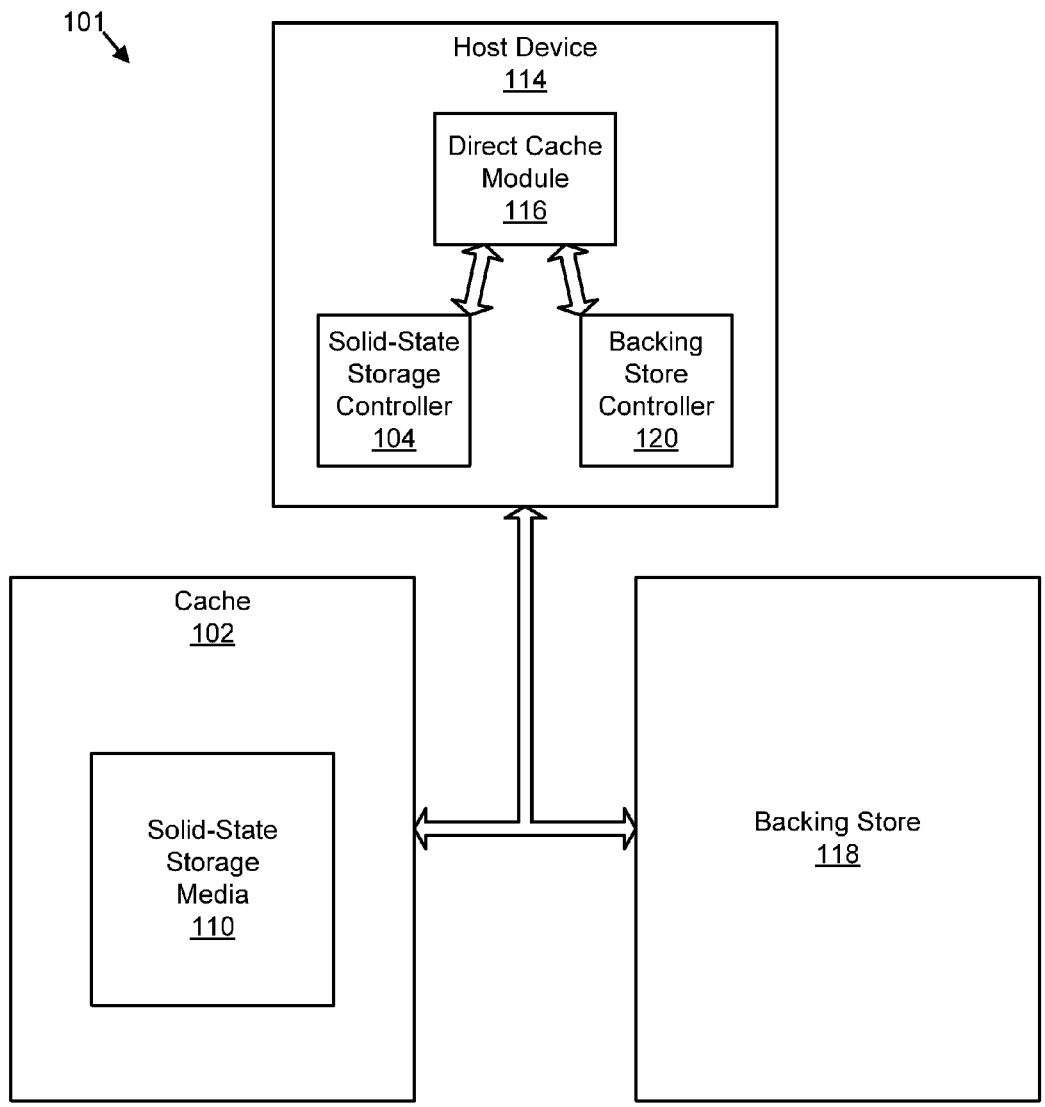
FIG. 1B is a schematic block diagram illustrating another embodiment of a system for managing eviction of data in accordance with the present invention.

In another embodiment, the direct cache module 116 comprises one or more storage controllers, such as the solid-state storage controller 104 of the cache 102 and/or the backing store controller 120 of the backing store 118. FIG. 1B depicts a system 101 that is substantially similar to the system 100 of FIG. 1A, but with the storage controller 104 and the backing store controller 120 integrated with the direct cache module 116 as device drivers and/or filter drivers on the host device 114. The storage controller 104 and the backing store controller 120 may be integrated with the direct cache module 116 as device drivers on the host device 114, as dedicated hardware logic circuits or firmware of the cache 102 and/or the backing store 118, as a combination of one or more device drivers and dedicated hardware, or the like. In a further embodiment, the direct cache module 116 comprises a combination of one or more software drivers of the host device 114 and one or more storage controllers, or the like. The direct cache module 116, in various software, hardware, and combined software and hardware embodiments, may generally be referred to as a cache controller.

In one embodiment, the host device 114 loads one or more device drivers for the cache 102 and/or the backing store 118 and the direct cache module 116 communicates with the one or more device drivers on the host device 114. As described above, in certain embodiments, the solid-state storage controller 104 of the cache 102 and/or the backing store controller 120 may comprise device drivers on the host device 114. In another embodiment, the direct cache module 116 may communicate directly with a hardware interface of the cache 102 and/or the backing store 118. In a further embodiment, the direct cache module 116 may be integrated with the cache 102 and/or the backing store 118.

In one embodiment, the cache 102 and/or the backing store 118 have block device interfaces that support block device commands. For example, the cache 102 and/or the backing store 118 may support the standard block device interface, the ATA interface standard, the ATA Packet Interface ("ATAPI") standard, the small computer system interface ("SCSI") standard, and/or the Fibre Channel standard which are maintained by the InterNational Committee for Information Technology Standards ("INCITS"). The direct cache module 116 may interact with the cache 102 and/or the backing store 118 using block device commands to read, write, and clear (or trim) data. In one embodiment, the solid-state storage controller 104 and/or the backing store controller 120 provide block device interfaces to the direct cache module 116.

In one embodiment, the direct cache module 116 serves as a proxy for the backing store 118, receiving read and write requests for the backing store 118 directly from the host device 114. The direct cache module 116 may represent itself to the host device 114 as a storage device having a capacity similar to and/or matching the capacity of the backing store 118. The direct cache module 116, upon receiving a read request or write request from the host device 114, in one embodiment, fulfills the request by caching write data in the cache 102 or by retrieving read data from one of the cache 102 and the backing store 118 and returning the read data to the host device 114.

Data caches are typically organized into cache lines which divide up the physical capacity of the cache, these cache lines may be divided into several sets. A cache line is typically larger than a block or sector of a backing store associated with a data cache, to provide for prefetching of additional blocks or sectors and to reduce cache misses and increase the cache hit rate. Data caches also typically evict an entire, fixed size, cache line at a time to make room for newly requested data in satisfying a cache miss. Data caches may be direct mapped, fully associative, N-way set associative, or the like.

In a direct mapped cache, each block or sector of a backing store has a one-to-one mapping to a cache line in the direct mapped cache. For example, if a direct mapped cache has T number of cache lines, the backing store associated with the direct mapped cache may be divided into T sections, and the direct mapped cache caches data from a section exclusively in the cache line corresponding to the section. Because a direct mapped cache always caches a block or sector in the same location or cache line, the mapping between a block or sector address and a cache line can be a simple manipulation of an address of the block or sector.

In a fully associative cache, any cache line can store data from any block or sector of a backing store. A fully associative cache typically has lower cache miss rates than a direct mapped cache, but has longer hit times (i.e., it takes longer to locate data in the cache) than a direct mapped cache. To locate data in a fully associative cache, either cache tags of the entire cache can be searched, a separate cache index can be used, or the like.

In an N-way set associative cache, each sector or block of a backing store may be cached in any of a set of N different cache lines. For example, in a 2-way set associative cache, either of two different cache lines may cache data for a sector or block. In an N-way set associative cache, both the cache and the backing store are typically divided into sections or sets, with one or more sets of sectors or blocks of the backing store assigned to a set of N cache lines. To locate data in an N-way set associative cache, a block or sector address is typically mapped to a set of cache lines, and cache tags of the set of cache lines are searched, a separate cache index is searched, or the like to determine which cache line in the set is storing data for the block or sector. An N-way set associative cache typically has miss rates and hit rates between those of a direct mapped cache and those of a fully associative cache.

The cache 102, in one embodiment, may have characteristics of both a directly mapped cache and a fully associative cache. A logical address space of the cache 102, in one embodiment, is directly mapped to an address space of the backing store 118 while the physical storage media 110 of the cache 102 is fully associative with regard to the backing store 118. In other words, each block or sector of the backing store 118, in one embodiment, is directly mapped to a single logical address of the cache 102 while any portion of the physical storage media 110 of the cache 102 may store data for any block or sector of the backing store 118. In one embodiment, a logical address is an identifier of a block of data and is distinct from a physical address of the block of data, but may be mapped to the physical address of the block of data. Examples of logical addresses, in various embodiments, include logical block addresses ("LBAs"), logical identifiers, object identifiers, pointers, references, and the like.

Instead of traditional cache lines, in one embodiment, the cache 102 has logical or physical cache data blocks associated with logical addresses that are equal in size to a block or sector of the backing store 118. In a further embodiment, the cache 102 caches ranges and/or sets of ranges of blocks or sectors for the backing store 118 at a time, providing dynamic or variable length cache line functionality. A range or set of ranges of blocks or sectors, in a further embodiment, may include a mixture of contiguous and/or noncontiguous blocks. For example, the cache 102, in one embodiment, supports block device requests that include a mixture of contiguous and/or noncontiguous blocks and that may include "holes" or intervening blocks that the cache 102 does not cache or otherwise store.

In one embodiment, one or more groups of logical addresses of the cache 102 are directly mapped to corresponding logical addresses of the backing store 118. Directly mapping logical addresses of the cache 102 to logical addresses of the backing store 118, in one embodiment, provides a one-to-one relationship between the logical addresses of the backing store 118 and the logical addresses of the cache 102. Directly mapping logical addresses of the cache 102 to the logical or physical address space of the backing store 118, in one embodiment, precludes the use of an extra translation layer in the direct cache module 116, such as the use of cache tags, a cache index, the maintenance of a translation data structure, or the like. In one embodiment, while the logical address space of the cache 102 may be larger than a logical address space of the backing store 118, both logical address spaces include at least logical addresses 0-N. In a further embodiment, at least a portion of the logical address space of the cache 102 represents or appears as the logical address space of the backing store 118 to a client, such as the host device 114.

Alternatively, in certain embodiments where physical blocks or sectors of the backing store 118 are directly accessible using physical addresses, at least a portion of logical addresses in a logical address space of the cache 102 may be mapped to physical addresses of the backing store 118. At least a portion of the logical address space of the cache 102, in one embodiment, may correspond to the physical address space of the backing store 118. At least a subset of the logical addresses of the cache 102, in this embodiment, is directly mapped to corresponding physical addresses of the backing store 118.

In one embodiment, the logical address space of the cache 102 is a sparse address space that is either as large as or is larger than the physical storage capacity of the cache 102. This allows the backing store 118 to have a larger storage capacity than the cache 102, while maintaining a direct mapping between the logical addresses of the cache 102 and logical or physical addresses of the backing store 118. The sparse logical address space may be thinly provisioned, in one embodiment. In a further embodiment, as the direct cache module 116 writes data to the cache 102 using logical addresses, the cache 102 directly maps the logical addresses to distinct physical addresses or locations on the solid-state storage media 110 of the cache 102, such that the physical addresses or locations of data on the solid-state storage media 110 are fully associative with the backing store 118.

In one embodiment, the direct cache module 116 and/or the cache 102 use the same mapping structure to map addresses (either logical or physical) of the backing store 118 to logical addresses of the cache 102 and to map logical addresses of the cache 102 to locations/physical addresses of a block or sector (or range of blocks or sectors) on the physical solid-state storage media 110. In one embodiment, using a single mapping structure for both functions eliminates the need for a separate cache map, cache index, cache tags, or the like, decreasing access times of the cache 102.

Once the direct cache module 116 has destaged dirty data from the cache 102, the data is clean and the direct cache module 116 may clear, trim, replace, expire, and/or evict the data from the cache 102 and the physical addresses and associated physical storage media 110 may be freed to store data for other logical addresses. In one embodiment, as described above, the solid state storage controller 104 stores data at physical addresses using a log-based, append-only writing structure such that data evicted from the cache 102 or overwritten by a subsequent write request invalidates other data in the log. Consequently, a grooming or garbage collection process recovers the physical capacity of the invalid data in the log. One embodiment of the log-based, append only writing structure is logically ring-like data structure, as new data is appended to the log-based writing structure, previously used physical capacity is reused in a circular, theoretically infinite manner.

In one embodiment, the direct cache module 116 selects data of the cache 102 for grooming and/or evicting based on a grooming cost for the data. For example, the direct cache module 116 may select a region of the cache 102 periodically and examine a grooming cost for the selected region. In another embodiment, the direct cache module 116 may maintain a grooming candidate set of regions with low grooming costs and defines, identifies, or otherwise designates a low cost region from the grooming candidate set for grooming. Selecting data of the cache 102 for grooming and/or evicting based on periodically determined grooming costs and a grooming candidate set, such as an ordered set of the N lowest grooming costs, in certain embodiments, may lower processing overhead and determination times compared to determining a cost for each block or region of data at each grooming decision point. The direct cache module 116, in various embodiments, may recover storage capacity of the low cost region by invalidating, evicting, trimming, or otherwise clearing certain data from the low cost region and/or by copying certain data forward on the log-based writing structure to retain the data, such as dirty write data, frequently accessed data, or the like.

In one embodiment, the cache 102 may store a plurality of independent cache units, each of which cache data for different cache clients, different backing stores 118, or the like. For example, the solid-state storage controller 104 may manage multiple virtual storage units ("VSUs"), one or more of which may be configured as cache units, to cache data for clients executing on the host device 114, over a data network, or the like. Each VSU is a data structure maintained by the solid-state storage controller 104 to logically divide the solid-state storage device of the cache 102 into independent storage units or containers, so that the solid-state storage device of the cache 102 may be shared between multiple clients. VSUs may serve as cache units, object stores, general-purpose storage units, swap/memory extension units, sparse address space units, or the like.

Each VSU may have different properties and attributes, such as different use cases, different quality-of-service ("QoS") levels, different priority levels, different logical address space types (e.g. sparse logical address space, contiguous logical address space), different replication attributes, different logical and/or physical storage capacities, or the like. VSUs, in certain embodiments, may be independently created, deleted, and managed. The solid-state storage controller 104 may store metadata defining attributes of the VSUs in volatile and/or nonvolatile storage of the host device 114, the solid-state storage device 102, the backing store 118, or the like.

While each VSU may be logically independent, in one embodiment, data stored in different VSUs is intermingled in the solid-state storage media 110. For example, the solid-state storage media 110 may store data using a sequential, append-only, log-based writing structure, and the solid-state storage controller 104 may write data of several VSUs sequentially to an append point of the log-based writing structure as the direct cache module 116 receives data to cache. Because data from each VSU or VSU cache unit, in certain embodiments, is written to the same append point, the data from different VSUs may be dispersed throughout the log-based writing structure on the solid-state storage media 110 of the cache 102.

By logically separating the data from different VSUs and/or VSU cache units but intermingling the data physically, data from each VSU receives the same data protection characteristics. For example, as described in greater detail below with regard to FIG. 3, the solid-state storage controller 104, the write data pipeline 106, and the read data pipeline 108 provide certain data protection characteristics for data, such as error correction, garbage collection or storage capacity recovery, power cut or power loss protection, or the like to protect the integrity of data on the solid-state storage media 110. The solid-state storage controller 104 applies these data protection characteristics to data regardless of which VSU logically corresponds to the data.

In embodiments where the cache 102 comprises multiple VSUs or other cache units, regions of the solid-state storage media 110 may store data for a plurality of cache units, intermingled in a log-based writing structure of the cache 102 or the like. The direct cache module 116, in certain embodiments, accounts for one or more attributes of the cache units in the grooming cost for a region. Attributes of a cache unit may include a relative priority of cache units, allocated storage capacities for cache units, quality-of-service levels for cache units, or the like.

For example, by accounting for cache unit attributes in grooming costs, the direct cache module 116 may select regions for grooming, garbage collection, and/or eviction that have more data from cache units with lower priorities than other cache units, that have reached or exceeded an allocated storage capacity, that have a lower quality-of-service level than other cache units, or the like. In this manner the direct cache module 116 may determine grooming costs to maintain a relative priority of cache units, allocated storage capacities for cache units, quality-of-service levels for cache units, or the like by selectively evicting data from storage regions based on the determined grooming costs.

Solid-State Storage Device

Figure 2:
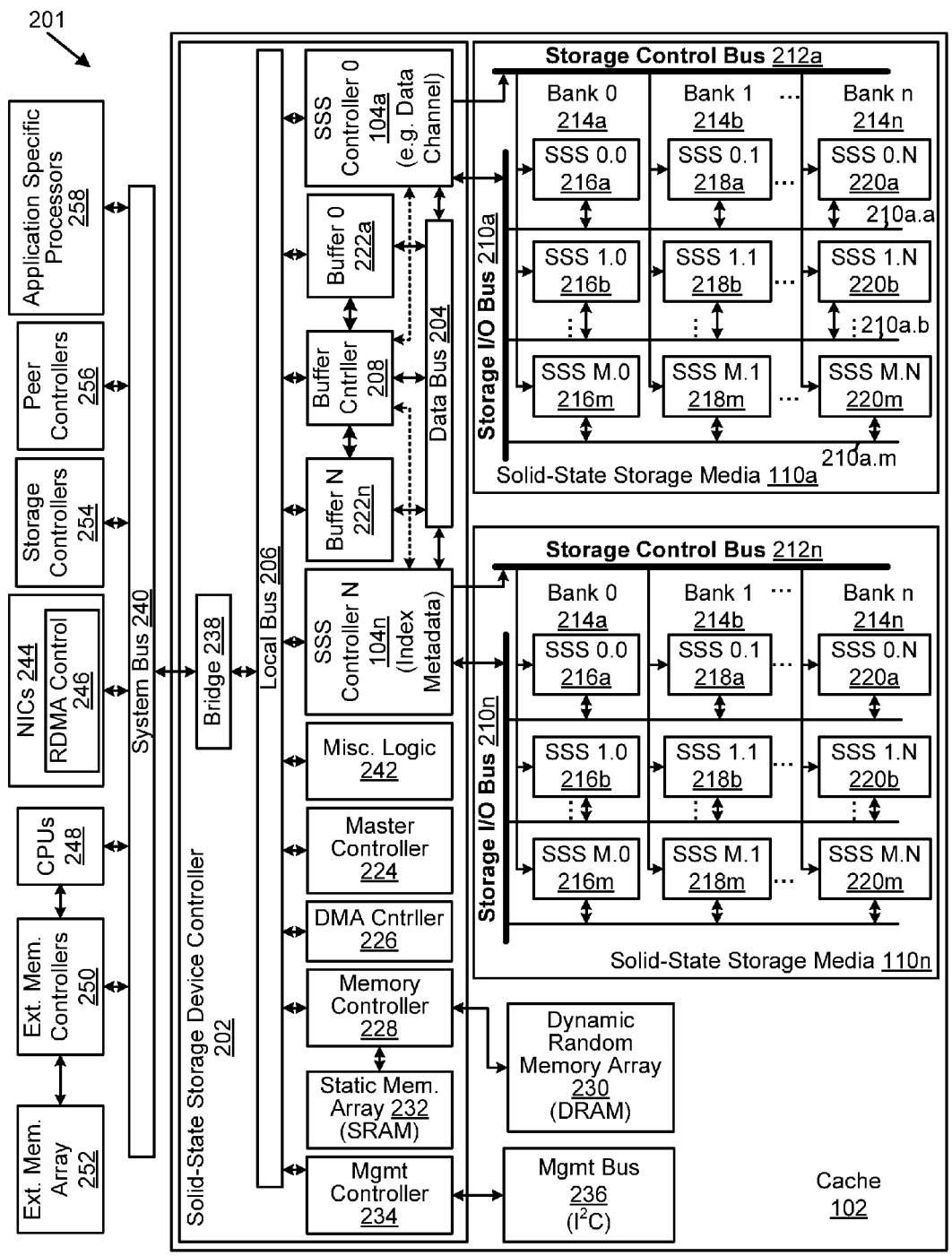
FIG. 2 is a schematic block diagram illustrating one embodiment of a solid-state storage device controller in a cache device in accordance with the present invention.

FIG. 2 is a schematic block diagram illustrating one embodiment 201 of a solid-state storage device controller 202 that includes a write data pipeline 106 and a read data pipeline 108 in a cache 102 in accordance with the present invention. The solid-state storage device controller 202 may be embodied as hardware, as software, or as a combination of hardware and software.

The solid-state storage device controller 202 may include a number of solid-state storage controllers 0-N 104a-n, each controlling solid-state storage media 110. In the depicted embodiment, two solid-state controllers are shown: solid-state controller 0 104a and solid-state storage controller N 104n, and each controls solid-state storage media 110a-n. In the depicted embodiment, solid-state storage controller 0 104a controls a data channel so that the attached solid-state storage media 110a stores data. Solid-state storage controller N 104n controls an index metadata channel associated with the stored data and the associated solid-state storage media 110n stores index metadata. In an alternate embodiment, the solid-state storage device controller 202 includes a single solid-state controller 104a with a single solid-state storage media 110a. In another embodiment, there are a plurality of solid-state storage controllers 104a-n and associated solid-state storage media 110a-n. In one embodiment, one or more solid-state controllers 104a-104n-1, coupled to their associated solid-state storage media 110a-110n-1, control data while at least one solid-state storage controller 104n, coupled to its associated solid-state storage media 110n, controls index metadata.

In one embodiment, at least one solid-state controller 104 is field-programmable gate array ("FPGA") and controller functions are programmed into the FPGA. In a particular embodiment, the FPGA is a Xilinx® FPGA. In another embodiment, the solid-state storage controller 104 comprises components specifically designed as a solid-state storage controller 104, such as an application-specific integrated circuit ("ASIC") or custom logic solution. Each solid-state storage controller 104 typically includes a write data pipeline 106 and a read data pipeline 108, which are describe further in relation to FIG. 3. In another embodiment, at least one solid-state storage controller 104 is made up of a combination FPGA, ASIC, and custom logic components.

Solid-State Storage

The solid-state storage media 110 is an array of non-volatile solid-state storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the solid-state storage media 110, data cannot be read from the solid-state storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A solid-state storage element (e.g. SSS 0.0 216a) is typically configured as a chip (a package of one or more dies) or a die on a circuit board. As depicted, a solid-state storage element (e.g. 216a) operates independently or semi-independently of other solid-state storage elements (e.g. 218a) even if these several elements are packaged together in a chip package, a stack of chip packages, or some other package element. As depicted, a column of solid-state storage elements 216, 218, 220 is designated as a bank 214. As depicted, there may be "n" banks 214a-n and "m" solid-state storage elements 216a-m, 218a-m, 220a-m per bank in an array of n×m solid-state storage elements 216, 218, 220 in a solid-state storage media 110. In one embodiment, a solid-state storage media 110a includes twenty solid-state storage elements per bank (e.g. 216a-m in bank 214a, 218 a-m in bank 214b, 220a-m in bank 214n, where m=22) with eight banks (e.g. 214a-n where n=8) and a solid-state storage media 110n includes two solid-state storage elements (e.g. 216a-m where m=2) per bank 214 with one bank 214a. There is no requirement that two solid-state storage media 110a, 110n have the same number of solid-state storage elements and/or same number of banks 214. In one embodiment, each solid-state storage element 216, 218, 220 is comprised of a single-level cell ("SLC") devices. In another embodiment, each solid-state storage element 216, 218, 220 is comprised of multi-level cell ("MLC") devices.

In one embodiment, solid-state storage elements for multiple banks that share a common storage I/O bus 210a row (e.g. 216b, 218b, 220b) are packaged together. In one embodiment, a solid-state storage element 216, 218, 220 may have one or more dies per chip with one or more chips stacked vertically and each die may be accessed independently. In another embodiment, a solid-state storage element (e.g. SSS 0.0 216a) may have one or more virtual dies per die and one or more dies per chip and one or more chips stacked vertically and each virtual die may be accessed independently. In another embodiment, a solid-state storage element SSS 0.0 216a may have one or more virtual dies per die and one or more dies per chip with some or all of the one or more dies stacked vertically and each virtual die may be accessed independently.

In one embodiment, two dies are stacked vertically with four stacks per group to form eight storage elements (e.g. SSS 0.0-SSS 0.8) 216a-220a, each in a separate bank 214a-n. In another embodiment, 20 storage elements (e.g. SSS 0.0-SSS 20.0) 216 form a virtual bank 214a so that each of the eight virtual banks has 20 storage elements (e.g. SSS0.0-SSS 20.8). Data is sent to the solid-state storage media 110 over the storage I/O bus 210 to all storage elements of a particular group of storage elements (SSS 0.0-SSS 0.8) 216a, 218a, 220a. The storage control bus 212a is used to select a particular bank (e.g. Bank-0 214a) so that the data received over the storage I/O bus 210 connected to all banks 214 is written just to the selected bank 214a.

In certain embodiments, the storage control bus 212 and storage I/O bus 210 are used together by the solid-state controller 104 to communicate addressing information, storage element command information, and data to be stored. Those of skill in the art recognize that this address, data, and command information may be communicated using one or the other of these buses 212, 210, or using separate buses for each type of control information. In one embodiment, addressing information, storage element command information, and storage data travel on the storage I/O bus 210 and the storage control bus 212 carries signals for activating a bank as well as identifying whether the data on the storage I/O bus 210 lines constitute addressing information, storage element command information, or storage data.

For example, a control signal on the storage control bus 212 such as "command enable" may indicate that the data on the storage I/O bus 210 lines is a storage element command such as program, erase, reset, read, and the like. A control signal on the storage control bus 212 such as "address enable" may indicate that the data on the storage I/O bus 210 lines is addressing information such as erase block identifier, page identifier, and optionally offset within the page within a particular storage element. Finally, an absence of a control signal on the storage control bus 212 for both "command enable" and "address enable" may indicate that the data on the storage I/O bus 210 lines is storage data that is to be stored on the storage element at a previously addressed erase block, physical page, and optionally offset within the page of a particular storage element.

In one embodiment, the storage I/O bus 210 is comprised of one or more independent I/O buses ("IIOBa-m" comprising 210a.a-m, 210n.a-m) wherein the solid-state storage elements within each row share one of the independent I/O buses across each solid-state storage element 216, 218, 220 in parallel so that all banks 214 are accessed simultaneously. For example, one HOB 210a.a of the storage I/O bus 210 may access a first solid-state storage element 216a, 218a, 220a of each bank 214a-n simultaneously. A second HOB 210a.b of the storage I/O bus 210 may access a second solid-state storage element 216b, 218b, 220b of each bank 214a-n simultaneously. Each row of solid-state storage elements 216, 218, 220 is accessed simultaneously. In one embodiment, where solid-state storage elements 216, 218, 220 are multi-level (physically stacked), all physical levels of the solid-state storage elements 216, 218, 220 are accessed simultaneously. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214a-n are independently selected using the storage control bus 212. In one embodiment, a bank 214 is selected using a chip enable or chip select. Where both chip select and chip enable are available, the storage control bus 212 may select one level of a multi-level solid-state storage element 216, 218, 220 using either of the chip select signal and the chip enable signal. In other embodiments, other commands are used by the storage control bus 212 to individually select one level of a multi-level solid-state storage element 216, 218, 220. Solid-state storage elements 216, 218, 220 may also be selected through a combination of control and of address information transmitted on storage I/O bus 210 and the storage control bus 212.

In one embodiment, each solid-state storage element 216, 218, 220 is partitioned into erase blocks and each erase block is partitioned into pages. A typical page is 2000 bytes ("2 kB"). In one example, a solid-state storage element (e.g. SSS0.0) includes two registers and can program two pages so that a two-register solid-state storage element has a page size of 4 kB. A single bank 214a of 20 solid-state storage elements 216a-m would then have an 80 kB capacity of pages accessed with the same address going out of the storage I/O bus 210.

This group of pages in a bank 214 of solid-state storage elements 216, 218, 220 of 80 kB may be called a logical or virtual page. Similarly, an erase block of each storage element 216a-m of a bank 214a may be grouped to form a logical erase block. In one embodiment, erasing a logical erase block causes a physical erase block ("PEB") of each storage element 216a-m of a bank 214a to be erased. In one embodiment, an erase block of pages within a solid-state storage element 216, 218, 220 is erased when an erase command is received within a solid-state storage element 216, 218, 220. In another embodiment, a single physical erase block on each storage element (e.g. SSS M.N) collectively forms a logical erase block for the solid-state storage media 110a. In such an embodiment, erasing a logical erase block comprises erasing an erase block at the same address within each storage element (e.g. SSS M.N) in the solid-state storage media 110a. Whereas the size and number of erase blocks, pages, planes, or other logical and physical divisions within a solid-state storage element 216, 218, 220 may change over time with advancements in technology, it is to be expected that many embodiments consistent with new configurations are possible and are consistent with the general description herein.

In one embodiment, data is written in packets to the storage elements. The solid-state controller 104 uses the storage I/O bus 210 and storage control bus 212 to address a particular bank 214, storage element 216, 218, 220, physical erase block, physical page, and optionally offset within a physical page for writing the data packet. In one embodiment, the solid-state controller 104 sends the address information for the data packet by way of the storage I/O bus 210 and signals that the data on the storage I/O bus 210 is address data by way of particular signals set on the storage control bus 212. The solid-state controller 104 follows the transmission of the address information with transmission of the data packet of data that is to be stored. The physical address contains enough information for the solid-state storage element 216, 218, 220 to direct the data packet to the designated location within the page.

In one embodiment, the storage I/O bus 210*a.a* connects to each storage element in a row of storage elements (e.g. SSS 0.0-SSS 0.N 216*a*, 218*a*, 220*a*). In such an embodiment, the solid-state controller 104*a* activates a desired bank 214*a* using the storage control bus 212*a*, such that data on storage I/O bus 210*a.a* reaches the proper page of a single storage element (e.g. SSS 0.0 216*a*).

In addition, in certain embodiments, the solid-state controller 104*a* simultaneously activates the same bank 214*a* using the storage control bus 212*a*, such that different data (a different data packet) on storage I/O bus 210*a.b* reaches the proper page of a single storage element on another row (e.g. SSS 1.0 216*b*). In this manner, multiple physical pages of multiple storage elements 216, 218, 220 may be written to simultaneously within a single bank 214 to store a logical page.

Similarly, a read command may require a command on the storage control bus 212 to select a single bank 214*a* and the appropriate page within that bank 214*a*. In one embodiment, a read command reads an entire physical page from each storage element, and because there are multiple solid-state storage elements 216, 218, 220 in parallel in a bank 214, an entire logical page is read with a read command. However, the read command may be broken into subcommands, as will be explained below with respect to bank interleave. A logical page may also be accessed in a write operation.

In one embodiment, a solid-state controller 104 may send an erase block erase command over all the lines of the storage I/O bus 210 to erase a physical erase block having a particular erase block address. In addition, the solid-state controller 104 may simultaneously activate a single bank 214 using the storage control bus 212 such that each physical erase block in the single activated bank 214 is erased as part of a logical erase block.

In another embodiment, the solid-state controller 104 may send an erase block erase command over all the lines of the storage I/O bus 210 to erase a physical erase block having a particular erase block address on each storage element 216, 218, 220 (SSS 0.0-SSS M.N). These particular physical erase blocks together may form a logical erase block. Once the address of the physical erase blocks is provided to the storage elements 216, 218, 220, the solid-state controller 104 may initiate the erase command on a bank 214*a* by bank 214*b* by bank 214*n* basis (either in order or based on some other sequence). Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, the storage controller 104 sequentially writes data on the solid-state storage media 110 in a log structured format and within one or more physical structures of the storage elements, the data is sequentially stored on the solid-state storage media 110. Sequentially writing data involves the storage controller 104 streaming data packets into storage write buffers for storage elements, such as a chip (a package of one or more dies) or a die on a circuit board. When the storage write buffers are full, the data packets are programmed to a designated virtual or logical page ("LP"). Data packets then refill the storage write buffers and, when full, the data packets are written to the next LP. The next virtual page may be in the same bank 214*a* or another bank (e.g. 214*b*). This process continues, LP after LP, typically until a virtual or logical erase block ("LEB") is filled. LPs and LEBs are described in more detail below.

In another embodiment, the streaming may continue across LEB boundaries with the process continuing, LEB after LEB. Typically, the storage controller 104 sequentially stores data packets in an LEB by order of processing. In one embodiment, where a write data pipeline 106 is used, the storage controller 104 stores packets in the order that they come out of the write data pipeline 106. This order may be a result of data segments arriving from a requesting device mixed with packets of valid data that are being read from another storage location as valid data is being recovered from another LEB during a recovery operation.

The sequentially stored data, in one embodiment, can serve as a log to reconstruct data indexes and other metadata using information from data packet headers. For example, in one embodiment, the storage controller 104 may reconstruct a storage index by reading headers to determine the data structure to which each packet belongs and sequence information to determine where in the data structure the data or metadata belongs. The storage controller 104, in one embodiment, uses physical address information for each packet and timestamp or sequence information to create a mapping between the physical locations of the packets and the data structure identifier and data segment sequence. Timestamp or sequence information is used by the storage controller 104 to replay the sequence of changes made to the index and thereby reestablish the most recent state.

In one embodiment, erase blocks are time stamped or given a sequence number as packets are written and the timestamp or sequence information of an erase block is used along with information gathered from container headers and packet headers to reconstruct the storage index. In another embodiment, timestamp or sequence information is written to an erase block when the erase block is recovered.

In a read, modify, write operation, data packets associated with the logical structure are located and read in a read operation. Data segments of the modified structure that have been modified are not written to the location from which they are read. Instead, the modified data segments are again converted to data packets and then written to the next available location in the virtual page currently being written. Index entries for the respective data packets are modified to point to the packets that contain the modified data segments. The entry or entries in the index for data packets associated with the same logical structure that have not been modified will include pointers to original location of the unmodified data packets. Thus, if the original logical structure is maintained, for example to maintain a previous version of the logical structure, the original logical structure will have pointers in the index to all data packets as originally written. The new logical structure will have pointers in the index to some of the original data packets and pointers to the modified data packets in the virtual page that is currently being written.

In a copy operation, the index includes an entry for the original logical structure mapped to a number of packets stored on the solid-state storage media 110. When a copy is made, a new logical structure is created and a new entry is created in the index mapping the new logical structure to the original packets. The new logical structure is also written to the solid-state storage media 110 with its location mapped to the new entry in the index. The new logical structure packets may be used to identify the packets within the original logical structure that are referenced in case changes have been made in the original logical structure that have not been propagated to the copy and the index is lost or corrupted. In another embodiment, the index includes a logical entry for a logical block.

Beneficially, sequentially writing packets facilitates a more even use of the solid-state storage media 110 and allows the solid-storage device controller 202 to monitor storage hot spots and level usage of the various virtual pages in the solid-state storage media 110. Sequentially writing packets also facilitates a powerful, efficient garbage collection system, which is described in detail below. One of skill in the art will recognize other benefits of sequential storage of data packets.

The system 100 may comprise a log-structured storage system or log-structured array similar to a log-structured file system and the order that data is stored may be used to recreate an index. Typically an index that includes a logical-to-physical mapping is stored in volatile memory. If the index is corrupted or lost, the index may be reconstructed by addressing the solid-state storage media 110 in the order that the data was written. Within a logical erase block ("LEB"), data is typically stored sequentially by filling a first logical page, then a second logical page, etc. until the LEB is filled. The solid-state storage controller 104 then chooses another LEB and the process repeats. By maintaining an order that the LEBs were written to and by knowing that each LEB is written sequentially, the index can be rebuilt by traversing the solid-state storage media 110 in order from beginning to end. In other embodiments, if part of the index is stored in non-volatile memory, such as on the solid-state storage media 110, the solid-state storage controller 104 may only need to replay a portion of the solid-state storage media 110 to rebuild a portion of the index that was not stored in non-volatile memory. One of skill in the art will recognize other benefits of sequential storage of data packets.

Solid-State Storage Device Controller

In various embodiments, the solid-state storage device controller 202 also includes a data bus 204, a local bus 206, a buffer controller 208, buffers 0-N 222a-n, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the host device 114 or may be other devices.

In one embodiment, the solid-state storage controller(s) 104 communicate data to the solid-state storage media 110 over a storage I/O bus 210. In a certain embodiment where the solid-state storage is arranged in banks 214 and each bank 214 includes multiple storage elements 216, 218, 220 accessible in parallel, the storage I/O bus 210 comprises an array of busses, one for each row of storage elements 216, 218, 220 spanning the banks 214. As used herein, the term "storage I/O bus" may refer to one storage I/O bus 210 or an array of data independent busses 204. In one embodiment, each storage I/O bus 210 accessing a row of storage elements (e.g. 216a, 218a, 220a) may include a logical-to-physical mapping for storage divisions (e.g. erase blocks) accessed in a row of storage elements 216a, 218a, 220a. This mapping allows a logical address mapped to a physical address of a storage division to be remapped to a different storage division if the first storage division fails, partially fails, is inaccessible, or has some other problem. Remapping is explained further in relation to the remapping module 430 of FIG. 4.

Data may also be communicated to the solid-state storage controller(s) 104 from a requesting device 155 through the system bus 240, bridge 238, local bus 206, buffer(s) 222, and finally over a data bus 204. The data bus 204 typically is connected to one or more buffers 222a-n controlled with a buffer controller 208. The buffer controller 208 typically controls transfer of data from the local bus 206 to the buffers 222 and through the data bus 204 to the pipeline input buffer 306 and output buffer 330. The buffer controller 208 typically controls how data arriving from a requesting device 155 can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically the data is transferred from the local bus 206 to one or more data buffers 222 as directed by the master controller 224 and the buffer controller 208. The data then flows out of the buffer(s) 222 to the data bus 204, through a solid-state controller 104, and on to the solid-state storage media 110 such as NAND flash or other storage media. In one embodiment, data and associated out-of-band metadata ("metadata") arriving with the data is communicated using one or more data channels comprising one or more solid-state storage controllers 104a-104n-1 and associated solid-state storage media 110a-110n-1 while at least one channel (solid-state storage controller 104n, solid-state storage media 110n) is dedicated to in-band metadata, such as index information and other metadata generated internally to the cache 102.

The local bus 206 is typically a bidirectional bus or set of busses that allows for communication of data and commands between devices internal to the solid-state storage device controller 202 and between devices internal to the cache 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204 and bridges 238.

The system bus 240 is typically a bus of a host device 114 or other device in which the cache 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The cache 102 may be packaged to fit internally to a device or as an externally connected device.

The solid-state storage device controller 202 includes a master controller 224 that controls higher-level functions within the cache 102. The master controller 224, in various embodiments, controls data flow by interpreting requests, directs creation of indexes to map identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. The master controller 224 may be embodied as hardware, as software, or as a combination of hardware and software. One skilled in the art will recognize many embodiments for the master controller 224.

In one embodiment, where the storage controller 152/solid-state storage device controller 202 manages multiple data storage devices/solid-state storage media 110*a-n*, the master controller 224 divides the work load among internal controllers, such as the solid-state storage controllers 104*a-n*. For example, the master controller 224 may divide a data structure to be written to the data storage devices (e.g. solid-state storage media 110*a-n*) so that a portion of the data structure is stored on each of the attached data storage devices. This feature is a performance enhancement allowing quicker storage and access to a data structure. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224 emulates block storage such that a host device 114 or other device connected to the storage device/cache 102 views the storage device/cache 102 as a block storage device and sends data to specific physical or logical addresses in the storage device/cache 102. The master controller 224 then divides up the blocks and stores the data blocks. The master controller 224 then maps the blocks and physical or logical address sent with the block to the actual locations determined by the master controller 224. The mapping is stored in the index. Typically, for block emulation, a block device application program interface ("API") is provided in a driver in the host device 114, or other device wishing to use the storage device/cache 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a host device 114 may have access to a computer network through an I/O memory driver using a standard stack API and operating in conjunction with NICs 244.

In one embodiment, the master controller 224 is also a redundant array of independent drive ("RAID") controller. Where the data storage device/cache 102 is networked with one or more other data storage devices, the master controller 224 may be a RAID controller for single tier RAID, multi-tier RAID, progressive RAID, etc. The master controller 224 may also allow some objects and other data structures to be stored in a RAID array and other data structures to be stored without RAID. In another embodiment, the master controller 224 may be a distributed RAID controller element. In another embodiment, the master controller 224 may comprise many RAID, distributed RAID, and other functions as described elsewhere.

In one embodiment, the master controller 224 coordinates with single or redundant network managers (e.g. switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via a computer network) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/cache 102 may appear as a storage device connected through a SCSI bus, Internet SCSI ("iSCSI"), fiber channel, etc. Meanwhile the storage device/cache 102 may autonomously manage objects or other data structures and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/cache 102 to be partitioned into multiple virtual devices and allows partition-based media encryption. In yet another embodiment, the master controller 224 supports a solid-state storage controller 104 with advanced, multi-bit ECC correction. One of skill in the art will recognize other features and functions of a master controller 224 in a storage controller 152, or more specifically in a cache 102.

In one embodiment, the solid-state storage device controller 202 includes a memory controller 228 which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the logical-to-physical index is stored in memory 230, 232 and then periodically off-loaded to a channel of the solid-state storage media 110n or other non-volatile memory. One of skill in the art will recognize other uses and configurations of the memory controller 228, dynamic memory array 230, and static memory array 232.

In one embodiment, the solid-state storage device controller 202 includes a DMA controller 226 that controls DMA operations between the storage device/cache 102 and one or more external memory controllers 250 and associated external memory arrays 252 and CPUs 248. Note that the external memory controllers 250 and external memory arrays 252 are called external because they are external to the storage device/cache 102. In addition the DMA controller 226 may also control RDMA operations with requesting devices through a NIC 244 and associated RDMA controller 246.

In one embodiment, the solid-state storage device controller 202 includes a management controller 234 connected to a management bus 236. Typically the management controller 234 manages environmental metrics and status of the storage device/cache 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically the management bus 236 is connected to the various components within the storage device/cache 102. The management controller 234 may communicate alerts, interrupts, etc. over the local bus 206 or may include a separate connection to a system bus 240 or other bus. In one embodiment the management bus 236 is an Inter-Integrated Circuit ("I²C") bus. One of skill in the art will recognize other related functions and uses of a management controller 234 connected to components of the storage device/cache 102 by a management bus 236.

In one embodiment, the solid-state storage device controller 202 includes miscellaneous logic 242 that may be customized for a specific application. Typically where the solid-state device controller 202 or master controller 224 is/are configured using a FPGA or other configurable controller, custom logic may be included based on a particular application, customer requirement, storage requirement, etc.

Data Pipeline

Figure 3:
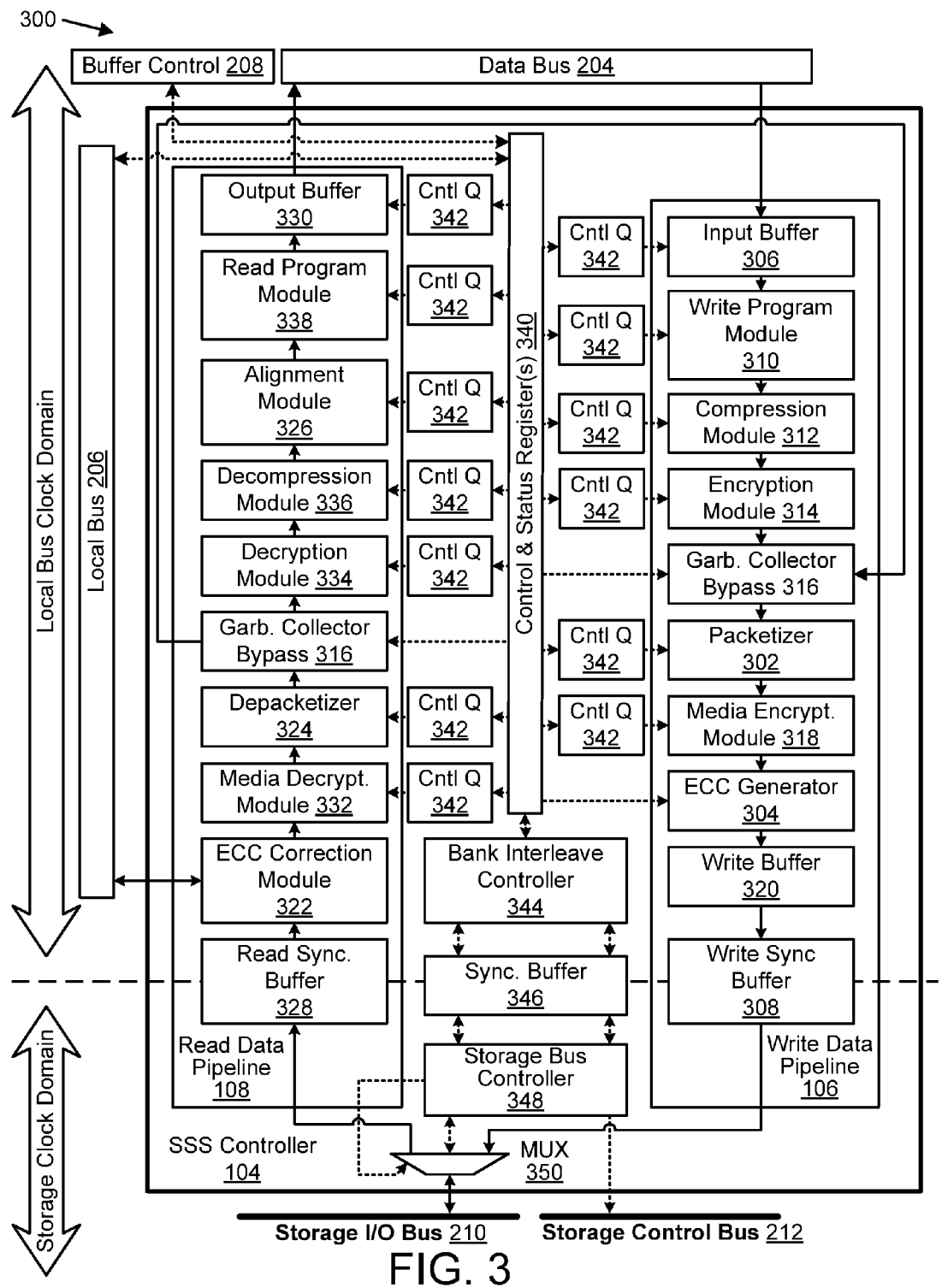
FIG. 3 is a schematic block diagram illustrating one embodiment of a solid-state storage controller with a write data pipeline and a read data pipeline in a solid-state storage device in accordance with the present invention.

FIG. 3 is a schematic block diagram illustrating one embodiment 300 of a solid-state storage controller 104 with a write data pipeline 106 and a read data pipeline 108 in a cache 102 in accordance with the present invention. The embodiment 300 includes a data bus 204, a local bus 206, and buffer control 208, which are substantially similar to those described in relation to the solid-state storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The solid-state storage controller 104 may also include control and status registers 340 and control queues 342, a bank interleave controller 344, a synchronization buffer 346, a storage bus controller 348, and a multiplexer ("MUX") 350. The components of the solid-state controller 104 and associated write data pipeline 106 and read data pipeline 108 are described below. In other embodiments, synchronous solid-state storage media 110 may be used and synchronization buffers 308 328 may be eliminated.

Write Data Pipeline

The write data pipeline 106 includes a packetizer 302 that receives a data or metadata segment to be written to the solid-state storage, either directly or indirectly through another write data pipeline 106 stage, and creates one or more packets sized for the solid-state storage media 110. The data or metadata segment is typically part of a data structure such as an object, but may also include an entire data structure. In another embodiment, the data segment is part of a block of data, but may also include an entire block of data. Typically, a set of data such as a data structure is received from a computer such as the host device 114, or other computer or device and is transmitted to the cache 102 in data segments streamed to the cache 102 and/or the host device 114. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicate the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that that generates one or more error-correcting codes ("ECC") for the one or more packets received from the packetizer 302. The ECC generator 304 typically uses an error correcting algorithm to generate ECC check bits which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended and output as an encoded block of length N+S. The value of N and S are dependent upon the characteristics of the algorithm which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the solid-state storage media 110 to be extended. For example, if flash memory is used as the storage medium in the solid-state storage media 110, the flash memory may be written approximately 100,000 times without error per erase cycle. This usage limit may be extended using a robust ECC algorithm. Having the ECC generator 304 and corresponding ECC correction module 322 onboard the cache 102, the cache 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the solid-state storage device 110 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the solid-state storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments are received and processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically when the write data pipeline 106 does not include an input buffer 306, a buffering function is performed elsewhere, such as in the cache 102, but outside the write data pipeline 106, in the host device 114, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the solid-state storage media 110. The write synch buffer 308 is located at a boundary between a local clock domain and a solid-state storage clock domain and provides buffering to account for the clock domain differences. In other embodiments, synchronous solid-state storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the cache 102 prior to sending the packets to the ECC generator 304. Typically, the entire packet is encrypted, including the headers. In another embodiment, headers are not encrypted. In this document, encryption key is understood to mean a secret encryption key that is managed externally from a solid-state storage controller 104.

The media encryption module 318 and corresponding media decryption module 332 provide a level of security for data stored in the solid-state storage media 110. For example, where data is encrypted with the media encryption module 318, if the solid-state storage media 110 is connected to a different solid-state storage controller 104, cache 102, or server, the contents of the solid-state storage media 110 typically could not be read without use of the same encryption key used during the write of the data to the solid-state storage media 110 without significant effort.

In a typical embodiment, the cache 102 does not store the encryption key in non-volatile storage and allows no external access to the encryption key. The encryption key is provided to the solid-state storage controller 104 during initialization. The cache 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a host device 114, a server, key manager, or other device that manages the encryption key to be used by the solid-state storage controller 104. In another embodiment, the solid-state storage media 110 may have two or more partitions and the solid-state storage controller 104 behaves as though it was two or more solid-state storage controllers 104, each operating on a single partition within the solid-state storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the cache 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The cache 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a host device 114, a computer, key manager, or other device that holds the encryption key to be used to encrypt the data segment. In one embodiment, encryption keys are transferred to the solid-state storage controller 104 from one of a cache 102, a computer, a host device 114, or other external agent which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the cache 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the cache 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the solid-state storage media 110. For example, where data is encrypted with media encryption unique to the specific cache 102 if the solid-state storage media 110 is connected to a different solid-state storage controller 104, cache 102, or host device 114, the contents of the solid-state storage media 110 typically could not be read without use of the same encryption key used during the write of the data to the solid-state storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the cache 102 is beneficial so that the host device 114 or other devices writing data to the cache 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system typically marks packets that are no longer valid, typically because the packet is marked for deletion or has been modified and the modified data is stored in a different location. At some point, the garbage collection system determines that a particular section of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the solid-state storage controller 104. In one embodiment, the garbage collector bypass 316 is part of an autonomous garbage collector system that operates within the cache 102. This allows the cache 102 to manage data so that data is systematically spread throughout the solid-state storage media 110 to improve performance, data reliability and to avoid overuse and underuse of any one location or area of the solid-state storage media 110 and to lengthen the useful life of the solid-state storage media 110.

The garbage collector bypass 316 coordinates insertion of segments into the write data pipeline 106 with other segments being written by a host device 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 108 to fill the remainder of the virtual page in order to improve the efficiency of storage within the solid-state storage media 110 and thereby reduce the frequency of garbage collection.

In one embodiment, the write data pipeline 106 includes a write buffer 320 that buffers data for efficient write operations. Typically, the write buffer 320 includes enough capacity for packets to fill at least one virtual page in the solid-state storage media 110. This allows a write operation to send an entire page of data to the solid-state storage media 110 without interruption. By sizing the write buffer 320 of the write data pipeline 106 and buffers within the read data pipeline 108 to be the same capacity or larger than a storage write buffer within the solid-state storage media 110, writing and reading data is more efficient since a single write command may be crafted to send a full virtual page of data to the solid-state storage media 110 instead of multiple commands.

While the write buffer 320 is being filled, the solid-state storage media 110 may be used for other read operations. This is advantageous because other solid-state devices with a smaller write buffer or no write buffer may tie up the solid-state storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again this is inefficient because multiple write/program cycles are required to fill a page.

For depicted embodiment with a write buffer 320 sized larger than a virtual page, a single write command, which includes numerous subcommands, can then be followed by a single program command to transfer the page of data from the storage write buffer in each solid-state storage element 216, 218, 220 to the designated page within each solid-state storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a virtual page of data segments. One of skill in the art will recognize other write buffer 320 configurations that allow a virtual page of data to be stored prior to writing the data to the solid-state storage media 110.

In another embodiment, the write buffer 320 is sized smaller than a virtual page so that less than a page of information could be written to a storage write buffer in the solid-state storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the solid-state storage media 110 to fill the pages of a virtual page prior to programming the data. In this way a data stall in the write data pipeline 106 would not stall reading from the cache 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the solid-state storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

Read Data Pipeline

The read data pipeline 108 includes an ECC correction module 322 that determines if a data error exists in ECC blocks a requested packet received from the solid-state storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the solid-state storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the solid-state storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may directed to not operate on certain packets but pass these forward without modification. An example might be a container label that is requested during the course of a rebuild process where the header information is required for index reconstruction. Further examples include the transfer of packets of various types destined for use within the cache 102. In another embodiment, the depacketizer 324 operation may be packet type dependent.

The read data pipeline 108 includes an alignment module 326 that receives data from the depacketizer 324 and removes unwanted data. In one embodiment, a read command sent to the solid-state storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the solid-state storage media 110 prior to processing by the read data pipeline 108. The read synchronization buffer 328 is at the boundary between the solid-state storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the solid-state storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the cache 102 prior to sending the one or more requested packets to the depacketizer 324. Typically the encryption key used to decrypt data by the media decryption module 332 is identical to the encryption key used by the media encryption module 318. In another embodiment, the solid-state storage media 110 may have two or more partitions and the solid-state storage controller 104 behaves as though it was two or more solid-state storage controllers 104 each operating on a single partition within the solid-state storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a host device 114, a computer, key manager, or other device that manages the encryption key to be used by the solid-state storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The solid-state storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

Figure 4:
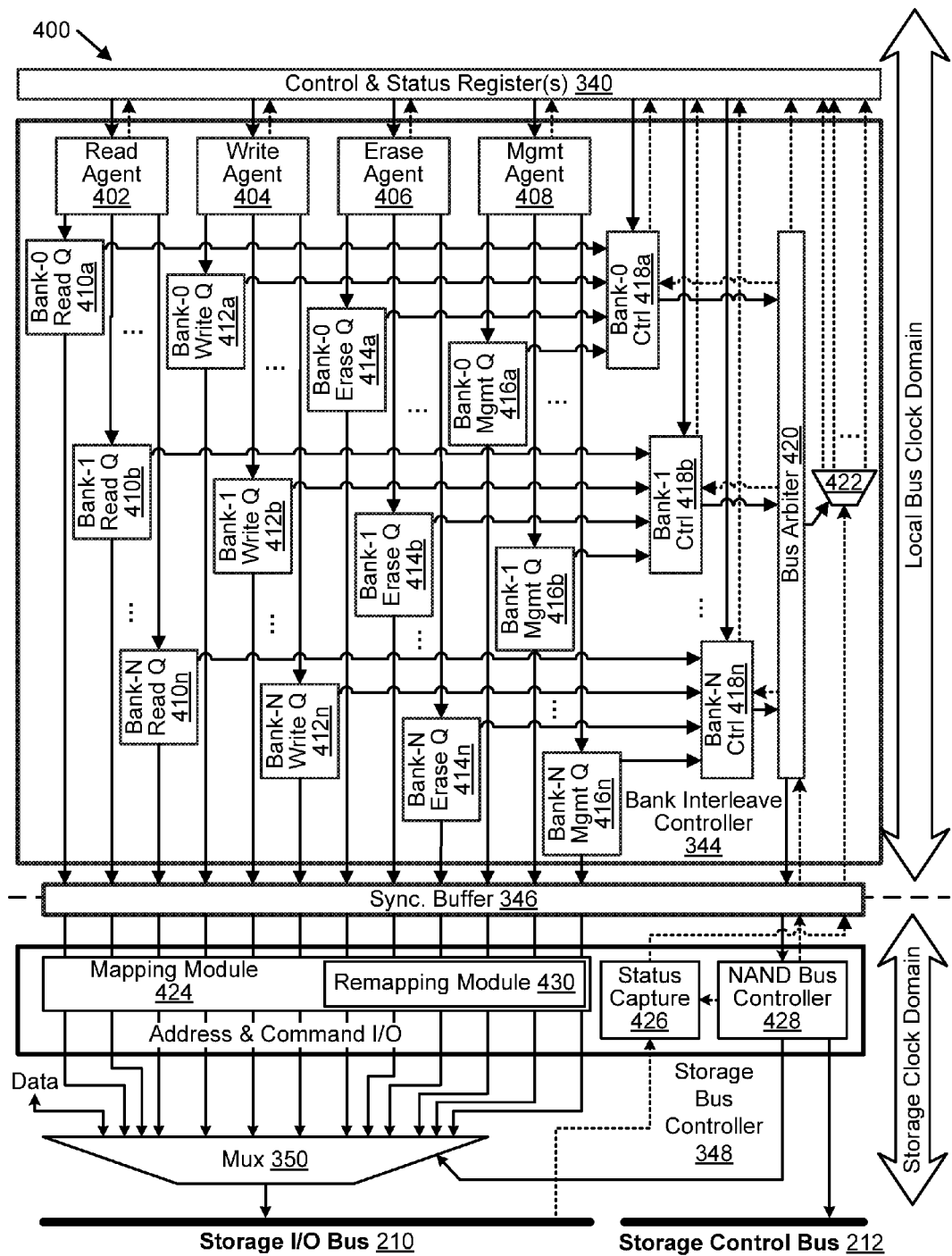
FIG. 4 is a schematic block diagram illustrating one embodiment of a bank interleave controller in the solid-state storage controller in accordance with the present invention.

The solid-state storage controller 104 and or the cache 102 may also include a bank interleave controller 344, a synchronization buffer 346, a storage bus controller 348, and a multiplexer ("MUX") 350, which are described in relation to FIG. 4.

Bank Interleave

FIG. 4 is a schematic block diagram illustrating one embodiment 400 of a bank interleave controller 344 in the solid-state storage controller 104 in accordance with the present invention. The bank interleave controller 344 is connected to the control and status registers 340 and to the storage I/O bus 210 and storage control bus 212 through the MUX 350, storage bus controller 348, and synchronization buffer 346, which are described below. The bank interleave controller 344 includes a read agent 402, a write agent 404, an erase agent 406, a management agent 408, read queues 410a-n, write queues 412a-n, erase queues 414a-n, and management queues 416a-n for the banks 214 in the solid-state storage media 110, bank controllers 418a-n, a bus arbiter 420, and a status MUX 422, which are described below. The storage bus controller 348 includes a mapping module 424 with a remapping module 430, a status capture module 426, and a NAND bus controller 428, which are described below.

The bank interleave controller 344 directs one or more commands to two or more queues in the bank interleave controller 104 and coordinates among the banks 214 of the solid-state storage media 110 execution of the commands stored in the queues, such that a command of a first type executes on one bank 214a while a command of a second type executes on a second bank 214b. The one or more commands are separated by command type into the queues. Each bank 214 of the solid-state storage media 110 has a corresponding set of queues within the bank interleave controller 344 and each set of queues includes a queue for each command type.

The bank interleave controller 344 coordinates among the banks 214 of the solid-state storage media 110 execution of the commands stored in the queues. For example, a command of a first type executes on one bank 214a while a command of a second type executes on a second bank 214b. Typically the command types and queue types include read and write commands and queues 410, 412, but may also include other commands and queues that are storage media specific. For example, in the embodiment depicted in FIG. 4, erase and management queues 414, 416 are included and would be appropriate for flash memory, NRAM, MRAM, DRAM, PRAM, etc.

For other types of solid-state storage media 110, other types of commands and corresponding queues may be included without straying from the scope of the invention. The flexible nature of an FPGA solid-state storage controller 104 allows flexibility in storage media. If flash memory were changed to another solid-state storage type, the bank interleave controller 344, storage bus controller 348, and MUX 350 could be altered to accommodate the media type without significantly affecting the data pipelines 106, 108 and other solid-state storage controller 104 functions.

In the embodiment depicted in FIG. 4, the bank interleave controller 344 includes, for each bank 214, a read queue 410 for reading data from the solid-state storage media 110, a write queue 412 for write commands to the solid-state storage media 110, an erase queue 414 for erasing an erase block in the solid-state storage, an a management queue 416 for management commands. The bank interleave controller 344 also includes corresponding read, write, erase, and management agents 402, 404, 406, 408. In another embodiment, the control and status registers 340 and control queues 342 or similar components queue commands for data sent to the banks 214 of the solid-state storage media 110 without a bank interleave controller 344.

The agents 402, 404, 406, 408, in one embodiment, direct commands of the appropriate type destined for a particular bank 214a to the correct queue for the bank 214a. For example, the read agent 402 may receive a read command for bank-1 214b and directs the read command to the bank-1 read queue 410b. The write agent 404 may receive a write command to write data to a location in bank-0 214a of the solid-state storage media 110 and will then send the write command to the bank-0 write queue 412a. Similarly, the erase agent 406 may receive an erase command to erase an erase block in bank-1 214b and will then pass the erase command to the bank-1 erase queue 414b. The management agent 408 typically receives management commands, status requests, and the like, such as a reset command or a request to read a configuration register of a bank 214, such as bank-0 214a. The management agent 408 sends the management command to the bank-0 management queue 416a.

The agents 402, 404, 406, 408 typically also monitor status of the queues 410, 412, 414, 416 and send status, interrupt, or other messages when the queues 410, 412, 414, 416 are full, nearly full, non-functional, etc. In one embodiment, the agents 402, 404, 406, 408 receive commands and generate corresponding sub-commands. In one embodiment, the agents 402, 404, 406, 408 receive commands through the control & status registers 340 and generate corresponding sub-commands which are forwarded to the queues 410, 412, 414, 416. One of skill in the art will recognize other functions of the agents 402, 404, 406, 408.

The queues 410, 412, 414, 416 typically receive commands and store the commands until required to be sent to the solid-state storage banks 214. In a typical embodiment, the queues 410, 412, 414, 416 are first-in, first-out ("FIFO") registers or a similar component that operates as a FIFO. In another embodiment, the queues 410, 412, 414, 416 store commands in an order that matches data, order of importance, or other criteria.

The bank controllers 418 typically receive commands from the queues 410, 412, 414, 416 and generate appropriate sub-commands. For example, the bank-0 write queue 412a may receive a command to write a page of data packets to bank-0 214a. The bank-0 controller 418a may receive the write command at an appropriate time and may generate one or more write subcommands for each data packet stored in the write buffer 320 to be written to the page in bank-0 214a. For example, bank-0 controller 418a may generate commands to validate the status of bank 0 214a and the solid-state storage array 216, select the appropriate location for writing one or more data packets, clear the input buffers within the solid-state storage memory array 216, transfer the one or more data packets to the input buffers, program the input buffers into the selected location, verify that the data was correctly programmed, and if program failures occur do one or more of interrupting the master controller 224, retrying the write to the same physical location, and retrying the write to a different physical location. Additionally, in conjunction with example write command, the storage bus controller 348 will cause the one or more commands to multiplied to each of the each of the storage I/O buses 210a-n with the logical address of the command mapped to a first physical addresses for storage I/O bus 210a, and mapped to a second physical address for storage I/O bus 210b, and so forth as further described below.

Typically, bus arbiter 420 selects from among the bank controllers 418 and pulls subcommands from output queues within the bank controllers 418 and forwards these to the Storage Bus Controller 348 in a sequence that optimizes the performance of the banks 214. In another embodiment, the bus arbiter 420 may respond to a high level interrupt and modify the normal selection criteria. In another embodiment, the master controller 224 can control the bus arbiter 420 through the control and status registers 340. One of skill in the art will recognize other means by which the bus arbiter 420 may control and interleave the sequence of commands from the bank controllers 418 to the solid-state storage media 110.

The bus arbiter 420 typically coordinates selection of appropriate commands, and corresponding data when required for the command type, from the bank controllers 418 and sends the commands and data to the storage bus controller 348. The bus arbiter 420 typically also sends commands to the storage control bus 212 to select the appropriate bank 214. For the case of flash memory or other solid-state storage media 110 with an asynchronous, bi-directional serial storage I/O bus 210, only one command (control information) or set of data can be transmitted at a time. For example, when write commands or data are being transmitted to the solid-state storage media 110 on the storage I/O bus 210, read commands, data being read, erase commands, management commands, or other status commands cannot be transmitted on the storage I/O bus 210. For example, when data is being read from the storage I/O bus 210, data cannot be written to the solid-state storage media 110.

For example, during a write operation on bank-0 the bus arbiter 420 selects the bank-0 controller 418a which may have a write command or a series of write sub-commands on the top of its queue which cause the storage bus controller 348 to execute the following sequence. The bus arbiter 420 forwards the write command to the storage bus controller 348, which sets up a write command by selecting bank-0 214a through the storage control bus 212, sending a command to clear the input buffers of the solid-state storage elements 110 associated with the bank-0 214a, and sending a command to validate the status of the solid-state storage elements 216, 218, 220 associated with the bank-0 214a. The storage bus controller 348 then transmits a write subcommand on the storage I/O bus 210, which contains the physical addresses including the address of the logical erase block for each individual physical erase solid-stage storage element 216a-m as mapped from the logical erase block address. The storage bus controller 348 then muxes the write buffer 320 through the write sync buffer 308 to the storage I/O bus 210 through the MUX 350 and streams write data to the appropriate page. When the page is full, then storage bus controller 348 causes the solid-state storage elements 216a-m associated with the bank-0 214a to program the input buffer to the memory cells within the solid-state storage elements 216a-m. Finally, the storage bus controller 348 validates the status to ensure that page was correctly programmed.

A read operation is similar to the write example above. During a read operation, typically the bus arbiter 420, or other component of the bank interleave controller 344, receives data and corresponding status information and sends the data to the read data pipeline 108 while sending the status information on to the control and status registers 340. Typically, a read data command forwarded from bus arbiter 420 to the storage bus controller 348 will cause the MUX 350 to gate the read data on storage I/O bus 210 to the read data pipeline 108 and send status information to the appropriate control and status registers 340 through the status MUX 422.

The bus arbiter 420 coordinates the various command types and data access modes so that only an appropriate command type or corresponding data is on the bus at any given time. If the bus arbiter 420 has selected a write command, and write subcommands and corresponding data are being written to the solid-state storage media 110, the bus arbiter 420 will not allow other command types on the storage I/O bus 210. Beneficially, the bus arbiter 420 uses timing information, such as predicted command execution times, along with status information received concerning bank 214 status to coordinate execution of the various commands on the bus with the goal of minimizing or eliminating idle time of the busses.

The master controller 224 through the bus arbiter 420 typically uses expected completion times of the commands stored in the queues 410, 412, 414, 416, along with status information, so that when the subcommands associated with a command are executing on one bank 214a, other subcommands of other commands are executing on other banks 214b-n. When one command is fully executed on a bank 214a, the bus arbiter 420 directs another command to the bank 214a. The bus arbiter 420 may also coordinate commands stored in the queues 410, 412, 414, 416 with other commands that are not stored in the queues 410, 412, 414, 416.

For example, an erase command may be sent out to erase a group of erase blocks within the solid-state storage media 110. An erase command may take 10 to 1000 times more time to execute than a write or a read command or 10 to 100 times more time to execute than a program command. For N banks 214, the bank interleave controller 344 may split the erase command into N commands, each to erase a virtual erase block of a bank 214a. While bank-0 214a is executing an erase command, the bus arbiter 420 may select other commands for execution on the other banks 214b-n. The bus arbiter 420 may also work with other components, such as the storage bus controller 348, the master controller 224, etc., to coordinate command execution among the buses. Coordinating execution of commands using the bus arbiter 420, bank controllers 418, queues 410, 412, 414, 416, and agents 402, 404, 406, 408 of the bank interleave controller 344 can dramatically increase performance over other solid-state storage systems without a bank interleave function.

In one embodiment, the solid-state controller 104 includes one bank interleave controller 344 that serves all of the storage elements 216, 218, 220 of the solid-state storage media 110. In another embodiment, the solid-state controller 104 includes a bank interleave controller 344 for each column of storage elements 216a-m, 218a-m, 220a-m. For example, one bank interleave controller 344 serves one column of storage elements SSS 0.0-SSS M.0 216a, 216b, . . . 216m, a second bank interleave controller 344 serves a second column of storage elements SSS 0.1-SSS M.1 218a, 218b, . . . 218m etc.

Storage-Specific Components

The solid-state storage controller 104 includes a synchronization buffer 346 that buffers commands and status messages sent and received from the solid-state storage media 110. The synchronization buffer 346 is located at the boundary between the solid-state storage clock domain and the local bus clock domain and provides buffering to account for the clock domain differences. The synchronization buffer 346, write synchronization buffer 308, and read synchronization buffer 328 may be independent or may act together to buffer data, commands, status messages, etc. In one embodiment, the synchronization buffer 346 is located where there are the fewest number of signals crossing the clock domains. One skilled in the art will recognize that synchronization between clock domains may be arbitrarily moved to other locations within the cache 102 in order to optimize some aspect of design implementation.

The solid-state storage controller 104 includes a storage bus controller 348 that interprets and translates commands for data sent to and read from the solid-state storage media 110 and status messages received from the solid-state storage media 110 based on the type of solid-state storage media 110. For example, the storage bus controller 348 may have different timing requirements for different types of storage, storage with different performance characteristics, storage from different manufacturers, etc. The storage bus controller 348 also sends control commands to the storage control bus 212.

In one embodiment, the solid-state storage controller 104 includes a MUX 350 that comprises an array of multiplexers 350a-n where each multiplexer is dedicated to a row in the solid-state storage array 110. For example, multiplexer 350a is associated with solid-state storage elements 216a, 218a, 220a. MUX 350 routes the data from the write data pipeline 106 and commands from the storage bus controller 348 to the solid-state storage media 110 via the storage I/O bus 210 and routes data and status messages from the solid-state storage media 110 via the storage I/O bus 210 to the read data pipeline 108 and the control and status registers 340 through the storage bus controller 348, synchronization buffer 346, and bank interleave controller 344.

In one embodiment, the solid-state storage controller 104 includes a MUX 350 for each row of solid-state storage elements (e.g. SSS 0.1 216a, SSS 0.2 218a, SSS 0.N 220a). A MUX 350 combines data from the write data pipeline 106 and commands sent to the solid-state storage media 110 via the storage I/O bus 210 and separates data to be processed by the read data pipeline 108 from commands. Packets stored in the write buffer 320 are directed on busses out of the write buffer 320 through a write synchronization buffer 308 for each row of solid-state storage elements (SSS x.0 to SSS x.N 216, 218, 220) to the MUX 350 for each row of solid-state storage elements (SSS x.0 to SSS x.N 216, 218, 220). The commands and read data are received by the MUXes 350 from the storage I/O bus 210. The MUXes 350 also direct status messages to the storage bus controller 348.

The storage bus controller 348 includes a mapping module 424. The mapping module 424 maps a logical address of an erase block to one or more physical addresses of an erase block. For example, a solid-state storage media 110 with an array of twenty storage elements (e.g. SSS 0.0 to SSS M.0 216) per block 214a may have a logical address for a particular erase block mapped to twenty physical addresses of the erase block, one physical address per storage element. Because the storage elements are accessed in parallel, erase blocks at the same position in each storage element in a row of storage elements 216a, 218a, 220a will share a physical address. To select one erase block (e.g. in storage element SSS 0.0 216a) instead of all erase blocks in the row (e.g. in storage elements SSS 0.0, 0.1, . . . 0.N 216a, 218a, 220a), one bank (in this case bank-0 214a) is selected.

This logical-to-physical mapping for erase blocks is beneficial because if one erase block becomes damaged or inaccessible, the mapping can be changed to map to another erase block. This mitigates the loss of losing an entire virtual erase block when one element's erase block is faulty. The remapping module 430 changes a mapping of a logical address of an erase block to one or more physical addresses of a virtual erase block (spread over the array of storage elements). For example, virtual erase block 1 may be mapped to erase block 1 of storage element SSS 0.0 216a, to erase block 1 of storage element SSS 1.0 216b, . . . , and to storage element M.0 216m, virtual erase block 2 may be mapped to erase block 2 of storage element SSS 0.1 218a, to erase block 2 of storage element SSS 1.1 218b, . . . , and to storage element M.1 218m, etc. Alternatively, virtual erase block 1 may be mapped to one erase block from each storage element in an array such that virtual erase block 1 includes erase block 1 of storage element SSS 0.0 216a to erase block 1 of storage element SSS 1.0 216b to storage element M.0 216m, and erase block 1 of storage element SSS 0.1 218a to erase block 1 of storage element SSS 1.1 218b, . . . , and to storage element M.1 218m, for each storage element in the array up to erase block 1 of storage element M.N 220m.

If erase block 1 of a storage element SSS0.0 216a is damaged, experiencing errors due to wear, etc., or cannot be used for some reason, the remapping module 430 could change the logical-to-physical mapping for the logical address that pointed to erase block 1 of virtual erase block 1. If a spare erase block (call it erase block 221) of storage element SSS 0.0 216a is available and currently not mapped, the remapping module 430 could change the mapping of virtual erase block 1 to point to erase block 221 of storage element SSS 0.0 216a, while continuing to point to erase block 1 of storage element SSS 1.0 216b, erase block 1 of storage element SSS 2.0 (not shown) . . . , and to storage element M.0 216m. The mapping module 424 or remapping module 430 could map erase blocks in a prescribed order (virtual erase block 1 to erase block 1 of the storage elements, virtual erase block 2 to erase block 2 of the storage elements, etc.) or may map erase blocks of the storage elements 216, 218, 220 in another order based on some other criteria.

In one embodiment, the erase blocks could be grouped by access time. Grouping by access time, meaning time to execute a command, such as programming (writing) data into pages of specific erase blocks, can level command completion so that a command executed across the erase blocks of a virtual erase block is not limited by the slowest erase block. In other embodiments, the erase blocks may be grouped by wear level, health, etc. One of skill in the art will recognize other factors to consider when mapping or remapping erase blocks.

In one embodiment, the storage bus controller 348 includes a status capture module 426 that receives status messages from the solid-state storage media 110 and sends the status messages to the status MUX 422. In another embodiment, when the solid-state storage media 110 is flash memory, the storage bus controller 348 includes a NAND bus controller 428. The NAND bus controller 428 directs commands from the read and write data pipelines 106, 108 to the correct location in the solid-state storage media 110, coordinates timing of command execution based on characteristics of the flash memory, etc. If the solid-state storage media 110 is another solid-state storage type, the NAND bus controller 428 would be replaced by a bus controller specific to the storage type. One of skill in the art will recognize other functions of a NAND bus controller 428.

Data Caching

Figure 5:
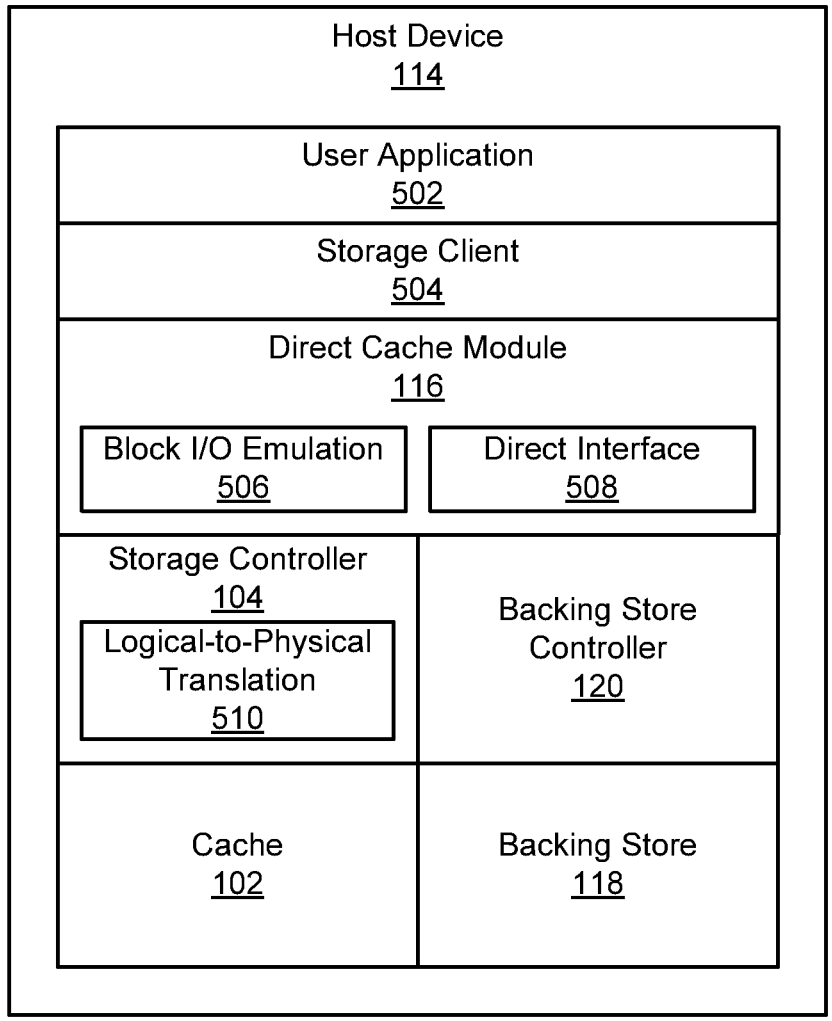
FIG. 5 is a schematic block diagram illustrating one embodiment of a host device in accordance with the present invention.

FIG. 5 depicts one embodiment of a host device 114. The host device 114 may be similar, in certain embodiments, to the host device 114 depicted in FIGS. 1A and 1B. The depicted embodiment includes a user application 502 in communication with a storage client 504. The storage client 504 is in communication with a direct cache module 116, which, in one embodiment, is substantially similar to the direct cache module 116 of FIGS. 1A and 1B, described above. The direct cache module 116, in the depicted embodiment, is in communication with the cache 102 and the backing store 118 through the storage controller 104 and the backing store controller 120.

In one embodiment, the user application 502 is a software application operating on or in conjunction with the storage client 504. The storage client 504 manages file systems, files, data, and the like and utilizes the functions and features of the direct cache module 116, the cache 102, and the backing store 118. Representative examples of storage clients include, but are not limited to, a server, a file system, an operating system, a database management system ("DBMS"), a volume manager, and the like.

In the depicted embodiment, the storage client 504 is in communication with the direct cache module 116. In a further embodiment, the storage client 504 may also be in communication with the cache 102 and/or the backing store 118 directly. The storage client 504, in one embodiment, reads data from and writes data to the backing store 118 through the direct cache module 116, which uses the cache 102 to cache read data and/or write data for the backing store 118. In a further embodiment, the direct cache module 116 caches data in a manner that is substantially transparent to the storage client 504, with the storage client 504 sending read requests and write requests directly to the direct cache module 116.

In one embodiment, the direct cache module 116 has exclusive access to and/or control over the cache 102 and the backing store 118. The direct cache module 116 may represent itself to the storage client 504 as a storage device. For example, the direct cache module 116 may represent itself as a conventional block storage device, or the like. In a particular embodiment, the direct cache module 116 may represent itself to the storage client 504 as a storage device having the same number of logical blocks (0 to N) as the backing store 118. In another embodiment, the direct cache module 116 may represent itself to the storage client 504 as a storage device have the more logical blocks (0 to N+X) as the backing store 118, where X=the number of logical blocks addressable by the direct cache module 116 beyond N. In certain embodiments, $X=2^{64}-N$.

As described above with regard to the direct cache module 116 depicted in the embodiments of FIGS. 1A and 1B, in various embodiments, the direct cache module 116 may be embodied by one or more of a storage controller 104 of the cache 102 and/or a backing store controller 120 of the backing store 118; a separate hardware controller device that interfaces with the cache 102 and the backing store 118; a device driver loaded on the host device 114; and the like.

In one embodiment, the host device 114 loads a device driver for the direct cache module 116. In a further embodiment, the host device 114 loads device drivers for the cache 102 and/or the backing store 118, such as one or more device drivers of the storage controller 104 and/or the backing store controller 120. The direct cache module 116 may communicate with the cache 102 and/or the backing store 118 through device drivers loaded on the host device 114, through the storage controller 104 of the cache 102 and/or through the backing store controller 120 of the backing store 118, or the like.

In one embodiment, the storage client 504 communicates with the direct cache module 116 through an Input/Output ("I/O") interface represented by a block I/O emulation layer 506. In certain embodiments, the fact that the direct cache module 116 is providing caching services in front of one or more caches 102, and/or one or more backing stores, such as the backing store 118, may be transparent to the storage client 504. In such an embodiment, the direct cache module 116 may present (i.e., identify itself as) a conventional block device to the storage client 504.

In a further embodiment, the cache 102 and/or the backing store 118 either include a distinct block I/O emulation layer 506 or may be conventional block storage devices. Certain conventional block storage devices divide the storage media into volumes or partitions. Each volume or partition may include a plurality of sectors. One or more sectors are organized into a logical block. In certain storage systems, such as those interfacing with the Windows® operating systems, the logical blocks are referred to as clusters. In other storage systems, such as those interfacing with UNIX, Linux, or similar operating systems, the logical blocks are referred to simply as blocks. A logical block or cluster represents a smallest physical amount of storage space on the storage media that is addressable by the storage client 504. A block storage device may associate n logical blocks available for user data storage across the storage media with a logical block address, numbered from 0 to n. In certain block storage devices, the logical block addresses may range from 0 to n per volume or partition. In conventional block storage devices, a logical block address maps directly to a particular logical block. In conventional block storage devices, each logical block maps to a particular set of physical sectors on the storage media.

However, the direct cache module 116, the cache 102 and/or the backing store 118, in certain embodiments, may not directly or necessarily associate logical block addresses with particular physical blocks. The direct cache module 116, the cache 102, and/or the backing store 118 may emulate a conventional block storage interface to maintain compatibility with block storage clients 504 and with conventional block storage commands and protocols.

When the storage client 504 communicates through the block I/O emulation layer 506, the direct cache module 116 appears to the storage client 504 as a conventional block storage device. In one embodiment, the direct cache module 116 provides the block I/O emulation layer 506 which serves as a block device interface, or API. In this embodiment, the storage client 504 communicates with the direct cache module 116 through this block device interface. In one embodiment, the block I/O emulation layer 506 receives commands and logical block addresses from the storage client 504 in accordance with this block device interface. As a result, the block I/O emulation layer 506 provides the direct cache module 116 compatibility with block storage clients 504. In a further embodiment, the direct cache module 116 may communicate with the cache 102 and/or the backing store 118 using corresponding block device interfaces.

In one embodiment, a storage client 504 communicates with the direct cache module 116 through a direct interface layer 508. In this embodiment, the direct cache module 116 directly exchanges information specific to the cache 102 and/or the backing store 118 with the storage client 504. Similarly, the direct cache module 116, in one embodiment, may communicate with the cache 102 and/or the backing store 118 through direct interface layers 508.

A direct cache module 116 using the direct interface 508 may store data on the cache 102 and/or the backing store 118 as blocks, sectors, pages, logical blocks, logical pages, erase blocks, logical erase blocks, packets, ECC chunks or in any other format or structure advantageous to the technical characteristics of the cache 102 and/or the backing store 118. For example, in one embodiment, the backing store 118 comprises a hard disk drive and the direct cache module 116 stores data on the backing store 118 as contiguous sectors of 512 bytes, or the like, using physical cylinder-head-sector addresses for each sector, logical block addresses for each sector, or the like. The direct cache module 116 may receive a logical address and a command from the storage client 504 and perform the corresponding operation in relation to the cache 102, and/or the backing store 118. The direct cache module 116, the cache 102, and/or the backing store 118 may support a block I/O emulation layer 506, a direct interface 508, or both a block I/O emulation layer 506 and a direct interface 508.

As described above, certain storage devices, while appearing to a storage client 504 to be a block storage device, do not directly associate particular logical block addresses with particular physical blocks, also referred to in the art as sectors. Such storage devices may use a logical-to-physical translation layer 510. In the depicted embodiment, the cache 102 includes a logical-to-physical translation layer 510. In a further embodiment, the backing store 118 may also include a logical-to-physical translation layer 510. In another embodiment, the direct cache module 116 maintains a single logical-to-physical translation layer 510 for the cache 102 and the backing store 118. In another embodiment, the direct cache module 116 maintains a distinct logical-to-physical translation layer 510 for each of the cache 102 and the backing store 118.

The logical-to-physical translation layer 510 provides a level of abstraction between the logical block addresses used by the storage client 504 and the physical block addresses at which the cache 102 and/or the backing store 118 store the data. In the depicted embodiment, the logical-to-physical translation layer 510 maps logical block addresses to physical block addresses of data stored on the media of the cache 102. This mapping allows data to be referenced in a logical address space using logical identifiers, such as a logical block address. A logical identifier does not indicate the physical location of data in the cache 102, but is an abstract reference to the data. The mapping module 424 and the remapping module 430 of FIG. 4, discussed above, are one example of a logical-to-physical translation layer 510. One further example of a logical-to-physical translation layer 510 includes the direct mapping module 716 of FIG. 7 discussed below.

In the depicted embodiment, the cache 102 and the backing store 118 separately manage physical block addresses in the distinct, separate physical address spaces of the cache 102 and the backing store 118. In one example, contiguous logical block addresses may in fact be stored in non-contiguous physical block addresses as the logical-to-physical translation layer 510 determines the location on the physical media 110 of the cache 102 at which to perform data operations.

Furthermore, in one embodiment, the logical address space of the cache 102 is substantially larger than the physical address space or storage capacity of the cache 102. This "thinly provisioned" or "sparse address space" embodiment, allows the number of logical addresses for data references to greatly exceed the number of possible physical addresses. A thinly provisioned and/or sparse address space also allows the cache 102 to cache data for a backing store 118 with a larger address space (i.e., a larger storage capacity) than the physical address space of the cache 102.

In one embodiment, the logical-to-physical translation layer 510 includes a map or index that maps logical block addresses to physical block addresses. The map or index may be in the form of a B-tree, a content addressable memory ("CAM"), a binary tree, and/or a hash table, and the like. In certain embodiments, the logical-to-physical translation layer 510 is a tree with nodes that represent logical block addresses and include references to corresponding physical block addresses.

As stated above, in conventional block storage devices, a logical block address maps directly to a particular physical block. When a storage client 504 communicating with the conventional block storage device deletes data for a particular logical block address, the storage client 504 may note that the particular logical block address is deleted and can re-use the physical block associated with that deleted logical block address without the need to perform any other action.

Conversely, when a storage client 504, communicating with a storage controller 104 or device driver with a logical-to-physical translation layer 510 (a storage controller 104 or device driver that does not map a logical block address directly to a particular physical block), deletes data of a logical block address, the corresponding physical block address may remain allocated because the storage client 504 may not communicate the change in used blocks to the storage controller 104 or device driver. The storage client 504 may not be configured to communicate changes in used blocks (also referred to herein as "data block usage information"). Because the storage client 504, in one embodiment, uses the block I/O emulation layer 506, the storage client 504 may erroneously believe that the direct cache module 116, the cache 102, and/or the backing store 118 is a conventional block storage device that would not utilize the data block usage information. Or, in certain embodiments, other software layers between the storage client 504 and the direct cache module 116, the cache 102, and/or the backing store 118 may fail to pass on data block usage information.

Consequently, the storage controller 104 or device driver may preserve the relationship between the logical block address and a physical address and the data on the cache 102 and/or the backing store 118 corresponding to the physical block. As the number of allocated blocks increases, the performance of the cache 102 and/or the backing store 118 may suffer depending on the configuration of the cache 102 and/or the backing store 118.

Specifically, in certain embodiments, the cache 102 and/or the backing store 118 are configured to store data sequentially, using an append-only writing process, and use a storage space recovery process that re-uses non-volatile storage media storing deallocated/unused logical blocks. Specifically, as described above, the cache 102 and/or the backing store 118 may sequentially write data on the solid-state storage media 110 in a log structured format and within one or more physical structures of the storage elements, the data is sequentially stored on the solid-state storage media 110. Those of skill in the art will recognize that other embodiments that include several caches 102 can use the same append-only writing process and storage space recovery process.

As a result of storing data sequentially and using an append-only writing process, the cache 102 and/or the backing store 118 achieve a high write throughput and a high number of I/O operations per second ("IOPS"). The cache 102 and/or the backing store 118 may include a storage space recovery, or garbage collection process that re-uses data storage cells to provide sufficient storage capacity. The storage space recovery process reuses storage cells for logical blocks marked as deallocated, invalid, unused, or otherwise designated as available for storage space recovery in the logical-physical translation layer 510. In one embodiment, the direct cache module 116 marks logical blocks as deallocated or invalid based on a cache eviction policy, to recover storage capacity for caching additional data for the backing store 118. The direct cache module 116, in certain embodiments, selects data that is either cached read data or destaged, cleaned write data to clear, invalidate, or evict. The storage space recovery process is described in greater detail below with regard to the groomer module 702 of FIG. 7.

As described above, the storage space recovery process determines that a particular section of storage may be recovered. Once a section of storage has been marked for recovery, the cache 102 and/or the backing store 118 may relocate valid blocks (e.g. packets, pages, sectors, etc.) in the section. The storage space recovery process, when relocating valid blocks, copies the packets and writes them to another location so that the particular section of storage may be reused as available storage space, typically after an erase operation on the particular section. The cache 102 and/or the backing store 118 may then use the available storage space to continue sequentially writing data in an append-only fashion. Consequently, the storage controller 104 expends resources and overhead in preserving data in valid blocks. Therefore, physical blocks corresponding to deleted logical blocks may be unnecessarily preserved by the storage controller 104, which expends unnecessary resources in relocating the physical blocks during storage space recovery.

Some storage devices are configured to receive messages or commands notifying the storage device of these unused logical blocks so that the storage device may deallocate the corresponding physical blocks (e.g. the physical storage media 110 storing the unused packets, pages, sectors, etc.). As used herein, to deallocate a physical block includes marking the physical block as invalid, unused, or otherwise designating the physical block as available for storage space recovery, its contents on storage media no longer needing to be preserved by the storage device. Data block usage information may also refer to information maintained by a storage device regarding which physical blocks are allocated and/or deallocated/unallocated and changes in the allocation of physical blocks and/or logical-to-physical block mapping information. Data block usage information may also refer to information maintained by a storage device regarding which blocks are in use and which blocks are not in use by a storage client 504. Use of a block may include storing of data in the block on behalf of the storage client 504, reserving the block for use by the storage client 504, and the like.

While physical blocks may be deallocated, in certain embodiments, the cache 102 and/or the backing store 118 may not immediately erase the data on the storage media. An erase operation may be performed later in time. In certain embodiments, the data in a deallocated physical block may be marked as unavailable by the cache 102 and/or the backing store 118 such that subsequent requests for data in the physical block return a null result or an empty set of data. In certain embodiments, the direct cache module 116 evicts and/or invalidates data by deallocating physical blocks corresponding to the data in the cache 102.

One example of a command or message for such deallocation is the "TRIM" function is described in greater detail in U.S. patent application Ser. No. 12/711,113 entitled "APPARATUS, SYSTEM, AND METHOD FOR DATA BLOCK USAGE INFORMATION SYNCHRONIZATION FOR A NON-VOLATILE STORAGE VOLUME" and filed on Feb. 23, 2010 and in U.S. patent application Ser. No. 11/952,113 entitled "APPARATUS, SYSTEM, AND METHOD FOR MANAGING DATA IN A STORAGE DEVICE WITH AN EMPTY DATA TOKEN DIRECTIVE" and filed on Dec. 6, 2007, which are incorporated herein by reference. A storage device, upon receiving a TRIM command, may deallocate physical blocks for logical blocks whose data is no longer needed by the storage client 504. A storage device that deallocates physical blocks may achieve better performance and increased storage space, especially storage devices that write data using certain processes and/or use a similar data storage recovery process as that described above.

Consequently, the performance of the storage device is enhanced as physical blocks are deallocated when they are no longer needed such as through the TRIM command or other similar deallocation commands issued to the cache 102 and/or the backing store 118. In one embodiment, the direct cache module 116 clears, trims, and/or evicts cached data from the cache 102 based on a cache eviction policy, or the like. As used herein, clearing, trimming, or evicting data includes deallocating physical media associated with the data, marking the data as invalid or unused (using either a logical or physical address of the data), erasing physical media associated with the data, overwriting the data with different data, issuing a TRIM command or other deallocation command relative to the data, or otherwise recovering storage capacity of physical storage media corresponding to the data. Clearing cached data from the cache 102 based on a cache eviction policy frees storage capacity in the cache 102 to cache more data for the backing store 118.

The direct cache module 116, in various embodiments, may represent itself, the cache 102, and the backing store 118 to the storage client 504 in different configurations. In one embodiment, the direct cache module 116 may represent itself to the storage client 504 as a single storage device (e.g., as the backing store 118, as a storage device with a similar physical capacity as the backing store 118, or the like) and the cache 102 may be transparent or invisible to the storage client 504. In another embodiment, the direct cache module 116 may represent itself to the direct cache module 116 as a cache device (e.g., as the cache 102, as a cache device with certain cache functions or APIs available, or the like) and the backing store 118 may be separately visible and/or available to the storage client 504 (with part of the physical capacity of the backing store 118 reserved for the cache 201). In a further embodiment, the direct cache module 116 may represent itself to the storage client 504 as a hybrid cache/storage device including both the cache 102 and the backing store 118.

Depending on the configuration, the direct cache module 116 may pass certain commands down to the cache 102 and/or to the backing store 118 and may not pass down other commands. In a further embodiment, the direct cache module 116 may support certain custom or new block I/O commands. In one embodiment, the direct cache module 116 supports a deallocation or trim command that clears corresponding data from both the cache 102 and the backing store 118, i.e., the direct cache module 116 passes the command to both the cache 102 and the backing store 118. In a further embodiment, the direct cache module 116 supports a flush type trim or deallocation command that ensures that corresponding data is stored in the backing store 118 (i.e., that the corresponding data in the cache 102 is clean) and clears the corresponding data from the cache 102, without clearing the corresponding data from the backing store 118. In another embodiment, the direct cache module 116 supports an evict type trim or deallocation command that evicts corresponding data from the cache 102, marks corresponding data for eviction in the cache 102, or the like, without clearing the corresponding data from the backing store 118.

In a further embodiment, the direct cache module 116 may receive, detect, and/or intercept one or more predefined commands that a storage client 504 or another storage manager sent to the backing store 118, that a storage manager sends to a storage client 504, or the like. For example, in various embodiments, the direct cache module 116 or a portion of the direct cache module 116 may be part of a filter driver that receives or detects the predefined commands, the direct cache module 116 may register with an event server to receive a notification of the predefined commands, or the like. The direct cache module 116, in one embodiment, performs one or more actions on the cache 102 in response to detecting the one or more predefined commands for the backing store 118, such as writing or flushing data related to a command from the cache 102 to the backing store 118, evicting data related to a command from the cache 102, switching from a write back policy to a write through policy for data related to a command, or the like.

One example of predefined commands that the direct cache module 116 may intercept or respond to, in one embodiment, includes a "freeze/thaw" commands. "Freeze/thaw" commands are used in SANs, storage arrays, and the like, to suspend storage access, such as access to the backing store 118 or the like, to take an snapshot or backup of the storage without interrupting operation of the applications using the storage. "Freeze/thaw" commands alert a storage client 504 that a snapshot is about to take place, the storage client 504 flushes pending operations, for example in-flight transactions, or data cached in volatile memory, the snapshot takes place while the storage client 504 use of the storage is in a "frozen" or ready state, and once the snapshot is complete the storage client 504 continues normal use of the storage in response to a thaw command.

The direct cache module 116, in one embodiment, flushes or cleans dirty data from the cache 102 to the backing store 118 in response to detecting a "freeze/thaw" command. In a further embodiment, the direct cache module 116 suspends access to the backing store 118 during a snapshot or other backup of a detected "freeze/thaw" command and resumes access in response to a completion of the snapshot or other backup. In another embodiment, the direct cache module 116 may cache data for the backing store 118 during a snapshot or other backup without interrupting the snapshot or other backup procedure. In other words, rather than the backup/snapshot software signaling the application to quiesce I/O operations, the direct cache module 116 receives and responds to the freeze/thaw commands.

Figure 6:
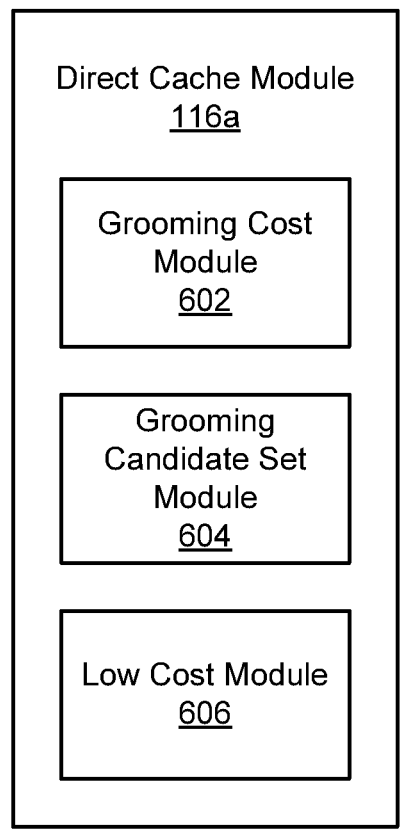
FIG. 6 is a schematic block diagram illustrating one embodiment of a direct cache module in accordance with the present invention.

FIG. 6 depicts one embodiment of the direct cache module 116a. In the depicted embodiment, the direct cache module 116a includes a grooming cost module 602, a grooming candidate set module 604, and a low cost module 606. Another embodiment of a direct cache module is described below with regard to the direct cache module 116b of FIG. 7, which includes several additional modules. In general, the direct cache module 116a grooms data of the cache 102. Grooming data, as used herein, includes processing a region of data to recover physical storage capacity of the region by copying data of the region to another location in the cache 102, such as to an append point of a log, and/or evicting, invalidating, trimming, or otherwise clearing data from the region. Another term for grooming is garbage collection.

In one embodiment, the grooming cost module 602 examines a grooming cost for a selected region of the cache 102. As described below with regard to the grooming clock module 704 of FIG. 7, in certain embodiments, regions of the cache 102 are selected periodically for the grooming cost module 602 to examine. The grooming cost module 602 may determine a grooming cost for a selected region itself, may receive a grooming cost for a selected region from the storage controller 104 or another module, or may otherwise access a grooming cost of a selected region. A region of the cache 102 is a physical or logical block or segment of the storage media 110 of the cache. For example, in various embodiments, a region of the cache 102 may include a block, a sector, a page, a logical block, a logical page, a physical erase block, a logical erase block, a packet, an ECC chunk, or another logical or physical division of the cache 102. In one embodiment, the grooming cost module 602 examines a grooming cost for the same size and type of region that a grooming or garbage collection process grooms, such as a physical erase block, a logical erase block, or the like. One embodiment of a grooming or garbage collection process is described below with regard to the groomer module 702 of FIG. 7.

A grooming cost for a region, in one embodiment, includes an estimate or other representation of a cost of evicting the region of the cache 102. A grooming cost for a selected region may be relative to other regions such that the grooming cost may be compared between different regions to select a low cost region for grooming. A grooming cost, in certain embodiments, represents several different costs associated with grooming data of the cache 102. In one embodiment, a grooming cost for a selected region represents a cache efficiency cost of evicting data from the selected region, such as an opportunity cost of evicting the data, a likelihood of a cache miss in response to evicting the data, or the like. In another embodiment, a grooming cost for a selected region represents a storage efficiency cost of copying data forward or otherwise retaining data from the selected region. One of skill in the art, in light of this disclosure, will recognize other costs associated with grooming data that the grooming cost module 602 may factor in to the grooming cost of a selected region.

A cache efficiency cost factor of a grooming cost, in one embodiment, may be based on the types of data that the region stores, such as recent read data, frequently accessed read data, dirty write data, clean write data, and/or other types of data. For example, the cache efficiency cost of evicting frequently accessed data may be higher than the cache efficiency cost of evicting recent read data, due to a greater likelihood of a cache miss if the frequently accessed data is evicted. Similarly, in certain embodiments, the cache efficiency cost of evicting dirty write data may be much larger than the cache efficiency cost of evicting clean write data or read data, because the backing store 118 does not yet store dirty write data, and the cache efficiency cost of evicting dirty write data (i.e. losing the data) may be very high or infinite.

As described above, in certain embodiments the cache 102 may comprise multiple VSUs or other cache units and regions of the solid-state storage media 110 may store data for a plurality of cache units, intermingled in a log-based writing structure of the cache 102 or the like. In such embodiments, a grooming cost and/or a cache efficiency cost component of a grooming cost, may account for one or more attributes of the cache units, such as a relative priority of cache units, allocated storage capacities for cache units, quality-of-service levels for cache units, or the like.

The grooming cost module 602 and/or another entity determining a grooming cost for a region, may determine an amount of data in the region associated with different cache units, and scale or weight the grooming cost according to the cache unit attributes of the different cache units. For example, the grooming cost module 602 may determine a higher grooming cost for regions that store data from cache units with higher priorities, with higher quality-of-service levels, or the like, so that data from those cache units will be less likely to be evicted than data from cache units with lower priorities, quality-of-service levels, or the like. By including cache unit attributes in grooming costs, the grooming cost module 602 may determine grooming costs to maintain a relative priority of cache units, to maintain allocated storage capacities for cache units, to maintain quality-of-service levels for cache units, or the like.

A storage efficiency cost factor of a grooming cost, in one embodiment, may be based on one or more effects that grooming a selected region may have on storage operations of the cache 102. For example, storage efficiency costs may include the cost and/or the write amplification incurred by copying data from the selected region forward, such as dirty write data, frequently accessed data, or the like, the performance cost on the cache 102 of grooming the selected region, an impact (positive or negative) on the storage media 110 of the cache 102 by grooming the selected region, and/or other storage efficiency costs. Write amplification is the rewriting or moving of data during a grooming or garbage collection process, causing the same data originally written in response to a storage request to be written more than once. Write amplification can increase the number of writes of a storage device, consume write bandwidth of a storage device, reduce a usable lifetime of a storage device, and otherwise reduce performance of a storage device.

In one embodiment, the storage efficiency cost factors may include wear leveling of the physical storage media 110. In another embodiment, the storage efficiency cost factors include a frequency of access of a selected region, i.e., how "hot" or "cold" the selected region is. In one embodiment, the storage efficiency cost factors include a position of a selected region of data in the physical storage media 110 relative to other "hot" data. In another embodiment, the storage efficiency cost factors may include a determined reliability of a selected region, such as an Uncorrectable Bit Error Rate ("UBER"), a Correctable Bit Error Rates ("BER"), a Program/Erase ("PE") cycle count, a read frequency, and/or other non-volatile solid state storage specific attributes of the selected region. High BER, UBER, or PEs may be used as factors to lower the grooming cost and to increase the likelihood that the direct cache module 116a will groom a selected region having those characteristics so that such regions may more rapidly be moved out of service. By including one or more factors relating to reliability of a selected region in a grooming cost, such as an UBER, a BER, a PE cycle count, a read frequency, or the like, in one embodiment, a grooming process such as the groomer module 702 described below optimizes storage efficiency and reliability of the cache 102, in addition to recovering storage capacity.

In one embodiment, the grooming cost of a selected region may be based at least partially on one or more counts or tallies of types of data in the selected region. A count or tally of data of a specific type may comprise a number or amount of blocks, packets, pages, or the like in the region of the specific type, data units (e.g., bytes, kilobytes, megabytes, etc.) representing the amount of data in the region of the specific type, or the like. The grooming cost, in various embodiments, may be based at least partially on a count of frequently accessed data, a count of recently accessed data, a count of dirty write data, a count of clean write data, a count of user data, a count of metadata, and/or other data type counts.

In one embodiment, the grooming cost for a selected region is based at least partially on and/or accounts for a frequency count for the selected region. A frequency count for a selected region, in one embodiment, is a count of data in the selected region that is identified as frequently accessed. Data in a region, in one embodiment, is identified as frequently accessed in response to at least a predetermined number of read requests for the data. For example, in one embodiment, data may be identified as recent data upon being stored in the cache 102 and may be identified as frequently accessed data after one or more subsequent read requests (i.e., a predefined number) for the data. A frequency count, in various embodiments, may be specific to cached read data, may be specific to cached write data, and/or may include both read and write data. In a further embodiment, the frequency count for a selected region is cleared periodically such that the frequency count represents data that has been accessed a predefined number of times during a predefined period of time. In one embodiment, the frequency count includes a map, bit array, bit field, or the like indicating which blocks, packets, pages, or other sub-regions of a selected region are identified as frequently accessed data.

In another embodiment, the grooming cost for a selected region is based at least partially on and/or accounts for an amount of cached dirty write data of the selected region. In one embodiment, the grooming cost module 602 identifies an amount of dirty write data in a selected region using a count, tally, map, bit array, bit field, or the like for dirty write data of the selected region. In further embodiments, the grooming cost for a selected region may be based at least partially on and/or account for an amount of clean write data of the selected region, an amount of recent data of the selected region, an amount of user data of the selected region, an amount of metadata of the selected region, and/or amounts of other types of data of the selected region.

In one embodiment, the grooming cost may account for amounts of several types of data stored in a selected region by scaling or weighing counts for the types of data and summing the results. For example, in certain embodiments, the grooming cost may include an amount of dirty write data multiplied by one or more scalars, an amount of clean write data multiplied by one or more scalars, an amount of recent read data multiplied by one or more scalars, an amount of frequent read data multiplied by one or more scalars, and/or amounts of other types of data multiplied by one or more scalars. The scalars used in the grooming cost, in one embodiment, are selected to represent a cache efficiency cost, a storage efficiency cost, and/or another sub-cost of grooming data from a selected region. In one embodiment, grooming cost scalars may be predefined. In a further embodiment, a user may adjust one or more grooming cost scalars through an interface of the host device 114, a network interface, a configuration setting, a command line interface utility, a graphical user interface utility, or the like. In another embodiment, the grooming cost module 602 dynamically adjusts one or more grooming cost scalars during operation of the cache 102. For example, the grooming cost module 602 may adjust, update, or otherwise set values for grooming cost scalars based on a detected workload of the cache 102, storage requests received by the cache 102, or the like.

In one embodiment, the grooming candidate set module 604 adds a selected region to a grooming candidate set in response to the grooming cost for the selected region satisfying a grooming cost threshold. The grooming candidate set, in one embodiment, includes a plurality of regions of the cache 102. The regions of the cache 102 in the grooming candidate set, in one embodiment, may be ordered by grooming cost. In one embodiment, the grooming candidate set comprises a predetermined number ("N") of low cost regions of the cache 102. For example, the grooming candidate set module 604, in one embodiment, may track low cost regions in response to the grooming cost module 602 periodically examining selected regions of the cache, adding regions that satisfy a grooming cost threshold to the grooming candidate set.

In one embodiment, the grooming cost of a selected region satisfies the grooming cost threshold by being lower than the grooming cost of at least one region of the grooming candidate set. In certain embodiments, where the grooming candidate set is ordered by grooming cost, the grooming candidate set module 604 compares the grooming cost of a selected region to the grooming cost of a grooming candidate region in a highest grooming cost position in the grooming candidate set to determine whether the grooming cost of the selected region satisfies the grooming cost threshold.

In embodiments where the grooming candidate set is ordered by grooming cost, the low cost module 606 described below readily selects the grooming candidate region in the lowest grooming cost position. Advantageously, the grooming candidate set provides a predetermined low cost region for data recovery by the groomer module 702 described below with regard to FIG. 7. The grooming candidate set module 604, in certain embodiments, inserts a selected region into the grooming candidate set at a grooming cost ordered position so that the grooming candidate set remains ordered by grooming cost upon insertion of the selected region.

In further embodiments, the grooming cost may satisfy the grooming cost threshold by being lower than a predefined grooming cost threshold for the grooming candidate set, lower than or equal to the grooming cost of a grooming candidate of the grooming candidate set, lower than an average grooming cost for grooming candidates of the grooming candidate set, lower than a median grooming cost for the grooming candidate set, lower than an average of a predefined number of the most costly grooming costs, and/or by having another predefined relationship with one or more grooming costs of grooming candidate regions of the grooming candidate set.

In another embodiment, the grooming cost of a selected region satisfies the grooming cost threshold in response to an opening or empty position in the grooming candidate set. For example, in certain embodiments, if the direct cache module 116a has evicted a region from the grooming candidate set, if the grooming candidate set module 604 has not yet added a predefined number of regions to the grooming candidate set, or the like, the grooming candidate set module 604 may add a selected region to the grooming candidate set regardless of the selected region's grooming cost, or the like, to fill an opening in the grooming candidate set.

In one embodiment, the grooming candidate set module 604 maintains data for regions of the cache 102 in the grooming candidate set. The grooming candidate set module 604, in one embodiment, maintains an indicator, reference, pointer, and/or other representation of each region in the grooming candidate set in a data structure for the grooming candidate set, such as a linked-list, a table, an array, or the like. In a further embodiment, the grooming candidate set module 604 may maintain a frequency count, a grooming cost, other data counts, and/or other metadata associated with a region of the grooming candidate set. For example, in certain embodiments, the grooming candidate set module 604 may preserving a copy of a frequency count and/or another data count for a selected region after the count has been cleared from the selected region.

In one embodiment, the low cost module 606 defines a low cost region within the grooming candidate set that the grooming candidate set module 604 maintains. The low cost module 606 defines, identifies, or otherwise designates a low cost region that satisfies one or more low cost parameters. For example, in certain embodiments, the low cost module 606 selects a region with the lowest grooming cost of the members of the grooming candidate set as the low cost region by comparing the grooming costs of members of the grooming candidate set. In a further embodiment, the low cost module 606 may select a plurality of regions as low cost regions, such as regions with grooming costs below a low cost threshold, or the like. In one embodiment, the low cost module 606 designates the low cost region for grooming, eviction, garbage collection, or the like to recover storage capacity of the low cost region. In certain embodiments, where the grooming candidate set is ordered by grooming cost, the low cost module 606 defines a low cost region by selecting a grooming candidate region in a lowest grooming cost position in the grooming candidate set as the low cost region.

In one embodiment, to select a low cost region, the low cost module 606 compares stored grooming costs for regions of the grooming candidate set, such as grooming costs that the grooming candidate set module 604 stores, without updating or re-determining the grooming costs. Comparing stored grooming costs instead of updating grooming costs with each selection, in certain embodiments, is more efficient than re-determining each grooming cost for each low cost region selection. In other embodiments, the low cost module 606 may update or re-determine one or more grooming costs, such as a grooming cost for a low cost region (to ensure that the low cost region still has the lowest grooming cost), grooming costs for members of the grooming candidate set, or the like to define a low cost region.

In one embodiment, the low cost module 606 defines a low cost region from the grooming candidate set in response to the grooming candidate set module 604 adding a selected region to the grooming candidate set. For example, in certain embodiments, in response to a request for a low cost region to groom or another storage capacity recovery event, the grooming cost module 602 may examine grooming costs for selected regions until the grooming candidate set module 604 adds a selected region to the grooming candidate set and the low cost module 606 may designate or otherwise define a low cost region to satisfy the request for a low cost region once the grooming candidate set module 604 adds the selected region to the grooming candidate set, or the like. In a further embodiment, the low cost module 606 may define a low cost region in anticipation of a storage capacity recovery event, or the like.

Figure 7:
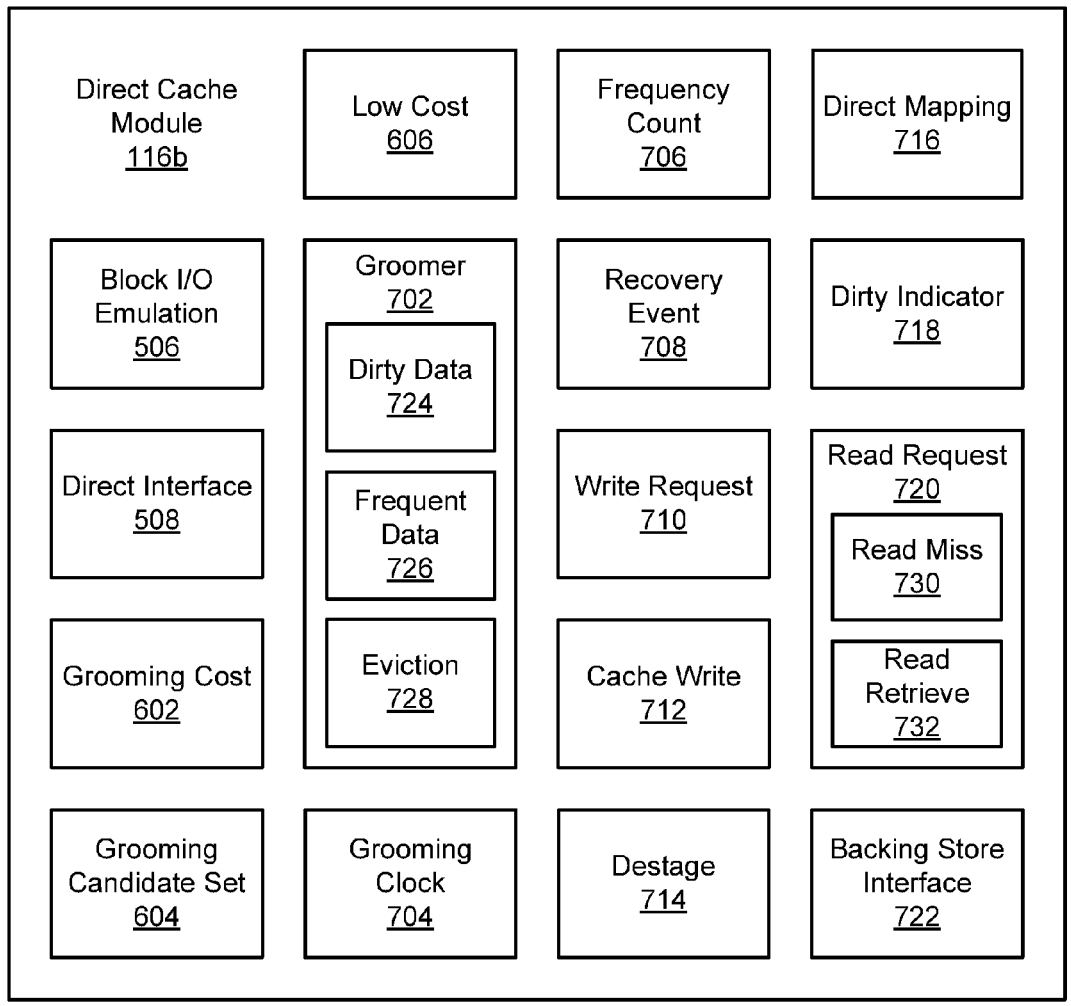
FIG. 7 is a schematic block diagram illustrating another embodiment of a direct cache module in accordance with the present invention.

FIG. 7 depicts another embodiment of the direct cache module 116b. In the depicted embodiment, the direct cache module 116b includes the block I/O emulation layer 506, the direct interface layer 508, the grooming cost module 602, the grooming candidate set module 604, and the low cost module 606 as described above with regard to FIGS. 5 and 6. The direct cache module 116b, in the depicted embodiment, further includes a groomer module 702, a grooming clock module 704, a frequency count module 706, a recovery event module 708, a write request module 710, a cache write module 712, a destage module 714, a direct mapping module 716, a dirty indicator module 718, a read request module 720, and a backing store interface module 722. The direct cache module 116b, in certain embodiments, may be substantially similar to the direct cache module 116 of FIGS. 1A and 1B, the direct cache module 116 of FIG. 5, and the direct cache module 116a of FIG. 6.

In one embodiment, the groomer module 702 recovers storage capacity of a low cost region that the low cost module 606 defines. As described above with regard to FIG. 6, in various embodiments, the grooming cost module 602, the grooming candidate set module 604, and the low cost module 606 cooperate to examine grooming costs of selected regions of the cache 102, maintain a grooming candidate set of the N lowest grooming cost regions, and defines a region from the grooming candidate set as a low cost region. Defining a low cost region based on periodic examination of grooming costs for each region of storage and maintaining a grooming candidate set, in one embodiment, allows the direct cache module 116*b* to select a low cost region for grooming with the lowest known grooming cost without the overhead and time of re-determining grooming costs for each region with every low cost region selection.

The groomer module 702, in certain embodiments, recovers storage capacity of a low cost region in response to a storage capacity recovery event, as described below with regard to the recovery event module 708. In the depicted embodiment, the groomer module 702 includes a dirty data module 724, a frequent data module 726, and an eviction module 728. In one embodiment, the groomer module 702 recovers storage capacity of a low cost region by copying forward or otherwise retaining certain types of data from the low cost region to optimize cache efficiency and by evicting or otherwise clearing other types of data from the low cost region to optimize storage efficiency of the cache 102.

In one embodiment, the groomer module 702 relocates or otherwise retains certain types of valid data that is in a low cost region to preserve the valid data, to service storage requests, or the like. The groomer module 702, in certain embodiments, uses the dirty data module 724 to relocate or copy forward dirty data that has not been destaged upon grooming the dirty data of a low cost region to preserve the dirty data. In another embodiment, the groomer module 702 may selectively relocate or copy forward clean data that has already been destaged, such as clean data identified as frequent data, or the like. In another embodiment, instead of relocating or copying forward dirty data of a low cost region, the destage module 714 described below destages the dirty data in response to the low cost module 606 selecting the low cost region for grooming, or the like.

In one embodiment, the groomer module 702 uses the frequent data module 726 to relocate or copy forward data identified as frequently accessed data from a low cost region, to retain the frequently accessed data in the cache 102. The frequent data module 726, in various embodiments, may retain cached read data identified as frequently accessed, cached clean write data identified as frequently accessed, or both cached read data and clean write data identified as frequently accessed. The frequent data module 726, in a further embodiment, identifies frequently accessed data based on a frequency count, such as a map, bit field, bit array, frequent data flags, and/or other frequent data indicators. In one embodiment, the frequent data module 726 identifies frequently accessed data of a low cost region to copy forward or otherwise retain using a frequency count that the grooming candidate set 604 maintains for the low cost region. In certain embodiments, using a frequency count maintained by the grooming candidate set module 604 may reduce accesses to the physical storage media 110 of the low cost region and/or may otherwise increase storage efficiency of the cache 102.

In one embodiment, the frequent data module 726 may handle frequently accessed data of a low cost region differently based on a grooming mode of the groomer module 702. In certain embodiments, the groomer module 702 may operate in a plurality of modes, such as a low pressure groom mode, a high pressure groom mode, or the like. For example, the groomer module 702 may transition from a low pressure groom mode to a high pressure groom mode in response to a lack of available storage capacity in the cache 102, a percentage of data marked as invalid reaching a predefined threshold level, performance of the cache 102 crossing a threshold value, in response to a storage capacity recovery event described below with regard to the recovery event module 708, or the like.

The frequent data module 726, in one embodiment, retains cached data identified as frequently accessed data when the groomer module 702 is in a low pressure groom mode and the frequent data module 726 allows the eviction module 728 to evict cached data identified as frequently accessed data when the groomer module 702 is in a high pressure groom mode. By processing frequently accessed data differently in a high pressure groom mode than in a low pressure groom mode, in certain embodiments, the groomer module 702 optimizes cache efficiency by retaining frequently accessed data when there is low grooming pressure, while optimizing storage capacity recovery when there is high grooming pressure.

The eviction module 728, in one embodiment, evicts, trims, erases, or otherwise clears data from a low cost region to recover the storage capacity of the low cost region. Erasing data from a low cost region without relocating the data evicts the data from the cache 102. In one embodiment, the groomer module 702 and/or the eviction module 728 clears or erases all data in a low cost region of the physical storage media 110 in response to the dirty data module 724 and/or the frequent data module 726 retaining or copying forward dirty write data and/or frequent data from the low cost region, evicting data that is not retained or copied forward from the cache 102. In a further embodiment, the dirty data module 724 and/or the frequent data module 726 may mark data to be retained as valid and/or the eviction module 728 may mark data to be evicted as invalid, and a separate garbage collection process of the groomer 702 may retain the valid data and erase or otherwise clear the invalid data.

In one embodiment, the groomer module 702 includes or is part of an autonomous garbage collector system that operates within the cache 102. This allows the cache 102 to manage data so that data is systematically spread throughout the solid-state storage media 110, or other physical storage media, to improve performance, data reliability and to avoid overuse and underuse of any one location or area of the solid-state storage media 110 and to lengthen the useful life of the solid-state storage media 110.

The groomer module 702, upon recovering a low cost region of the physical storage media 110, allows the cache 102 to re-use the region of the physical storage media 110 to store different data. In one embodiment, the groomer module 702 adds the recovered region of physical storage media 110 to an available storage pool for the cache 102, or the like. The groomer module 702 and/or the eviction module 728, in one embodiment, erase existing data in a low cost region. In a further embodiment, the groomer module 702 and/or the eviction module 728 allow the cache 102 to overwrite existing data in a low cost region. Whether or not the groomer module 702, in various embodiments, erases existing data in a low cost region may depend on the nature of the physical storage media 110. For example, Flash media requires that cells be erased prior to reuse where magnetic media such as hard drives does not have that requirement. In an embodiment where the groomer module 702 does not erase data in a low cost region, but allows the cache 102 to overwrite data in the low cost region, the groomer module 702, in certain embodiments, may mark the data in the low cost region as unavailable to service read requests so that subsequent requests for data in the low cost region return a null result or an empty set of data until the cache 102 overwrites the data.

In one embodiment, the groomer module 702 recovers storage capacity of the cache 102 one or more storage regions at a time, such as a series of low cost regions defined by the low cost module 606, or the like. A storage region, in one embodiment, is a logical or physical erase block or other predefined division. For flash memory, an erase operation on an erase block writes ones to every bit in the erase block. This is a lengthy process compared to a program operation which starts with a location being all ones, and as data is written, some bits are changed to zero. However, where the solid-state storage 110 is not flash memory or has flash memory where an erase cycle takes a similar amount of time as other operations, such as a read or a program, the eviction module 728 may erase the data of a storage division as it evicts data, instead of a separate garbage collection process of the groomer module 702.

In one embodiment, allowing the eviction module 728 to mark data as invalid rather than actually erasing the data and allowing the groomer module 702 to recover the physical media associated with invalid data, increases efficiency because, as mentioned above, for flash memory and other similar storage an erase operation takes a significant amount of time. Allowing the groomer module 702 to operate autonomously and opportunistically within the cache 102 provides a way to separate erase operations from reads, writes, and other faster operations so that the cache 102 operates very efficiently.

In one embodiment, the grooming clock module 704 selects regions of the cache 102 for the grooming cost module 602 to examine. The grooming clock module 704, in a further embodiment, selects next regions of the cache 102 for the grooming cost module 602 to examine successively until the grooming candidate set module 604 determines that a grooming cost for a selected region satisfies a grooming cost threshold and adds the selected region to the grooming candidate set. The grooming clock module 704, in certain embodiments, organizes regions of the cache 102 in a circular, repeating, and/or cyclical data structure so that the grooming clock module 704 periodically selects each region of the cache 102 in turn for the grooming cost module 602 to examine. In one embodiment, the circular arrangement of regions of the cache 102 may be referred to as a grooming clock.

The grooming clock module 704, in one embodiment, may arrange regions of the cache 102 using a circular or repeating data structure with identifiers, pointers, references, or the like for each region. In another embodiment, the grooming clock module 704 may arrange regions of the cache 102 using a known physical or logical order of the regions, with or without a dedicated data structure for the regions, or the like. For example, in one embodiment, the grooming clock module 704 may maintain a linked-list or other data structure of regions of the cache with pointers or other references between regions in the list forming a logical circle. In another example embodiment, the grooming clock module 704 may select regions of the cache 102 in order, for example based on an erase block identifier or the like, and may cycle through the regions, selecting a first region after selecting a last region to continue the cycle, and so on, providing a circular, repeating pattern of selections.

In one embodiment, the order of regions in the circular arrangement is substantially constant, so that the grooming clock module 704 selects each region once for each period around the circular data structure. For example, the grooming clock module 704 may order regions in address order, erase block identifier order, or the like so that the order of the regions is constant regardless of the relative positions of the regions in a log of the cache 102. In another embodiment, the grooming clock module 704 may reorder the regions in the circular data structure as the regions are groomed, removed from a log of the cache 102, recycled, and used in a new position in the log, ordering the regions in log order, or the like.

In one embodiment, the grooming clock module 704 initially selects a region for the grooming cost module 602 to examine in response to a storage capacity recovery event as described below with regard to the recovery event module 708. The grooming clock module 704, in a further embodiment, continues to select successive next regions for the grooming cost module 602 to examine until a grooming cost for a selected region satisfies a grooming cost threshold, the grooming candidate set module 604 adds the selected region to the grooming candidate set, and the low cost module 606 defines a low cost region for the groomer 702 to groom. In another embodiment, the grooming clock module 704 may continue to select next regions for the grooming cost module 602 to examine until the groomer module 702 recovers a predefined amount of storage capacity, or the like. In certain embodiments, the grooming clock module 704 may maintain a pointer or other reference to a currently selected region to maintain a current position in the circular arrangement of regions between storage capacity recovery events.

In one embodiment, the frequency count module 706 provides a frequency count for a selected region to the grooming cost module 602 to use in determining a grooming cost for the selected region. As described above, in various embodiments, a frequency count may be relative to the life of cached data in the cache 102, relative to a predefined time period such as one or more periods of the circular grooming data structure, or the like. In one embodiment, the frequency count module 706 identifies data as frequently accessed and includes the data in a frequency count in response to a predefined number of accesses of the data in a predefined time period. For example, in one embodiment, the frequency count module 706 identifies data as recent data in response to a first access or read of the data and identifies the data as frequent data in response to one or more subsequent accesses or reads of the data, or the like.

The storage controller 104, in one embodiment, provides a frequency count for a selected region to the frequency count module 706 at request of the frequency count module 706. In another embodiment, the frequency count module 706 counts or tallies blocks of data identified as frequently accessed data for a selected region. The frequency count module 706 may count or tally frequently accessed data by traversing a map, a bit field, a bit array, frequent data flags, or the like, for a selected region and incrementing a counter for each block of data identified as frequently accessed, or the like. In one embodiment, the storage controller 104 provides a map, a bit field, a bit array, frequent data flags, or the like for a selected region to the frequency count module 706. In another embodiment, the frequency count module 706 maintains a map, a bit field, a bit array, frequent data flags, or the like indicating which data in a selected region is frequently accessed data.

In one embodiment, the frequency count module 706 clears a frequency count for a region after the grooming clock module 704 selects the region and the grooming cost module 602 determines and/or examines a grooming cost for the region. The grooming candidate set module 604, in certain embodiments, retains a copy of the frequency count for a region that the grooming candidate set module 604 adds to the grooming candidate set. As described above with regard to the grooming candidate set module 604 of FIG. 6, in certain embodiments, the frequency count for a region includes a map, a bit field, a bit array, frequent data flags, or the like indicating which blocks of data in the region are identified as frequently accessed.

By clearing the frequency counts for regions of the cache 102 each period of the circular grooming data structure, in certain embodiments, the frequency counts that the frequency count module 706 provides are relative to a number of blocks or other amount of data in a region that have been accessed at least a predetermined number of times during a predefined time period, or period of the circular grooming data structure. In a further embodiment, due to the frequency count module 706 periodically clearing frequency counts, each subsequent grooming cost that the grooming cost module 602 examines for a selected region may be based at least partially on a new frequency count for the selected region that is specific to the current period of the circular grooming data structure. In other embodiments, the frequency count module 706 may clear frequency counts every N periods of the circular grooming data structure, for example every other period, every third period, every fourth period, etc.

In one embodiment, the recovery event module 708 detects and/or initiates a storage capacity recovery event for the cache 102. A storage capacity recovery event is an event that triggers recovery of storage capacity of the cache 102. The recovery event module 708, in certain embodiments, monitors the storage controller 104 and/or the cache 102 for the occurrence of a storage capacity recovery event. In another embodiment, the recovery event module 708 may receive a storage capacity recovery event notification, such as a storage capacity recovery request, or the like, from another module, from the storage controller 102, from the host device 114, or the like.

In one embodiment, a storage capacity recovery event includes a grooming pressure for the cache exceeding a predefined grooming pressure threshold. In another embodiment, a storage capacity recovery event may include an available storage capacity of the cache 102 falling below a predefined available capacity threshold. A storage capacity recovery event, in a further embodiment, may include a percentage of data marked as invalid in the cache 102 reaching a predefined invalid data threshold level. In various other embodiments, a storage capacity recovery event may include a consolidation of valid data, an error detection rate reaching a threshold value, performance crossing a threshold value, a scheduled garbage collection or grooming cycle, or the like.

In one embodiment, the write request module 710 detects one or more write requests to store data on the backing store 118. The write request module 710 may detect a write request by receiving the write request directly, detecting a write request sent to a different module or entity (such as detecting a write request sent directly to the backing store 118), or the like. In one embodiment, the host device 114 sends the write request. The direct cache module 116*b*, in one embodiment, represents itself to the host device 114 as a storage device, and the host device 114 sends write requests directly to the write request module 710.

A write request, in one embodiment, includes data that is not stored on the backing store 118. Data that is not stored on the backing store 118, in various embodiments, includes new data not yet stored on the backing store 118, modifications to data that is stored on the backing store 118, and the like. The write request, in various embodiments, may directly include the data, may include a reference, a pointer, or an address for the data, or the like. For example, in one embodiment, the write request includes a range of addresses indicating data to be stored on the backing store 118 by way of a Direct Memory Access ("DMA") or Remote DMA ("RDMA") operation. In a further embodiment, a single write request may include several different contiguous and/or noncontiguous ranges of addresses or blocks. In a further embodiment, the write request includes one or more destination addresses for the data, such as logical and/or physical addresses for the data on the cache 102 and/or on the backing store 118. The write request module 710 and/or another cooperating module, in various embodiments, may retrieve the data of a write request directly from the write request itself, from a storage location referenced by a write request (i.e., from a location in system memory or other data storage referenced in a DMA or RDMA request), or the like.

The cache write module 712, in one embodiment, writes data of a write request to the cache 102 to cache the data in the cache 102. The cache write module 712, in another embodiment, caches the data of the write request to the cache 102 at one or more logical addresses of the cache 102 corresponding to one or more backing store addresses of the write request. In one embodiment, the cache write module 712 caches the data to the cache 102 by appending the data to a sequential, log-based writing structure preserved in the physical storage media 110 of the cache 102 at an append point. The cache write module 712, in one embodiment, returns one or more physical addresses corresponding to a location of the append point at which the data was appended to a direct mapping module such as the direct mapping module 716 described below, which maps the one or more logical addresses of the cache 102 to the one or more physical addresses corresponding to the append point.

The destage module 714, in one embodiment, destages cached data from the cache 102 to the backing store 118. The destage module 714 destages data to the backing store 118 by copying, writing, storing, or otherwise persisting the data in the backing store 118. The destage module 714 destages dirty write data that the backing store 118 does not yet store. Data that is stored in the cache 102 that is not yet stored in the backing store 118 is referred to as "dirty" data. Once the backing store 118 stores data, the data is referred to as "clean." The destage module 714 destages or cleans data in the cache 102 by writing the data to the backing store 118.

As discussed in greater detail below with regard to the dirty indicator module 718, in certain embodiments, the destage module 714 accesses one or more dirty data indicators to determine which data in the cache 102 is dirty and is a candidate for destaging. In various embodiments, a dirty data indicator may include one or more flags, one or more bit fields, one or more bit arrays, or the like. Dirty data indicators, in various embodiments, may be stored in a mapping structure, in a reverse map, in volatile memory of the cache 102 or the host device 114, in a region of data such as an erase block or a packet, and/or in other data storage accessible to the destage module 714. In a further embodiment, the destage module 714 may store dirty indicators on volatile memory and may also store at least enough information to reconstruct the dirty indicators in the storage media 110 of the cache 102. In one embodiment, the destage module 714 updates one or more dirty data indicators in response to successfully destaging data to the backing store 118 so that the one or more dirty data indicators indicate that the destaged data is clean.

The destage module 714, in one embodiment, may determine an address for selected destage data in the backing store 118 based on a write request corresponding to the data. In a further embodiment, the destage module 714 determines an address for destage data in the backing store 118 based on a logical address of the data in the cache 102, based on a cache index, a mapping structure, or the like. In another embodiment, the destage module 714 uses a reverse map or the like to determine an address for destage data in the backing store 118 based on a physical address of the data in the cache 102.

The destage module 714, in one embodiment, writes data to the backing store 118 based on a write policy. In one embodiment, the destage module 714 uses a write-back write policy, and does not immediately write data of a write request to the backing store 118 upon detecting the write request. Instead, the destage module 714, in one embodiment, performs an opportunistic or "lazy" write, destaging data to the backing store 118 when the low cost module 606 defines a region associated with the data as a low cost region, when the cache 102 and/or the direct cache module 116b has a light load, when available storage capacity in the cache 102 falls below a threshold, to satisfy a destaging pressure or target destage rate, or the like. In certain write-back embodiments, the destage module 714 may read data from the cache 102 and write the data to the backing store 118.

In another embodiment, instead of cleaning data according to a write-back write policy, the destage module 714 uses a write-through policy, performing a synchronous write to the backing store 118 for each write request that the write request module 710 receives. The destage module 714, in one embodiment, transitions from a write-back to a write-through write policy in response to a predefined error condition, such as an error or failure of the cache 102, or the like.

In one embodiment, the destage module 714 does not invalidate or evict destaged data from the cache 102, but destaged data remains in the cache 102 to service read requests until the destaged data is evicted from the cache by a separate eviction process. In a further embodiment, the destage module 714 may invalidate, clear, or evict destaged data from the cache 102 once the backing store 118 stores the data. In certain embodiments, evicting data upon destaging may lead to an increase in cache misses, but may also increase a speed or efficiency of garbage collection/grooming of the cache 102 by the groomer module 702.

The direct mapping module 716, in one embodiment, directly maps logical or physical addresses of the backing store 118 ("backing store addresses") to logical addresses of the cache 102 and directly maps logical addresses of the cache 102 to the backing store addresses of the backing store 118. As used herein, direct mapping of addresses means that for a given address in a first address space there is exactly one corresponding address in a second address space with no translation or manipulation of the address to get from an address in the first address space to the corresponding address in the second address space. The direct mapping module 716, in a further embodiment, maps backing store addresses to logical addresses of the cache 102 such that each backing store 118 address has a one to one relationship with a logical address of the cache 102. In one embodiment, the logical addresses of the cache 102 are independent of the physical addresses of the physical storage media 110 for the cache 102 and the physical addresses of the physical storage media 110 of the cache 102 are fully associative with backing store addresses of the backing store 118.

In one embodiment, the direct mapping module 716 maps the backing store addresses directly to logical addresses of the cache 102 so that the backing store addresses of the backing store 118 and the logical addresses of the cache 102 are equal or equivalent. In one example of this embodiment, the backing store addresses and the logical addresses of the cache 102 share a lower range of the logical address space of the cache 102, such as addresses between about $0-2^{32}$, or the like.

In one embodiment, the direct mapping module 716 directly maps logical addresses of the cache 102 to physical addresses and/or locations on the physical storage media 110 of the cache 102. In a further embodiment, the direct mapping module 716 uses a single mapping structure to map backing store addresses to logical addresses of the cache 102 and to map logical addresses of the cache 102 to locations on the physical storage media 110 of the cache 102. The mapping structure, in various embodiments, may include a B-tree, B*-tree, B+-tree, a CAM, a binary tree, a hash table, an index, an array, a linked-list, a look-up table, or another mapping data structure.

Use of a B-tree as the mapping structure in certain embodiments, is particularly advantageous where the logical address space presented to the client is a very large address space (such as $2^{64}$ addressable blocks or the like—which may or may not be sparsely populated). Because B-trees maintain an ordered structure, searching such a large space remains very fast. For example, in one embodiment, the mapping structure includes a B-tree with multiple nodes and each node may store several entries. In the example embodiment, each entry may map a variable sized range of logical addresses of the cache 102 to a location (such as a starting location) on the physical storage media 110 of the cache 102. Furthermore, the number of nodes in the B-tree may vary as the B-tree grows wider and/or deeper.

In one embodiment, the mapping structure of the direct mapping module 716 only includes a node or entry for logical addresses of the cache 102 that are associated with currently cached data in the cache 102. In this embodiment, membership in the mapping structure represents membership in the cache 102. The direct mapping module 716, in one embodiment, adds entries, nodes, and the like to the mapping structure as data is stored in the cache and removes entries, nodes, and the like from the mapping structure in response to data being evicted, cleared, trimmed, or otherwise removed from the cache 102.

Similarly, membership in the mapping structure may represent valid allocated blocks on the solid-state storage media 110. The solid-state storage controller 104 (and/or the direct mapping module 716), in one embodiment, adds entries, nodes, and the like to the mapping structure as data is stored on the solid-state storage media 110 and removes entries, nodes, and the like from the mapping structure in response to data being invalidated cleared, trimmed, or otherwise removed from the solid-state storage media 110. In the case where the mapping structure is shared for both cache management and data storage management on the solid-state storage media 110, the dirty indicator module 718 described below, in certain embodiments, may also track whether the data is dirty or not to determine whether the data is persisted on the backing store 118. The address order module 724, in a further embodiment, may also traverse the mapping structure to locate ranges of data in backing store address order, may request ranges of data in backing store address order from the direct mapping module 716, or the like.

In a further embodiment, the mapping structure of the direct mapping module 716 may include one or more nodes or entries for logical addresses of the cache 102 that are not associated with currently stored data in the cache 102, but that are mapped to addresses of the backing store 118 that currently store data. The nodes or entries for logical addresses of the cache 102 that are not associated with currently stored data in the cache 102, in one embodiment, are not mapped to locations on the physical storage media 110 of the cache 102, but include an indicator that the cache 102 does not store data corresponding to the logical addresses. The nodes or entries, in a further embodiment, may include information that the data resides in the backing store 118. For example, in certain embodiments, the mapping structure of the direct mapping module 716 may include nodes or entries for read misses, data of which the backing store 118 stores but the cache 102 does not currently store.

Nodes, entries, records, or the like of the mapping structure, in one embodiment, may include information (such as physical addresses, offsets, indicators, etc.) directly, as part of the mapping structure, or may include pointers, references, or the like for locating information in memory, in a table, or in another data structure. The direct mapping module 716, in one embodiment, optimizes the mapping structure by monitoring the shape of the mapping structure, monitoring the size of the mapping structure, balancing the mapping structure, enforcing one or more predefined rules with regard to the mapping structure, ensuring that leaf nodes of the mapping structure are at the same depth, combining nodes, splitting nodes, and/or otherwise optimizing the mapping structure.

The direct mapping module 716, in one embodiment, stores the mapping structure on the solid-state storage media 110 of the cache 102. By storing the mapping structure on the cache 102, in a further embodiment, the mapping of addresses of the backing store 118 to the logical addresses of the cache 102 and/or the mapping of the logical addresses of the cache 102 to locations on the physical storage media 110 of the cache 102 are persistent, even if the cache 102 is subsequently paired with a different host device 114. In one embodiment, the backing store 118 is also subsequently paired with the different host device 114. In a further embodiment, the cache 102 rebuilds or restores at least a portion of data from the backing store 118 on a new storage device associated with the different host device 114, based on the mapping structure and data stored on the cache 102.

In one embodiment, the direct mapping module 716 determines one or more factors of the grooming cost of a selected region for the grooming cost module 602 based on a history of access to the mapping structure. The direct mapping module 716, in a further embodiment, identifies areas of high frequency, "hot," use and/or low frequency, "cold," use by monitoring accesses of branches or nodes in the mapping structure. The direct mapping module 716, in a further embodiment, determines a count or frequency of access to a branch, directed edge, or node in the mapping structure. In one embodiment, a count associated with each node of a b-tree like mapping structure may be incremented for each I/O read operation and/or each I/O write operation that visits the node in a traversal of the mapping structure. Of course, in certain embodiments, separate read counts and write counts may be maintained for each node. Certain counts may be aggregated to different levels in the mapping structure in other embodiments.

The direct mapping module 716, the grooming cost module 602, and/or the groomer module 702, in one embodiment, share information to increase the efficiency of the cache 102, to reduce cache misses, to make intelligent eviction decisions, and the like. In one embodiment, the direct mapping module 716 tracks or monitors a frequency that I/O requests access logical addresses in the mapping structure. The direct mapping module 716, in a further embodiment, stores the access frequency information in the mapping structure, communicates the access frequency information to the grooming cost module 602, or the like. The direct mapping module 716, in another embodiment, may track, collect, or monitor other usage/access statistics relating to the logical to physical mapping of addresses for the cache 102 and/or relating to the mapping between the logical address space of the cache 102 and the address space of the backing store 118, and may share that data with the grooming cost module 602.

One example of a benefit of sharing information between the destage module 714, the direct mapping module 716, the grooming cost module 602, and the groomer module 702, in certain embodiments, is that write amplification can be reduced. As described above, in one embodiment, the groomer module 702 copies certain valid data in a low cost region forward to the current append point of the log-based append-only writing structure of the cache 102 before recovering the physical storage capacity of the low cost region. By cooperating with the destage module 714, the direct mapping module 716, and/or with the grooming cost module 602, in one embodiment, the groomer module 702 may clear certain valid data from a region without copying the data forward (for example because the grooming cost algorithm for the grooming cost module 602 indicates that the valid data is unlikely to be re-requested soon, giving the region a low grooming cost), reducing write amplification, increasing available physical storage capacity and efficiency. The groomer module 702 can even clear valid user write data from an erase block, so long as the destage module 714 has destaged the data to the backing store 118.

For example, in one embodiment, the groomer module 702 preserves valid data with an access frequency in the mapping structure that is above a predefined threshold, and clears valid data from an erase block if the valid data has an access frequency below the predefined threshold, as described above with regard to the frequent data module 726. In a further embodiment, the eviction module 728 may mark certain data as conditionally evictable, conditionally invalid, or the like, and the groomer module 702 may evict the conditionally invalid data based on an access frequency or other data that the direct mapping module 716 provides. In another example, the destage module 714, the direct mapping module 716, the grooming cost module 602, and the groomer module 702 may cooperate such that valid data that is in the cache 102 and is dirty gets stored on the backing store 118 by the destage module 714 rather than copied to the front of the log, or the like.

Those of skill in the art will appreciate a variety of other examples and scenarios in which the modules responsible for managing the non-volatile storage media 110 that uses a log-based append-only writing structure can leverage the information available in the direct cache module 116b. Furthermore, those of skill in the art will appreciate a variety of other examples and scenarios in which the modules responsible for managing the cache 102 (destage module 714, direct mapping module 716, groomer module 702, and/or grooming cost module 602) can leverage the information available in solid-state controller 104 regarding the condition of the non-volatile storage media 110.

In one embodiment, the dirty indicator module 718 sets an indicator that the destage module 714 has destaged data to the backing store 118 to track which data is clean and which data is dirty. The dirty indicator module 718, in one embodiment, sets the indicator that the backing store 118 stores the data once the destage module 714 has successfully written the data to the backing store 118. Setting the indicator (dirty/clean indicator) that the backing store 118 stores the data, in one embodiment, prevents the destage module 714 from destaging data a second time once the destage module 714 has already destaged the data. In a further embodiment, setting the indicator that the backing store 118 stores the data may affect a grooming cost that the grooming cost module 602 examines for a region associated with the data, may alert a garbage collection or grooming process, such as the groomer module 702, that the data may be cleared from the cache 102, or the like.

In one embodiment, the dirty indicator module 718 sets an indicator that the backing store 118 stores data by marking the data as clean in the cache 102. In a further embodiment, the dirty indicator module 718 may set an indicator that the backing store 118 stores data by communicating an address of the data to the direct mapping module 716 or by sending a request to the direct mapping module 716 to update an indicator in a logical to physical mapping or other mapping structure. In another embodiment, the dirty indicator module 718 may set an indicator that the backing store 118 stores data by updating one or more indicators for a region of data in the cache 102, or the like. For example, in certain embodiments, the dirty indicator module 718 may maintain a map, bit field, or bit array for one or more regions of the cache 102 representing which data is dirty and which data is clean within the one or more regions. In the map, bit fields, or bit arrays, in one embodiment, each bit represents a block such as a packet, a page, a sector, a range of data, or the like within a region, with one binary state indicating that the block is dirty and the other binary state representing that the block is clean.

In one embodiment, the read request module 720 services read requests for data stored in the cache 102 and/or the backing store 118. The read request module 720, in one embodiment, detects a read request to retrieve requested data from the backing store 118. In a further embodiment, the read request module 720 receives read requests from the host device 114. A read request is a read command with an indicator, such as a logical address or range of logical addresses, of the data being requested. In one embodiment, the read request module 720 supports read requests with several contiguous and/or noncontiguous ranges of logical addresses, as discussed above with regard to the write request module 710.

In the depicted embodiment, the read request module 720 includes a read miss module 730 and a read retrieve module 732. The read miss module 730, in one embodiment, determines whether or not requested data is stored in the cache 102. The read miss module 730 may query the cache 102 directly, query the direct mapping module 716, query the mapping structure of the direct mapping module 716, or the like to determine whether or not requested data is stored in the cache 102.

The read retrieve module 732, in one embodiment, returns requested data to the requesting entity, such as the host device 114. If the read miss module 730 determines that the cache 102 stores the requested data, in one embodiment, the read retrieve module 732 reads the requested data from the cache 102 and returns the data to the requesting entity. The direct mapping module 716, in one embodiment, provides the read retrieve module 732 with one or more physical addresses of the requested data in the cache 102 by mapping one or more logical addresses of the requested data to the one or more physical addresses of the requested data.

If the read miss module 730 determines that the cache 102 does not store the requested data, in one embodiment, the read retrieve module 732 reads the requested data from the backing store 118, writes the requested data to the cache 102, and returns the requested data to the requesting entity. In one embodiment, the read retrieve module 732 writes the requested data to the cache 102 by appending the requested data to an append point of a log-based writing structure of the cache 102. In a further embodiment, the read retrieve module 732 provides one or more physical addresses corresponding to the append point to the direct mapping module 716 with the one or more logical addresses of the requested data and the direct mapping module 716 adds and/or updates the mapping structure with the mapping of logical and physical addresses for the requested data. The read retrieve module 732, in one embodiment, writes the requested data to the cache 102 using and/or in conjunction with the cache write module 712.

In one embodiment, the read miss module 730 detects a partial miss, where the cache 102 stores one portion of the requested data but does not store another. A partial miss, in various embodiments, may be the result of eviction of the unstored data, a block I/O request for noncontiguous data, or the like. The read miss module 730, in one embodiment, reads the missing data or "hole" data from the backing store 118 and returns both the portion of the requested data from the cache 102 and the portion of the requested data from the backing store 118 to the requesting entity. In one embodiment, the read miss module 730 stores the missing data retrieved from the backing store 118 in the cache 102.

In one embodiment, the backing store interface module 722 provides an interface between the direct cache module 116b, the cache 102, and/or the backing store 118. As described above with regard to FIG. 5, in various embodiments, the direct cache module 116b may interact with the cache 102 and/or the backing store 118 through a block device interface, a direct interface, a device driver on the host device 114, a storage controller, or the like. In one embodiment, the backing store interface module 722 provides the direct cache module 116b with access to one or more of these interfaces. For example, the backing store interface module 722 may receive read commands, write commands, and clear (or TRIM) commands from one or more of the cache write module 712, the direct mapping module 716, the read request module 720, the destage module 714, the groomer module 702, and the like and relay the commands to the cache 102 and/or the backing store 118. In a further embodiment, the backing store interface module 722 may translate or format a command into a format compatible with an interface for the cache 102 and/or the backing store 118.

In one embodiment, the backing store interface module 722 has exclusive ownership over the backing store 118 and the direct cache module 116b is an exclusive gateway to accessing the backing store 118. Providing the backing store interface module 722 with exclusive ownership over the backing store 118 and preventing access to the backing store 118 by other routes obviates stale data issues and cache coherency requirements, because all changes to data in the backing store 118 are processed by the direct cache module 116b.

In a further embodiment, the backing store interface module 722 does not have exclusive ownership of the backing store 118, and the backing store interface module 722 manages cache coherency for the cache 102. For example, in various embodiments, the backing store interface module 722 may access a common directory with other users of the backing store 118 to maintain coherency, may monitor write operations from other users of the backing store 118, may participate in a predefined coherency protocol with other users of the backing store 118, or the like.

Figure 8A:
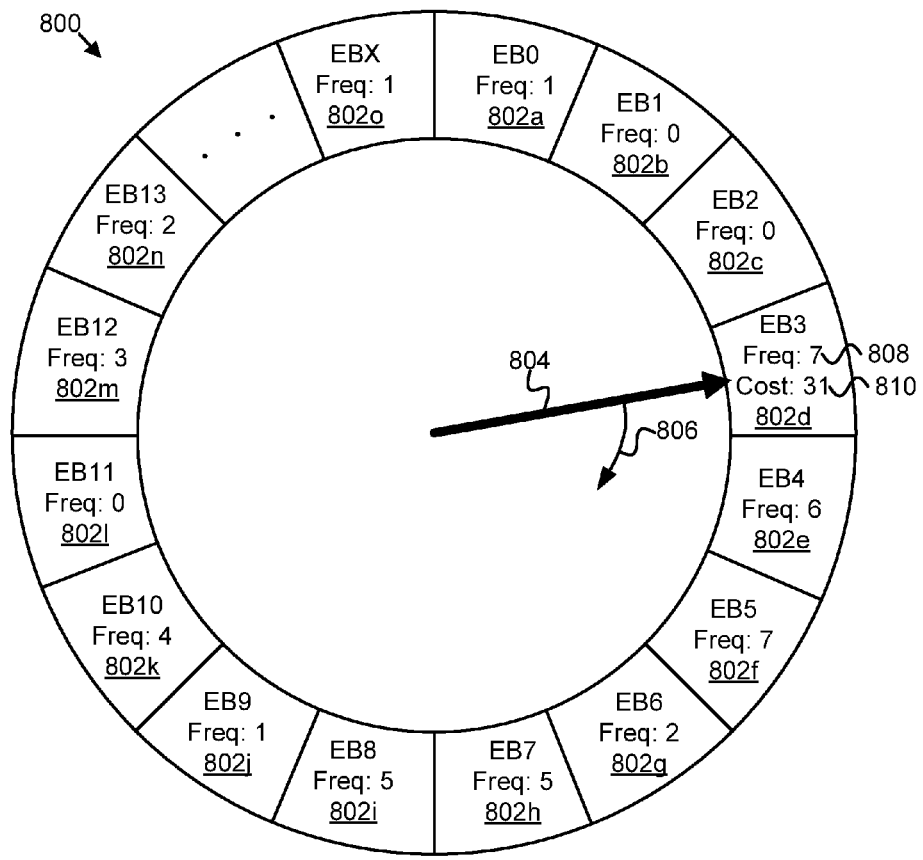
FIG. 8A is a schematic block diagram illustrating one embodiment of a circular grooming data structure and a grooming candidate set in accordance with the present invention.

FIG. 8A depicts one embodiment of a circular grooming data structure 800 and a grooming candidate set 820a. In the depicted embodiment, the circular grooming data structure 800 includes a plurality of regions 802 including "EBO" 802a-"EBX" 802o. The regions 802a-o, in the depicted embodiment, are in an erase block order. In the depicted embodiment, the regions 802a-o are embodied by logical erase blocks. In other embodiments, the regions 802a-o may include another type of region, as described above. The grooming clock module 704, in the depicted embodiment, maintains a selected region pointer 804, or clock hand, identifying a currently selected region. The currently selected region in FIG. 8A is "EB3" 802d. The grooming clock module 704, in the depicted embodiment, rotates the selected region pointer 804 in a circular pattern 806 around the circular grooming data structure 800, selecting regions 802a-o successively in turn for each period of the circular grooming data structure 800. In the depicted embodiment, each region 802a-o includes a frequency count 808 and the currently selected region "EB3" 802d includes a grooming cost 810.

The grooming candidate set 820a, in the depicted embodiment, includes N entries 822a-g identifying the N lowest cost regions 802a-o of the cache 102. In the depicted embodiment, N=7 and the grooming candidate set 820a includes 7 entries

822*a-g*. In other embodiments, different values may be selected for N. The entries 822*a-g*, in the depicted embodiment, are ordered by grooming cost 810 from lowest cost entry 822*a* to highest cost entry 822*g*. The grooming candidate set 820*a*, in the depicted embodiment, stores a grooming cost 810 and a frequency count 808 for each entry 822*a-g*. In a further embodiment, the grooming candidate set 820*a* may further preserve a copy of a map, bit field, bit array, frequent data flags, or the like for a frequency count 808 identifying frequently accessed data of a corresponding region 802*a-o*.

In one embodiment, because the entries 822*a-g* are ordered by grooming cost, the grooming cost module 602 compares the grooming cost 810 of a selected region to the grooming cost 810 of the highest cost entry 822*g* to determine whether or not to add the selected region to the grooming candidate set 820*a*, or the like. The low cost module 606, in one embodiment, defines the region of the lowest cost entry 822*a* as the low cost region. In certain embodiments, ordering the grooming candidate set 820*a* by grooming cost 810 reduces the overhead of traversing the grooming candidate set 820*a*, comparing multiple grooming costs 810, or the like for the grooming cost module 602 and/or the low cost module 606, simplifying the process of adding a selected region to the grooming candidate set 820*a* and defining a low cost region.

Figure 8B:
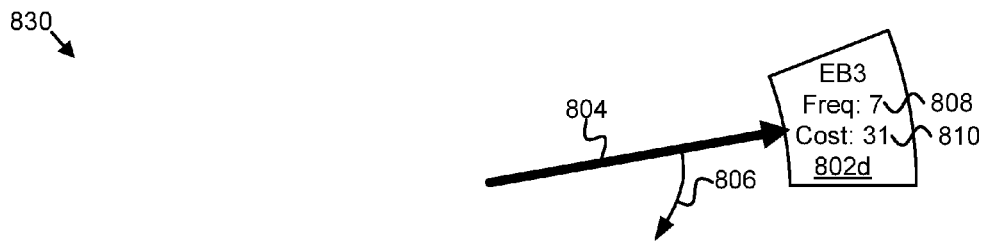
FIG. 8B is a schematic block diagram illustrating one embodiment of a region selection and a grooming candidate set in accordance with the present invention.

FIG. 8B depicts one embodiment of a region selection 830 and a grooming candidate set 820*b*. In the depicted embodiment, the grooming cost 810 of the selected region "EB3" 802*d* is "31." The grooming candidate set module 604, in the depicted embodiment, determines that the grooming cost 810 of "31" satisfies the grooming cost threshold by being lower than at least one region of the grooming candidate set 820*b*, so the grooming candidate set module 604 adds the selected region "EB3" 802*d* to the grooming candidate set 820*b* as the fifth entry 822*e*, in grooming cost order. The low cost module 606, in the depicted embodiment, defines region "EB6" 802*g* (depicted as the first entry 822*a* of the grooming candidate set 820*a* of FIG. 8A) as the low cost region, removes region "EB6" 802*g* from the grooming candidate set 820*b*, and the groomer module 702 grooms region "EB6" 802*g*.

Figure 8C:
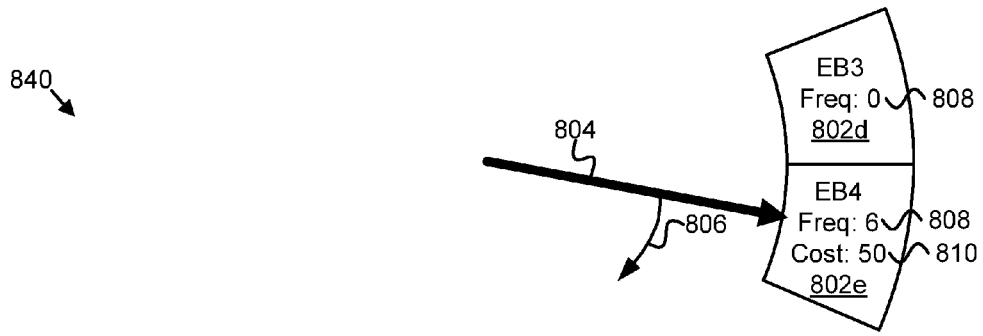
FIG. 8C is a schematic block diagram illustrating another embodiment of a region selection and a grooming candidate set in accordance with the present invention.

FIG. 8C depicts another embodiment of a region selection 840 and a grooming candidate set 820*c*. In the depicted embodiment, the frequency count module 706 clears the frequency count 808 of the previously selected region "EB3" 802*d* and the grooming clock module 704 moves the selected region pointer 804 to the next selected region "EB4" 802*e*. In one embodiment, the grooming clock module 704 selects the next region "EB4" 802*e* in response to a storage capacity recovery event, or the like. In the depicted embodiment, the grooming candidate set module 604 determines that the grooming cost 810 of the next selected region "EB4" 802*e* does not satisfy the grooming cost threshold, because the grooming cost 810 of "50" is greater than the grooming costs 810 of regions represented by entries 822*a-g* of the grooming candidate set 820*c*. In one embodiment, described below with regard to FIG. 8D, the grooming clock module 704 selects a next region as the selected region in response to the grooming cost 810 failing to satisfy the grooming cost threshold.

Figure 8D:
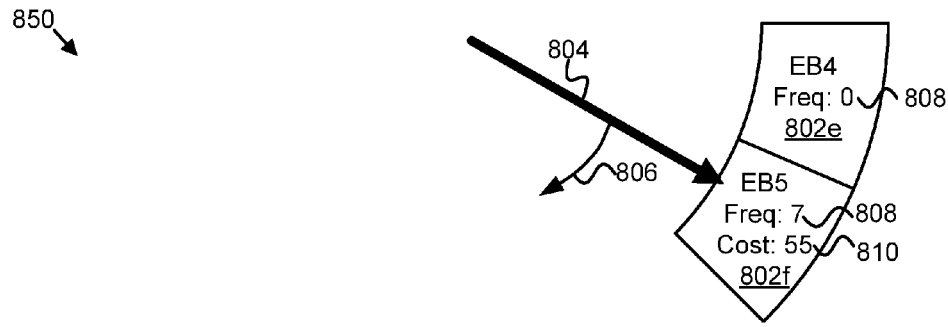
FIG. 8D is a schematic block diagram illustrating a further embodiment of a region selection and a grooming candidate set in accordance with the present invention.

FIG. 8D depicts a further embodiment of a region selection 850 and a grooming candidate set 820*d*. In the depicted embodiment, the frequency count module 706 clears the frequency count 808 of the previously selected region "EB4" 802*e* and the grooming clock module 704 moves the selected region pointer 804 to the next selected region "EB5" 802*f*. In one embodiment, the grooming clock module 704 selects the next region "EB5" 802*f* because the grooming cost 810 of the previously selected region "EB4" 802*e* failed to satisfy the grooming cost threshold. In the depicted embodiment, the grooming candidate set module 604 determines that the grooming cost 810 of the next selected region "EB5" 802*f* also does not satisfy the grooming cost threshold, because the grooming cost 810 of "55" is greater than the grooming costs 810 of regions represented by entries 822*a-g* of the grooming candidate set 820*c*. In one embodiment, described below with regard to FIG. 8D, the grooming clock module 704 selects a next region as the selected region in response to the grooming cost 810 failing to satisfy the grooming cost threshold.

Figure 8E:
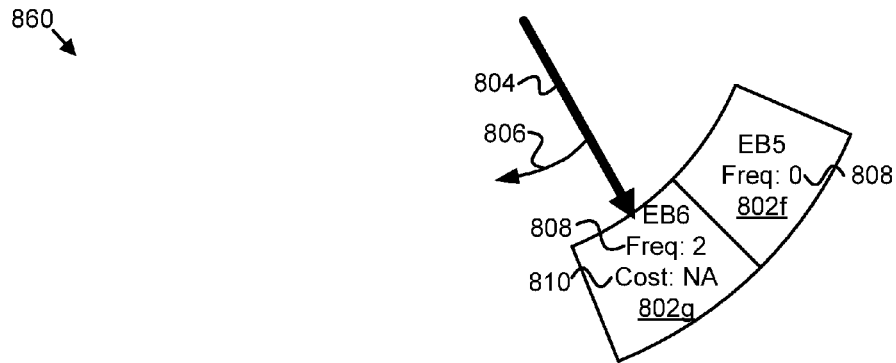
FIG. 8E is a schematic block diagram illustrating an additional embodiment of a region selection and a grooming candidate set in accordance with the present invention.

FIG. 8E depicts an additional embodiment of a region selection 860 and a grooming candidate set 802*e*. In the depicted embodiment, the frequency count module 706 clears the frequency count 808 of the previously selected region "EB5" 802*f* and the grooming clock module 704 selects a next region "EB6" 802*g* as the selected region. Because the low cost module 606 previously defined the selected region "EB6" 802*g* as the low cost region during the same cycle of the circular data structure 800, as described above with regard to FIG. 8B, this is the first selection of region "EB6" 802*g* since the groomer module 702 groomed the region 802*g*. In the depicted embodiment, the grooming clock module 704 skips the region "EB6" 802*g* and selects a next region as the selected region, as described below with regard to FIG. 8F. Skipping the region "EB6" 802*g* permits the region "EB6" 802*g* to potentially receive more requests for data of the region 802*g* which would increase the frequency count 808.

Figure 8F:
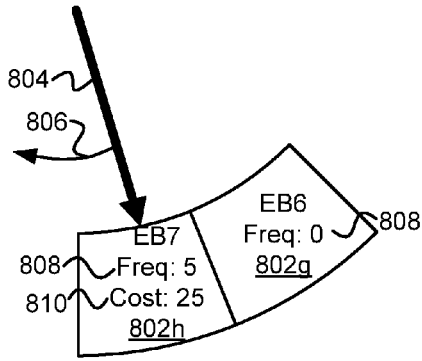
FIG. 8F is a schematic block diagram illustrating another embodiment of a region selection and a grooming candidate set in accordance with the present invention.

FIG. 8F depicts another embodiment of a region selection 870 and a grooming candidate set 820*f*. In the depicted embodiment, the frequency count module 706 clears the frequency count 808 of the previously selected region "EB6" 802*g* and the grooming clock module 704 selects a next region "EB7" 802*h* as the selected region. The selected region "EB7" 802*h*, in the depicted embodiment, is already a member of the grooming candidate set 820*f*, so the grooming candidate set module 604 updates the grooming cost 810 of the entry 822*c* for the selected region "EB7" 802*h*. The low cost module 606 defines region "EB2" 802*c* (referenced by the first entry 822*a* in the grooming candidate set 820*e* of FIG. 8E) as the low cost region. The grooming candidate set module 604 removes the low cost region "EB2" 802*c* from the grooming candidate set 820*f* and the groomer module 702 grooms the low cost region "EB2" 802*c*, leaving an empty entry 822*g* in the grooming candidate set 820*f* as "EB10" becomes the new low cost region in the lowest cost entry 822*a* position and the other grooming candidate regions from the grooming candidate set 820*f* each shift toward the lowest cost entry 822*a*.

Figure 8G:
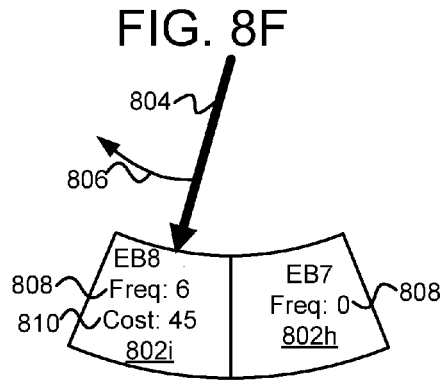
FIG. 8G is a schematic block diagram illustrating one more embodiment of a region selection and a grooming candidate set in accordance with the present invention.

FIG. 8G depicts one more embodiment of a region selection 880 and a grooming candidate set 820*g*. In the depicted embodiment, the frequency count module 706 clears the frequency count 808 of the previously selected region "EB7" 802*h*. The grooming clock module 704, in response to a storage capacity recovery event or the like, selects a next region "EB8" 802*i* as the selected region. The grooming candidate set module 604, in the depicted embodiment, adds the selected region "EB8" 802*i* to the grooming candidate set 820*g* even though the grooming cost 810 of the selected region "EB8" 802*i* is greater than the grooming costs 810 of members of the grooming candidate set 820*g*, to fill the empty entry 822*g*.

Figure 9:
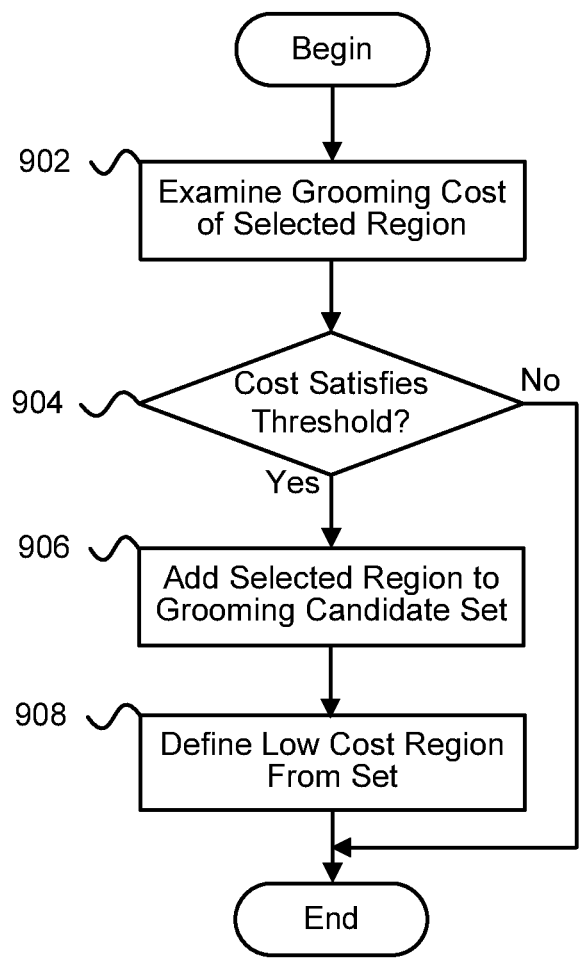
FIG. 9 is a schematic flow chart diagram illustrating one embodiment of a method for managing eviction of data in accordance with the present invention.

FIG. 9 depicts one embodiment of a method 900 for managing eviction of data from a cache 102. The method 900 begins, and the grooming cost module 602 examines 902 a grooming cost of a selected region of the cache 102. The grooming candidate set module 604 determines 904 whether the grooming cost of the selected region satisfies a grooming cost threshold.

In the depicted embodiment, if grooming candidate set module 604 determines 904 that the grooming cost of the selected region does not satisfy the grooming cost threshold, the method 900 ends. If the grooming candidate set module 604 determines 904 that the grooming cost of the selected region does satisfy the grooming cost threshold, the grooming candidate set module 604 adds 906 the selected region to the grooming candidate set. The low cost module 606 defines 908 a low cost region from the grooming candidate set and the method 900 ends.

Figure 10:
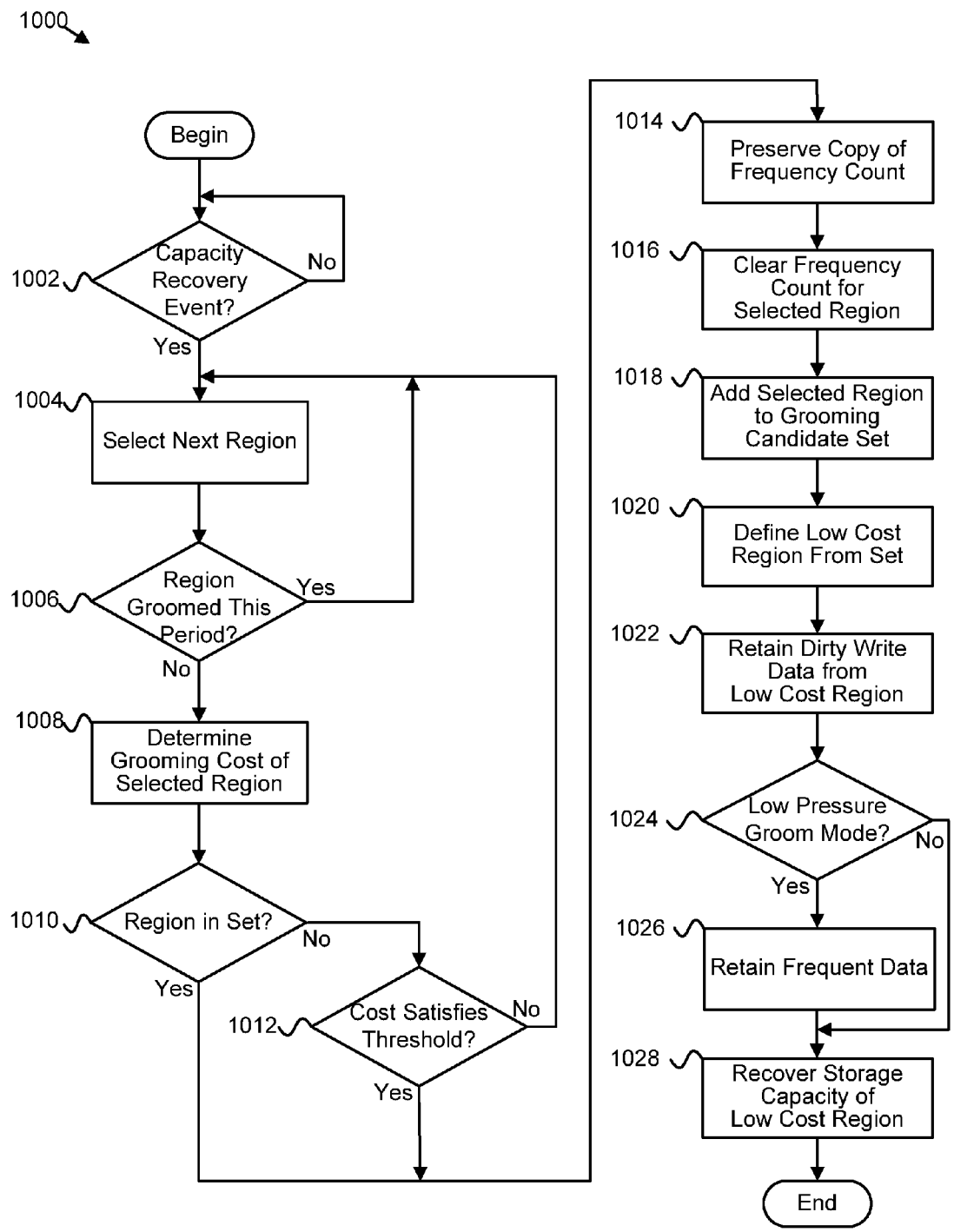
FIG. 10 is a schematic flow chart diagram illustrating another embodiment of a method for managing eviction of data in accordance with the present invention.

FIG. 10 depicts another embodiment of a method 1000 for managing eviction of data from a cache 102. The method 1000 begins and the recovery event module 708 determines 1002 whether there is a storage capacity recovery event. If the recovery event module 708 determines 1002 that there is no storage capacity recovery event, the recovery event module 708 continues to detect 1002 storage capacity recovery events. If the recovery event module 708 determines 1002 that there is a storage capacity recovery event, the grooming clock module 704 selects 1004 a next region of the cache 102 as a selected region.

The grooming clock module 704 determines 1006 whether the groomer module 702 has groomed the selected region in the current period of the circular data structure 800. If the grooming clock module 704 determines 1006 that the groomer module 702 has groomed the selected region in the current period, the grooming clock module 704 selects 1004 a next region of the cache 102 as a selected region and the method 1000 continues. If the grooming clock module 704 determines 1006 that the groomer module 702 has not groomed the selected region in the current period, the grooming cost module 602 determines 1008 a grooming cost for the selected region.

The grooming candidate set module 604 determines 1010 whether the selected region is already a member of the grooming candidate set. If the grooming candidate set module 604 determines 1010 that the selected region is not yet a member of the grooming candidate set, the grooming candidate set module 604 determines 1012 whether the grooming cost of the selected region satisfies a grooming cost threshold, by being lower than a grooming cost of at least one member of the grooming candidate set, or the like. If the grooming candidate set module 604 determines 1012 that the grooming cost of the selected region does not satisfy the grooming cost threshold, the grooming clock module 704 selects 1004 a next region as the selected region.

If the grooming candidate set module 604 determines 1010 that the selected region is already a member of the grooming candidate set or determines 1012 that the grooming cost of the selected region satisfies the grooming cost threshold, the frequency count module 706 preserves 1014 a copy of the frequency count for the selected region. The frequency count module 706 clears 1016 the frequency count of the selected region and the grooming candidate set module 604 adds 1018 the selected region to the grooming candidate set. In one embodiment, the low cost module 606 defines 1020 a low cost region from the grooming candidate set.

The dirty data module 724, in the depicted embodiment, retains 1022 dirty write data from the low cost region. The frequent data module 726 determines 1024 whether the groomer module 702 is in a low pressure groom mode. If the frequent data module 726 determines 1024 that the groomer 702 is in a low pressure groom mode, the frequent data module 726 retains 1026 data of the low cost region identified as frequently accessed data. If the frequent data module 726 determines 1024 that the groomer module 702 is in a high pressure groom mode, the frequent data module 726 does not retain 1026 frequently accessed data, but allows the eviction module 728 to evict the frequently accessed data. The eviction module 728 recovers 1028 the storage capacity of the low cost region and the method 1000 ends.

In one embodiment, certain steps of the method 1000 may be performed independently, at different times, by different cooperating modules or elements, or the like. For example, in certain embodiments, the grooming cost module 602, the grooming candidate set module 604, and the low cost module 606 may manage eviction of data by performing steps 1002 through 1020, or the like, and the groomer module 702 may separately or independently groom, evict, and/or recover storage capacity by performing steps 1022 through 1028, or the like. One of skill in the art will recognize other arrangements and orders of the elements of the method 1000 for managing eviction of data in accordance with the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
examining a grooming cost for a selected region of a nonvolatile solid-state cache, the grooming cost comprising a cost of evicting data from the selected region of the nonvolatile solid-state cache relative to a cost of evicting data from another region;
adding the selected region to a grooming candidate set in response to the grooming cost satisfying a grooming cost threshold; and
selecting a low cost region within the grooming candidate set for grooming the data from the selected region to the other region.

2. The method of claim 1, further comprising recovering storage capacity of the low cost region.

3. The method of claim 2, further comprising retaining cached dirty write data from the low cost region in response to recovering the storage capacity of the low cost region.

4. The method of claim 2, wherein the grooming cost represents a cache efficiency cost of evicting data from the selected region and a storage efficiency cost of copying data forward from the selected region.

5. The method of claim 2, further comprising retaining cached data identified as frequently accessed data from the low cost region in response to recovering the storage capacity of the low cost region in a low pressure groom mode and evicting the cached data identified as frequently accessed data in response to recovering the storage capacity of the low cost region in a high pressure groom mode.

6. The method of claim 2, wherein recovering the storage capacity of the low cost region is in response to one or more of a storage capacity recovery event and a grooming pressure for the nonvolatile solid-state cache exceeding a predefined grooming pressure threshold.

7. The method of claim 1, further comprising selecting a next region of the nonvolatile solid-state cache as the selected region in response to the grooming cost of the selected region failing to satisfy the grooming cost threshold.

8. The method of claim 7, wherein regions of the nonvolatile solid-state cache are organized in a circular data structure and one or more successive next regions are selected in order around the circular data structure until a grooming cost for a next region satisfies the grooming cost threshold and the next region that satisfies the grooming cost threshold is added to the grooming candidate set.

9. The method of claim 1, wherein the grooming cost for the selected region is based at least partially on a frequency count for the selected region.

10. The method of claim 9, further comprising clearing the frequency count for the selected region in response to examining the grooming cost for the selected region such that a subsequent grooming cost for the selected region is based at least partially on a new frequency count for the selected region.

11. The method of claim 9, further comprising preserving a copy of the frequency count for the selected region in response to adding the selected region to the grooming candidate set, the frequency count identifying frequently accessed data from the low cost region.

12. The method of claim 9, wherein the frequency count comprises a number of blocks in the selected region accessed at least a predetermined number of times during a predefined time period.

13. The method of claim 1, wherein the grooming cost for the selected region accounts for an amount of cached dirty write data of the selected region.

14. The method of claim 1, wherein the selected region stores data for a plurality of cache units and the grooming cost accounts for one or more attributes of the plurality of cache units, the one or more attributes comprising one or more of a relative priority of the cache units, an allocated storage capacity for the cache units, and a quality-of-service for the cache units.

15. The method of claim 1, wherein the grooming cost of the selected region satisfies the grooming cost threshold by being lower than at least one region of the grooming candidate set.

16. An apparatus, comprising:
a grooming cost module configured to determine a grooming cost for a selected region of a nonvolatile solid-state cache, the grooming cost comprising a cost of evicting the selected region of the nonvolatile solid-state cache relative to another region;
a grooming candidate set module configured to add the selected region to a grooming candidate set in response to the grooming cost satisfying a grooming cost threshold by being lower than at least one region of the grooming candidate set;
a low cost module configured to select a low cost region within the grooming candidate set, the low cost region comprising a lowest grooming cost of members of the grooming candidate set; and
a groomer module configured to recovers storage capacity of the low cost region when the data is groomed from the selected region.

17. The apparatus of claim 16, further comprising a grooming clock module configured to select the selected region and that selects a next region of the nonvolatile solid-state cache as the selected region in response to the grooming cost of the selected region failing to satisfy the grooming cost threshold.

18. The apparatus of claim 16, further comprising a frequency count module configured to determine a frequency count for the selected region, wherein the grooming cost module bases the grooming cost for the selected region at least partially on the frequency count.

19. A system, comprising:
a processor;
a storage controller for a nonvolatile solid-state storage device, the nonvolatile solid-state storage device for communication with the processor over one or more communications buses;
a cache controller for communication with the storage controller, the cache controller comprising,
a grooming cost module for communication with the storage controller, the grooming cost module for examining a grooming cost for a selected region of a solid state storage media of the nonvolatile solid-state storage device, the grooming cost comprising a cost of evicting the selected region of the nonvolatile solid-state storage device relative to another region;
a grooming candidate module that designates the selected region as a grooming candidate in response to the grooming cost satisfying a grooming cost threshold;
and
a groomer module for communication with the storage controller, the groomer module for recovering storage capacity based on the grooming cost when the data is groomed from the selected region.

20. The system of claim 19, further comprising a host computer system, the host computer system comprising the processor, wherein the storage controller and the cache controller each comprise a device driver executing on the processor of the host computer system.

21. An apparatus, comprising:
a storage recovery cost module configured to determine a storage recovery cost for a selected region of a nonvolatile solid-state cache, the storage recovery cost comprising a cost of evicting the selected region of the nonvolatile solid-state cache relative to another region;
a storage recovery candidate set module configured to add the selected region to a storage recovery candidate set in response to the storage recovery cost satisfying a storage recovery cost threshold by being lower than at least one region of the storage recovery candidate set;
a low cost module configured to select a low cost region within the storage recovery candidate set, the low cost region comprising a lowest storage recovery cost of members of the storage recovery candidate set; and
a storage recovery module configured to recover storage capacity of the low cost region when the data is evicted from the selected region to the other region.

22. A method, comprising:
analyzing a garbage collection cost for a selected region of a solid state storage media of a nonvolatile solid-state cache, the garbage collection cost comprising a cost of evicting data from the selected region of the nonvolatile solid-state cache relative to a cost of evicting data from another region;
adding the selected region to a garbage collection candidate set in response to the garbage collection cost satisfying a garbage collection cost threshold; and
selecting a low cost region within the grooming candidate set for garbage collection when the data is moved from the selected region to the other region.

* * * * *